(12) United States Patent
Khakpour et al.

(10) Patent No.: US 12,708,496 B2
(45) **Date of Patent: *Aug. 18, 2026**

(54) APPARATUS AND METHODS FOR CLEANING TEETH AND ROOT CANALS

(71) Applicant: SONENDO, INC., Laguna Hills, CA (US)

(72) Inventors: Mehrzad Khakpour, Laguna Hills, CA (US); Bjarne Bergheim, Mission Viejo, CA (US); Richard S. Tebbs, Aliso Viejo, CA (US); Morteza Gharib, Altadena, CA (US); Michele Pham, Anaheim, CA (US)

(73) Assignee: SONENDO, INC., Laguna Hills, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 17/562,798

(22) Filed: Dec. 27, 2021

(65) Prior Publication Data

US 2022/0370177 A1 Nov. 24, 2022

Related U.S. Application Data

(63) Continuation of application No. 14/137,937, filed on Dec. 20, 2013, now Pat. No. 11,213,375.

(Continued)

(51) Int. Cl.

*A61C 17/02* (2006.01)
*A61C 5/40* (2017.01)
*A61C 17/20* (2006.01)

(52) U.S. Cl.

CPC ................ *A61C 17/02* (2013.01); *A61C 5/40* (2017.02); *A61C 17/0202* (2013.01); *A61C 17/20* (2013.01)

(58) Field of Classification Search

CPC ...... A61C 17/0202; A61C 17/022–028; A61C 17/06; A61C 17/02

See application file for complete search history.

(56) References Cited

U.S. PATENT DOCUMENTS

| | | | |
|---|---|---|---|
| 1,500,107 | A | 7/1924 | Chandler |
| 2,108,558 | A | 2/1938 | Jackman |

(Continued)

FOREIGN PATENT DOCUMENTS

| | | |
|---|---|---|
| CA | 2031739 | 6/1991 |
| CA | 2771397 | 2/2011 |

(Continued)

OTHER PUBLICATIONS

ADA American Dental Association, “Glossary of Dental Clinical and Administrative Terms,” http://www.ada.org/en/publications/cdt/glossary-of-dental-clinical-and-administrative-ter, downloaded May 4, 2017, in 46 pages.

(Continued)

*Primary Examiner* — Edelmira Bosques
*Assistant Examiner* — Matthew P Saunders
(74) *Attorney, Agent, or Firm* — Knobbe Martens Olson & Bear, LLP

(57) ABSTRACT

Various systems, method, and compositions for treating a tooth are disclosed herein. For example, an apparatus for treating a tooth is disclosed. The apparatus can include a chamber having an access port which places the chamber in fluid communication with a treatment region of the tooth when the chamber is coupled to tooth. A fluid motion generator can be coupled to the chamber. The fluid motion generator can be configured to direct fluid across the access port to generate fluid motion in the chamber. In various (Continued)

embodiments, fluid motion (e.g., vortices, swirl, etc.) can be induced at or near treatment regions of the tooth, such as a root canal or carious region.

17 Claims, 33 Drawing Sheets

Related U.S. Application Data

(60) Provisional application No. 61/907,345, filed on Nov. 21, 2013, provisional application No. 61/740,351, filed on Dec. 20, 2012.

(56) References Cited

U.S. PATENT DOCUMENTS 3,023,306 A 2/1962 Kester
3,225,759 A 12/1965 Drapen et al.
3,401,690 A 9/1968 Martin
3,460,255 A 8/1969 Hutson
3,514,328 A 5/1970 Malin
3,521,359 A 7/1970 Harris
3,522,801 A 8/1970 Seymour
3,547,110 A 12/1970 Balamuth
3,561,433 A 2/1971 Kovach
3,590,813 A 7/1971 Roszyk
3,593,423 A 7/1971 Jones et al.
3,624,907 A 12/1971 Brass et al.
3,703,170 A 11/1972 Ryckman, Jr.
3,731,675 A 5/1973 Kelly
3,739,983 A 6/1973 Jousson
3,745,655 A 7/1973 Malmin
3,747,216 A 7/1973 Bassi et al.
3,756,225 A 9/1973 Moret et al.
3,828,770 A 8/1974 Kuris et al.
3,871,099 A 3/1975 Kahn
3,921,296 A 11/1975 Harris
3,930,505 A 1/1976 Wallach
3,962,790 A 6/1976 Riitano et al.
4,021,921 A 5/1977 Detaille
4,060,600 A 11/1977 Vit
4,071,956 A 2/1978 Andress
4,215,476 A 8/1980 Armstrong
4,247,288 A 1/1981 Yoshii et al.
4,274,555 A 6/1981 Sneider
4,276,880 A 7/1981 Malmin
4,293,188 A 10/1981 McMahon
4,308,603 A 12/1981 Overby, III
4,330,278 A 5/1982 Martin
4,376,835 A 3/1983 Schmitt et al.
4,386,911 A 6/1983 Maloney et al.
4,424,036 A 1/1984 Lokken
4,462,803 A 7/1984 Landgraf et al.
4,474,251 A 10/1984 Johnson, Jr.
4,492,575 A 1/1985 Mabille
4,522,597 A 6/1985 Gallant
4,534,542 A 8/1985 Russo
4,539,987 A 9/1985 Nath et al.
4,554,088 A 11/1985 Whitehead et al.
4,595,365 A 6/1986 Edel et al.
4,608,017 A 8/1986 Sadohara
4,659,218 A 4/1987 de Lasa et al.
4,661,070 A 4/1987 Friedman
4,671,259 A 6/1987 Kirchner
4,676,586 A 6/1987 Jones et al.
4,676,749 A 6/1987 Mabille
4,684,781 A 8/1987 Frish et al.
4,732,193 A 3/1988 Gibbs
4,789,335 A 12/1988 Geller et al.
4,818,230 A 4/1989 Myers et al.
4,872,837 A 10/1989 Issalene et al.
4,917,603 A 4/1990 Haack
4,935,635 A 6/1990 O'Harra
4,941,459 A 7/1990 Mathur
4,957,436 A 9/1990 Ryder
4,973,246 A 11/1990 Black et al.
4,985,027 A 1/1991 Dressel
4,992,048 A 2/1991 Goof
4,993,947 A 2/1991 Grosrey
5,013,241 A 5/1991 Gutfeld et al.
5,013,300 A 5/1991 Williams
5,020,995 A 6/1991 Levy
5,029,576 A 7/1991 Evans, Sr.
5,037,431 A 8/1991 Summers et al.
5,046,950 A 9/1991 Favonio
5,055,048 A 10/1991 Vassiliadis et al.
5,066,232 A 11/1991 Negri et al.
5,094,256 A 3/1992 Barth
5,112,224 A 5/1992 Shirota
5,116,227 A 5/1992 Levy
5,118,293 A 6/1992 Levy
5,122,060 A 6/1992 Vassiliadis et al.
5,123,845 A 6/1992 Vassiliadis et al.
5,145,367 A 9/1992 Kasten
5,151,029 A 9/1992 Levy
5,151,031 A 9/1992 Levy
5,169,318 A 12/1992 Levy
5,171,150 A 12/1992 Levy
5,173,049 A 12/1992 Levy
5,173,050 A 12/1992 Dillon
5,180,304 A 1/1993 Vassiliadis et al.
5,188,532 A 2/1993 Levy
5,188,634 A 2/1993 Hussein et al.
5,194,005 A 3/1993 Levy
5,194,723 A 3/1993 Cates et al.
5,195,952 A 3/1993 Solnit et al.
5,224,942 A 7/1993 Beuchat et al.
5,228,852 A 7/1993 Goldsmith et al.
5,232,366 A 8/1993 Levy
5,232,367 A 8/1993 Vassiliadis et al.
5,236,360 A 8/1993 Levy
5,249,964 A 10/1993 Levy
5,257,935 A 11/1993 Vassiliadis et al.
5,267,856 A 12/1993 Wolbarsht et al.
5,267,995 A 12/1993 Doiron et al.
5,269,777 A 12/1993 Doiron et al.
5,273,713 A 12/1993 Levy
5,275,564 A 1/1994 Vassiliadis et al.
5,281,141 A 1/1994 Kowalyk
5,290,274 A 3/1994 Levy et al.
5,292,253 A 3/1994 Levy
5,295,828 A 3/1994 Grosrey
5,304,167 A 4/1994 Freiberg
5,306,143 A 4/1994 Levy
5,307,839 A 5/1994 Loebker et al.
5,310,344 A 5/1994 Vassiliadis et al.
5,318,562 A 6/1994 Levy et al.
5,322,504 A 6/1994 Doherty et al.
5,324,200 A 6/1994 Vassiliadis et al.
5,326,263 A 7/1994 Weissman
5,326,264 A 7/1994 Al Kasem
5,334,016 A 8/1994 Goldsmith et al.
5,334,019 A 8/1994 Goldsmith et al.
5,342,196 A 8/1994 Van Hale
5,342,198 A 8/1994 Vassiliadis et al.
5,365,624 A 11/1994 Berns
5,374,266 A 12/1994 Kataoka et al.
5,380,201 A 1/1995 Kawata
5,387,376 A 2/1995 Gasser
5,390,204 A 2/1995 Yessik et al.
D356,866 S 3/1995 Meller
5,399,089 A 3/1995 Eichman et al.
5,409,376 A 4/1995 Murphy
5,415,652 A 5/1995 Mueller et al.
5,422,899 A 6/1995 Freiberg et al.
5,428,699 A 6/1995 Pon
5,435,724 A 7/1995 Goodman et al.
5,474,451 A 12/1995 Dalrymple et al.
5,484,283 A 1/1996 Franetzki
5,490,779 A 2/1996 Malmin
5,503,559 A 4/1996 Vari
5,507,739 A 4/1996 Vassiliadis et al.
5,540,587 A 7/1996 Malmin
5,545,039 A 8/1996 Mushabac

(56) References Cited

U.S. PATENT DOCUMENTS 5,547,376 A 8/1996 Harrel
5,554,896 A 9/1996 Hogan
5,562,692 A 10/1996 Bair
5,564,929 A 10/1996 Alpert
5,570,182 A 10/1996 Nathel et al.
5,591,184 A 1/1997 McDonnell et al.
5,601,430 A 2/1997 Kutsch et al.
5,611,797 A 3/1997 George
5,620,414 A 4/1997 Campbell, Jr.
5,621,745 A 4/1997 Yessik et al.
5,622,501 A 4/1997 Levy
5,639,239 A 6/1997 Earle
5,642,997 A 7/1997 Gregg et al.
5,643,299 A 7/1997 Bair
5,660,817 A 8/1997 Masterman et al.
5,662,501 A 9/1997 Levy
5,674,226 A 10/1997 Doherty et al.
5,688,486 A 11/1997 Watson et al.
5,720,894 A 2/1998 Neev et al.
5,730,727 A 3/1998 Russo
5,735,815 A 4/1998 Bair
5,740,291 A 4/1998 De Lasa et al.
5,741,247 A 4/1998 Rizoiu et al.
5,748,655 A 5/1998 Yessik et al.
5,755,752 A 5/1998 Segal
5,759,031 A 6/1998 Goldsmith et al.
5,759,159 A 6/1998 Masreliez
5,762,501 A 6/1998 Levy
5,780,668 A 7/1998 Rheinberger et al.
5,785,521 A 7/1998 Rizoiu et al.
5,795,153 A 8/1998 Rechmann
5,797,745 A 8/1998 Ruddle
5,803,917 A 9/1998 Butterfield et al.
5,810,037 A 9/1998 Sasaki et al.
5,816,807 A 10/1998 Matsutani et al.
5,820,373 A 10/1998 Okano et al.
5,825,958 A 10/1998 Gollihar et al.
5,832,013 A 11/1998 Yessik et al.
5,839,896 A 11/1998 Hickok et al.
5,842,863 A 12/1998 Bruns et al.
5,846,080 A 12/1998 Schneider
5,853,384 A 12/1998 Bair
5,860,067 A 1/1999 Onda et al.
5,865,790 A 2/1999 Bair
5,868,570 A 2/1999 Hickok et al.
5,874,677 A 2/1999 Bab et al.
5,879,160 A 3/1999 Ruddle
5,885,082 A 3/1999 Levy
5,897,314 A 4/1999 Hack et al.
5,911,711 A 6/1999 Pelkey
5,915,965 A 6/1999 Ohlsson et al.
5,921,775 A 7/1999 Buchanan
5,968,037 A 10/1999 Rizoiu et al.
5,968,039 A 10/1999 Deutsch
5,971,755 A 10/1999 Liebermann et al.
5,975,897 A 11/1999 Propp et al.
5,989,023 A 11/1999 Summer et al.
6,004,319 A 12/1999 Goble et al.
6,019,605 A 2/2000 Myers
6,022,309 A 2/2000 Celliers et al.
6,030,221 A 2/2000 Jones et al.
6,033,431 A 3/2000 Segal
6,045,516 A 4/2000 Phelan
6,053,735 A 4/2000 Buchanan
6,079,979 A 6/2000 Riitano
6,086,367 A 7/2000 Levy
6,096,029 A 8/2000 O'Donnell, Jr.
6,104,853 A 8/2000 Miyagi et al.
6,106,514 A 8/2000 O'Donnell, Jr.
6,122,300 A 9/2000 Frieberg et al.
6,129,721 A 10/2000 Kataoka et al.
6,139,319 A 10/2000 Sauer et al.
6,139,320 A 10/2000 Hahn
6,143,011 A 11/2000 Hood et al.
D435,651 S 12/2000 Hartwein
6,159,006 A 12/2000 Cook et al.
6,162,052 A 12/2000 Kokubu
6,162,177 A 12/2000 Bab et al.
6,162,202 A 12/2000 Sicurelli et al.
6,164,966 A 12/2000 Turdiu et al.
6,179,617 B1 1/2001 Ruddle
6,190,318 B1 2/2001 Bab et al.
6,197,020 B1 3/2001 O'Donnell, Jr.
6,213,972 B1 4/2001 Butterfield et al.
6,221,031 B1 4/2001 Heraud
6,224,378 B1 5/2001 Valdes et al.
6,227,855 B1 5/2001 Hickok et al.
6,231,567 B1 5/2001 Rizoiu et al.
6,245,032 B1 6/2001 Sauer et al.
6,254,597 B1 7/2001 Rizoiu et al.
6,270,342 B1 8/2001 Neuberger et al.
6,282,013 B1 8/2001 Ostler et al.
6,288,499 B1 9/2001 Rizoiu et al.
6,290,502 B1 9/2001 Hugo
6,309,340 B1 10/2001 Nakagawa
6,312,440 B1 11/2001 Hood et al.
6,315,557 B1 11/2001 Messick
6,315,565 B1 11/2001 Slotke et al.
6,319,002 B1 11/2001 Pond
6,343,929 B1 2/2002 Fischer
6,350,123 B1 2/2002 Rizoiu et al.
6,354,660 B1 3/2002 Friedrich
6,386,871 B1 5/2002 Rossel
6,389,193 B1 5/2002 Kimmel et al.
6,390,815 B1 5/2002 Pond
6,428,319 B1 8/2002 Lopez et al.
6,432,113 B1 * 8/2002 Parkin .................... A61M 1/79
606/131
6,440,103 B1 8/2002 Hood et al.
D463,556 S 9/2002 Bareth et al.
6,454,566 B1 9/2002 Lynch et al.
6,464,498 B2 10/2002 Pond
6,485,304 B2 11/2002 Beerstecher et al.
6,497,572 B2 12/2002 Hood et al.
6,511,493 B1 1/2003 Moutafis et al.
6,514,077 B1 2/2003 Wilk
6,527,766 B1 3/2003 Bair
6,533,775 B1 3/2003 Rizoiu
6,538,739 B1 3/2003 Visuri et al.
6,544,256 B1 4/2003 Rizoiu et al.
6,561,803 B1 5/2003 Rizoiu et al.
6,562,050 B1 5/2003 Owen
6,567,582 B1 5/2003 Rizoiu et al.
6,572,709 B1 6/2003 Kaneda et al.
6,592,371 B2 7/2003 Durbin et al.
6,602,074 B1 8/2003 Suh et al.
6,610,053 B1 8/2003 Rizoiu et al.
6,616,447 B1 9/2003 Rizoiu et al.
6,616,451 B1 9/2003 Rizolu et al.
6,638,219 B1 10/2003 Asch et al.
6,641,394 B2 11/2003 Garman
6,644,972 B1 11/2003 Mays
6,663,386 B1 12/2003 Moelsgaard
6,669,685 B1 12/2003 Rizoiu et al.
6,676,409 B2 1/2004 Grant
6,679,837 B2 1/2004 Daikuzono
6,695,686 B1 2/2004 Frohlich et al.
6,744,790 B1 6/2004 Tilleman et al.
6,783,364 B1 8/2004 Juan
6,799,968 B2 10/2004 Aumuller et al.
6,817,862 B2 11/2004 Hickok
6,821,272 B2 11/2004 Rizoiu et al.
D499,486 S 12/2004 Kuhn et al.
6,827,766 B2 12/2004 Carnes et al.
6,829,427 B1 12/2004 Becker
6,881,061 B2 4/2005 Fisher
6,886,371 B2 5/2005 Arai et al.
6,893,259 B1 5/2005 Reizenson
6,910,887 B2 6/2005 Van Den Houdt
6,942,658 B1 9/2005 Rizoiu et al.
6,948,935 B2 9/2005 Nusstein
6,971,878 B2 12/2005 Pond
6,976,844 B2 12/2005 Hickok et al.
6,981,869 B2 1/2006 Ruddle

(56) References Cited

U.S. PATENT DOCUMENTS 6,997,714 B1 2/2006 Schoeffel
7,008,224 B1 3/2006 Browning et al.
7,011,521 B2 3/2006 Sierro et al.
7,011,644 B1 3/2006 Andrew et al.
7,014,465 B1 3/2006 Marais
7,029,278 B2 4/2006 Pond
7,044,737 B2 5/2006 Fu
7,068,912 B1 6/2006 Becker
7,090,497 B1 8/2006 Harris
7,108,693 B2 9/2006 Rizoiu et al.
7,115,100 B2 10/2006 McRury et al.
7,144,249 B2 12/2006 Rizoiu et al.
7,147,468 B2 12/2006 Snyder et al.
7,163,400 B2 1/2007 Cozean et al.
7,187,822 B2 3/2007 Rizoiu et al.
7,194,180 B2 3/2007 Becker
7,226,288 B2 6/2007 Schoeffel
7,234,937 B2 6/2007 Sachdeva et al.
7,238,342 B2 7/2007 Torabinejad et al.
7,261,558 B2 8/2007 Rizoiu et al.
7,261,561 B2 8/2007 Ruddle et al.
D550,358 S 9/2007 Nakanishi
7,269,306 B1 9/2007 Koeneman et al.
7,270,544 B2 9/2007 Schemmer et al.
7,270,657 B2 9/2007 Rizoiu et al.
7,288,086 B1 10/2007 Andriasyan
D555,792 S 11/2007 Haymann et al.
7,290,940 B2 11/2007 Boutoussov
7,292,759 B2 11/2007 Boutoussov et al.
7,296,318 B2 11/2007 Mourad et al.
7,303,397 B2 12/2007 Boutoussov
7,306,459 B1 12/2007 Williams et al.
7,306,577 B2 12/2007 Lemoine et al.
7,320,594 B1 1/2008 Rizoiu et al.
7,326,054 B2 2/2008 Todd et al.
7,356,208 B2 4/2008 Becker
7,356,225 B2 4/2008 Loebel
7,384,419 B2 6/2008 Jones et al.
7,415,050 B2 8/2008 Rizoiu et al.
7,421,186 B2 9/2008 Boutoussov et al.
7,424,199 B2 9/2008 Rizoiu et al.
7,445,618 B2 11/2008 Eggers et al.
7,448,867 B2 11/2008 Aloise et al.
7,458,380 B2 12/2008 Jones et al.
7,461,658 B2 12/2008 Jones et al.
7,461,982 B2 12/2008 Boutoussov et al.
7,467,946 B2 12/2008 Rizoiu et al.
7,470,124 B2 12/2008 Bornstein
7,485,116 B2 2/2009 Cao
7,549,861 B2 6/2009 Ruddle et al.
7,563,226 B2 7/2009 Boutoussov
7,575,381 B2 8/2009 Boutoussov
7,578,622 B2 8/2009 Boutoussov
7,620,290 B2 11/2009 Rizoiu et al.
7,621,745 B2 11/2009 Bornstein
7,630,420 B2 12/2009 Boutoussov
7,641,668 B2 1/2010 Perry et al.
7,665,467 B2 2/2010 Jones et al.
7,670,141 B2 3/2010 Thomas et al.
7,695,469 B2 4/2010 Boutoussov et al.
7,696,466 B2 4/2010 Rizoiu et al.
7,697,814 B2 4/2010 Rizoiu et al.
7,702,196 B2 4/2010 Boutoussov et al.
7,748,979 B2 7/2010 Nahliel
7,751,895 B2 7/2010 Jones et al.
7,766,656 B1 8/2010 Feine
7,778,306 B2 8/2010 Marincek et al.
7,815,630 B2 10/2010 Rizoiu et al.
7,817,687 B2 10/2010 Rizoiu et al.
7,833,016 B2 11/2010 Gharib et al.
7,833,017 B2 11/2010 Hof et al.
7,845,944 B2 12/2010 DiGasbarro
7,867,223 B2 1/2011 Van Valen
7,867,224 B2 1/2011 Lukac et al.
7,878,204 B2 2/2011 Van Valen
7,891,363 B2 2/2011 Jones et al.
7,891,977 B2 2/2011 Riva
7,901,373 B2 3/2011 Tavger
7,909,040 B2 3/2011 Jones et al.
7,909,817 B2 3/2011 Griffin et al.
7,916,282 B2 3/2011 Duineveld et al.
7,942,667 B2 5/2011 Rizoiu et al.
7,957,440 B2 6/2011 Boutoussov
7,959,441 B2 6/2011 Glover et al.
7,967,017 B2 6/2011 Jones et al.
7,970,027 B2 6/2011 Rizoiu et al.
7,970,030 B2 6/2011 Rizoiu et al.
7,980,854 B2 7/2011 Glover et al.
7,980,923 B2 7/2011 Olmo et al.
7,997,279 B2 8/2011 Jones et al.
7,998,136 B2 8/2011 Jones et al.
8,002,544 B2 8/2011 Rizoiu et al.
8,011,923 B2 9/2011 Lukac et al.
8,023,795 B2 9/2011 Rizoiu et al.
8,033,825 B2 10/2011 Rizoiu et al.
8,037,566 B2 10/2011 Grez
8,047,841 B2 11/2011 Jefferies
8,052,627 B2 11/2011 Gromer et al.
8,056,564 B2 11/2011 Jones et al.
8,062,673 B2 11/2011 Figuly et al.
8,100,482 B2 1/2012 Kito et al.
8,128,401 B2 3/2012 Ruddle et al.
8,152,797 B2 4/2012 Boutoussov et al.
8,204,612 B2 6/2012 Feine et al.
8,221,117 B2 7/2012 Rizoiu et al.
8,235,719 B2 8/2012 Ruddle et al.
8,241,035 B2 8/2012 Jones et al.
8,256,431 B2 9/2012 Van Valen
D669,180 S 10/2012 Takashi et al.
D669,583 S 10/2012 Kagawa
8,276,593 B2 10/2012 Jones et al.
8,295,025 B2 10/2012 Edel et al.
8,297,540 B1 10/2012 Vijay
8,298,215 B2 10/2012 Zinn
8,317,514 B2 11/2012 Weill
8,322,910 B2 12/2012 Gansmuller et al.
8,328,552 B2 12/2012 Ruddle
8,366,702 B2 2/2013 Van Valen
8,371,848 B2 2/2013 Okawa et al.
8,388,345 B2 3/2013 Ruddle
8,403,922 B2 3/2013 Boutoussov et al.
8,419,719 B2 4/2013 Rizoiu et al.
8,439,676 B2 5/2013 Florman
8,439,904 B2 5/2013 Jones et al.
8,448,645 B2 5/2013 Jones et al.
8,470,035 B2 6/2013 Cruise et al.
8,474,635 B2 7/2013 Johnson
8,479,745 B2 7/2013 Rizoiu
8,485,818 B2 7/2013 Boutoussov et al.
8,506,293 B2 8/2013 Pond
8,525,059 B2 9/2013 Berger et al.
8,544,473 B2 10/2013 Rizoiu et al.
8,568,392 B2 10/2013 Jones et al.
8,588,268 B2 11/2013 Boutoussov et al.
8,602,033 B2 12/2013 Jones et al.
8,603,079 B2 12/2013 Van Valen
8,617,090 B2 12/2013 Fougere et al.
8,653,392 B2 2/2014 Berger et al.
8,672,678 B2 3/2014 Gramann et al.
D701,971 S 4/2014 Valen et al.
8,684,956 B2 4/2014 McDonough et al.
8,709,057 B2 4/2014 Tettamanti et al.
RE44,917 E 5/2014 Tuttle
8,740,957 B2 6/2014 Masotti
8,747,005 B2 6/2014 Kemp et al.
8,753,121 B2 6/2014 Gharib et al.
8,758,010 B2 6/2014 Yamanaka et al.
8,764,739 B2 7/2014 Boutoussov et al.
8,792,251 B2 7/2014 Shih
8,801,316 B1 8/2014 Abedini
D713,538 S 9/2014 Van Valen et al.
8,821,483 B2 9/2014 Boutoussov et al.
8,827,990 B2 9/2014 Van Valen et al.
8,834,450 B1 9/2014 McCrary et al.

(56) References Cited

U.S. PATENT DOCUMENTS 8,834,457 B2 9/2014 Cao
8,926,323 B2 1/2015 Mossle
8,944,814 B2 2/2015 Mossle
8,977,085 B2 3/2015 Walsh et al.
8,978,930 B2 3/2015 Bublewitz et al.
D726,324 S 4/2015 Duncan et al.
9,022,959 B2 5/2015 Fusi, II et al.
9,022,961 B2 5/2015 Fougere et al.
9,025,625 B2 5/2015 Skrabelj et al.
9,050,157 B2 6/2015 Boyd et al.
9,052,805 B2 6/2015 Boutoussov et al.
9,060,845 B2 6/2015 Van Valen et al.
9,084,651 B2 7/2015 Laufer
9,101,377 B2 8/2015 Boutoussov et al.
9,186,222 B2 11/2015 Marincek et al.
D745,966 S 12/2015 Piorek et al.
9,204,946 B2 12/2015 Kotlarchik et al.
9,216,073 B2 12/2015 McDonough et al.
9,308,326 B2 4/2016 Hunter et al.
9,333,060 B2 5/2016 Hunter
9,341,184 B2 5/2016 Dion et al.
9,408,781 B2 8/2016 Qian et al.
9,492,244 B2 11/2016 Bergheim et al.
9,504,536 B2 11/2016 Bergheim et al.
9,545,295 B2 1/2017 Sung et al.
9,566,129 B2 2/2017 Browning et al.
9,572,632 B2 2/2017 Lukac et al.
9,579,174 B2 2/2017 Yamamoto et al.
9,597,168 B2 3/2017 Black et al.
9,603,676 B1 3/2017 Bochi
9,610,125 B2 4/2017 Kazic et al.
9,675,426 B2 6/2017 Bergheim et al.
9,696,893 B2 7/2017 Boutoussov et al.
9,700,382 B2 7/2017 Pond et al.
9,700,384 B2 7/2017 Yamamoto et al.
9,700,394 B2 7/2017 Yamamoto et al.
9,713,511 B2 7/2017 Lifshitz
9,730,773 B2 8/2017 Uchitel et al.
9,743,999 B2 8/2017 Policicchio
9,788,899 B2 10/2017 Sivriver et al.
9,820,827 B2 11/2017 Feine et al.
9,820,834 B2 11/2017 Maxwell et al.
9,864,485 B2 1/2018 Patton et al.
9,867,997 B2 1/2018 Boutoussov et al.
9,872,748 B2 1/2018 Schoeffel
9,877,801 B2 1/2018 Khakpour et al.
D812,231 S 3/2018 Duncan et al.
D813,391 S 3/2018 Duncan et al.
9,931,187 B2 4/2018 Fregoso et al.
9,956,039 B2 5/2018 Boutoussov et al.
9,987,200 B2 6/2018 Kishen
10,010,388 B2 7/2018 Gharib et al.
10,016,263 B2 7/2018 Gharib et al.
D824,935 S 8/2018 Boutoussov et al.
10,039,625 B2 8/2018 Gharib et al.
10,039,932 B2 8/2018 Van Valen
10,098,708 B2 10/2018 Pond
10,098,717 B2 10/2018 Bergheim et al.
10,105,289 B2 10/2018 Guzman
10,130,424 B2 11/2018 Boutoussov et al.
10,314,671 B2 6/2019 Lifshitz et al.
10,321,957 B2 6/2019 Boutoussov et al.
10,327,866 B2 6/2019 Lifshitz et al.
10,335,249 B2 7/2019 Hiemer et al.
10,363,120 B2 * 7/2019 Khakpour ............ A61C 17/024
10,420,629 B2 9/2019 Buchanan
10,420,630 B2 9/2019 Bergheim et al.
10,430,061 B2 10/2019 Boutoussov et al.
10,450,656 B2 10/2019 Sivriver et al.
10,518,299 B2 12/2019 Lukac et al.
10,561,560 B2 2/2020 Boutoussov et al.
D881,394 S 4/2020 Classen et al.
10,617,498 B2 4/2020 Gharib et al.
10,631,962 B2 4/2020 Bergheim et al.
10,702,355 B2 7/2020 Bergheim et al.
10,722,325 B2 7/2020 Khakpour et al.
10,729,514 B2 8/2020 Buchanan
D896,827 S 9/2020 Boutoussov et al.
10,779,908 B2 9/2020 Dresser et al.
10,779,920 B2 9/2020 Buchanan
10,806,543 B2 10/2020 Bergheim et al.
10,806,544 B2 10/2020 Khakpour et al.
10,835,355 B2 11/2020 Gharib et al.
D903,868 S 12/2020 Goisser et al.
10,877,630 B2 12/2020 Patton et al.
D923,038 S 6/2021 Boutoussov et al.
11,103,309 B2 8/2021 Boutoussov et al.
11,103,333 B2 * 8/2021 Khakpour ............. A61C 17/20
11,141,249 B2 10/2021 Evans et al.
11,160,455 B2 11/2021 Islam
11,160,645 B2 11/2021 Bergheim et al.
11,173,010 B2 11/2021 Boutoussov et al.
11,173,019 B2 11/2021 Bergheim et al.
11,193,209 B2 12/2021 Sivriver et al.
11,202,687 B2 12/2021 Boutoussov et al.
D940,879 S 1/2022 Ryu et al.
11,213,375 B2 * 1/2022 Khakpour ............. A61C 17/02
11,250,941 B2 2/2022 Patton et al.
11,284,978 B2 3/2022 Bergheim et al.
11,350,993 B2 6/2022 DiVito et al.
11,426,239 B2 8/2022 DiVito et al.
11,547,538 B2 1/2023 Ertl et al.
11,680,141 B2 6/2023 Gomurashvili et al.
11,684,421 B2 6/2023 DiVito et al.
11,701,202 B2 7/2023 Khakpour et al.
D997,355 S 8/2023 Schultz et al.
D998,802 S 9/2023 Cha et al.
11,801,119 B2 10/2023 Al Shehadat
11,918,432 B2 3/2024 Gharib et al.
11,968,669 B2 4/2024 Bergheim et al.
12,114,924 B2 10/2024 DiVito et al.
12,186,151 B2 1/2025 Bergheim et al.
12,213,731 B2 2/2025 DiVito et al.
12,268,565 B2 4/2025 Bergheim et al.
12,533,218 B2 1/2026 Khakpour et al.
D1,118,938 S 3/2026 Tarkesian et al.
2001/0041324 A1 11/2001 Riitano
2001/0055752 A1 12/2001 Ennis
2002/0012897 A1 1/2002 Tingley et al.
2002/0014855 A1 2/2002 Rizoiu et al.
2002/0072032 A1 6/2002 Senn et al.
2002/0086264 A1 7/2002 Okawa et al.
2002/0090594 A1 7/2002 Riitano et al.
2002/0108614 A1 8/2002 Schultz
2002/0142260 A1 10/2002 Pond
2002/0168610 A1 11/2002 Papanek et al.
2002/0183728 A1 12/2002 Rosenberg et al.
2003/0013063 A1 1/2003 Goldman
2003/0013064 A1 1/2003 Zirkel
2003/0022126 A1 1/2003 Buchalla et al.
2003/0023234 A1 1/2003 Daikuzono
2003/0027100 A1 2/2003 Grant
2003/0031978 A1 2/2003 Garman
2003/0096213 A1 5/2003 Hickok et al.
2003/0121532 A1 7/2003 Coughlin et al.
2003/0124485 A1 7/2003 Teraushi
2003/0129560 A1 7/2003 Atkin
2003/0158544 A1 8/2003 Slatkine
2003/0191429 A1 10/2003 Andrew et al.
2003/0207231 A1 11/2003 Nance
2003/0207232 A1 11/2003 Todd et al.
2003/0211083 A1 11/2003 Vogel et al.
2003/0215768 A1 11/2003 Aumuller et al.
2003/0236517 A1 12/2003 Appling
2004/0038170 A1 2/2004 Hiszowicz et al.
2004/0048226 A1 3/2004 Garman
2004/0063073 A1 4/2004 Kajimoto et al.
2004/0063074 A1 4/2004 Fisher
2004/0068256 A1 4/2004 Rizoiu et al.
2004/0072122 A1 4/2004 Hegemann
2004/0073374 A1 4/2004 Lockhart et al.
2004/0092925 A1 5/2004 Rizoiu et al.
2004/0101809 A1 5/2004 Weiss et al.
2004/0102782 A1 5/2004 Vercellotti et al.

(56) References Cited

U.S. PATENT DOCUMENTS

2004/0126732 A1 7/2004 Nusstein
2004/0127892 A1 7/2004 Harris
2004/0136971 A1 7/2004 Scharp et al.
2004/0166473 A1 8/2004 Cohen
2004/0193236 A1 9/2004 Altshuler
2004/0210276 A1 10/2004 Altshuler et al.
2004/0224288 A1 11/2004 Bornstein
2004/0259053 A1 12/2004 Bekov et al.
2005/0026106 A1 2/2005 Jefferies
2005/0064371 A1 3/2005 Soukos et al.
2005/0065497 A1 3/2005 Levatino
2005/0096529 A1 5/2005 Cooper et al.
2005/0112525 A1 5/2005 McPherson et al.
2005/0136375 A1 6/2005 Sicurelli, Jr. et al.
2005/0142517 A1 6/2005 Frysh et al.
2005/0155622 A1 7/2005 Leis
2005/0170312 A1* 8/2005 Pond ........................ A61C 5/40 433/81
2005/0175960 A1 8/2005 Wiek et al.
2005/0186530 A1 8/2005 Eagle
2005/0199261 A1 9/2005 Vanhauwemeiren et al.
2005/0256517 A1 11/2005 Boutoussov
2005/0271531 A1 12/2005 Brown, Jr. et al.
2005/0272001 A1 12/2005 Blain et al.
2005/0277898 A1 12/2005 Dimalanta et al.
2005/0281530 A1 12/2005 Rizoiu et al.
2005/0281887 A1 12/2005 Rizoiu
2005/0283143 A1 12/2005 Rizoiu
2006/0019220 A1 1/2006 Loebel et al.
2006/0021642 A1 2/2006 Sliwa et al.
2006/0036172 A1 2/2006 Abe
2006/0064037 A1 3/2006 Shalon et al.
2006/0110710 A1 5/2006 Schemmer et al.
2006/0142743 A1 6/2006 Rizoiu et al.
2006/0142744 A1 6/2006 Boutoussov
2006/0142745 A1 6/2006 Boutoussov
2006/0184071 A1 8/2006 Klopotek
2006/0189965 A1 8/2006 Litvak et al.
2006/0227653 A1 10/2006 Keller
2006/0234182 A1 10/2006 Ruddle et al.
2006/0234183 A1 10/2006 Ruddle et al.
2006/0240381 A1 10/2006 Rizoiu et al.
2006/0240386 A1 10/2006 Yaniv et al.
2006/0241574 A1 10/2006 Rizoiu
2006/0246395 A1 11/2006 Pond
2006/0257819 A1 11/2006 Johnson
2006/0264808 A1 11/2006 Staid et al.
2007/0003604 A1 1/2007 Jones
2007/0009449 A1 1/2007 Kanca
2007/0014517 A1 1/2007 Rizoiu et al.
2007/0016176 A1 1/2007 Boutoussov et al.
2007/0016177 A1 1/2007 Vaynberg et al.
2007/0016178 A1 1/2007 Vaynberg et al.
2007/0020576 A1 1/2007 Osborn et al.
2007/0042315 A1 2/2007 Boutoussov et al.
2007/0042316 A1 2/2007 Pichat et al.
2007/0049911 A1 3/2007 Brown
2007/0054233 A1 3/2007 Rizoiu et al.
2007/0054235 A1 3/2007 Rizoiu et al.
2007/0054236 A1 3/2007 Rizoiu et al.
2007/0059660 A1 3/2007 Rizoiu et al.
2007/0060917 A1 3/2007 Andriasyan
2007/0072153 A1 3/2007 Gross et al.
2007/0083120 A1 4/2007 Cain et al.
2007/0087303 A1 4/2007 Papanek et al.
2007/0088295 A1 4/2007 Bankiewicz
2007/0099149 A1 5/2007 Levy et al.
2007/0104419 A1 5/2007 Rizoiu et al.
2007/0128576 A1 6/2007 Boutoussov
2007/0135797 A1 6/2007 Hood et al.
2007/0148615 A1 6/2007 Pond
2007/0175502 A1 8/2007 Sliwa
2007/0179486 A1 8/2007 Welch et al.
2007/0184402 A1 8/2007 Boutoussov et al.
2007/0190482 A1 8/2007 Rizoiu
2007/0208328 A1 9/2007 Boutoussov et al.
2007/0224575 A1 9/2007 Dieras et al.
2007/0248932 A1 10/2007 Gharib et al.
2007/0265605 A1 11/2007 Vaynberg et al.
2007/0276290 A1 11/2007 Boecker et al.
2007/0287125 A1 12/2007 Weill
2007/0298369 A1 12/2007 Rizoiu et al.
2008/0014545 A1 1/2008 Schippers
2008/0032259 A1 2/2008 Schoeffel
2008/0033411 A1 2/2008 Manvel Artyom et al.
2008/0044789 A1 2/2008 Johnson
2008/0050702 A1 2/2008 Glover et al.
2008/0065057 A1 3/2008 Andriasyan
2008/0070185 A1 3/2008 Rizoiu et al.
2008/0070195 A1 3/2008 DiVito et al.
2008/0085490 A1 4/2008 Jabri
2008/0097417 A1 4/2008 Jones et al.
2008/0102416 A1 5/2008 Karazivan et al.
2008/0125677 A1 5/2008 Van Valen
2008/0138761 A1 6/2008 Pond
2008/0138764 A1 6/2008 Rizoiu
2008/0138772 A1 6/2008 Bornstein
2008/0151953 A1 6/2008 Rizoiu et al.
2008/0155770 A1 7/2008 Grez
2008/0157690 A1 7/2008 Rizoiu et al.
2008/0159345 A1 7/2008 Bornstein
2008/0160479 A1 7/2008 Ruddle et al.
2008/0160480 A1 7/2008 Ruddle et al.
2008/0160481 A1 7/2008 Schoeffel
2008/0188848 A1 8/2008 Deutmeyer et al.
2008/0199831 A1 8/2008 Teichert et al.
2008/0209650 A1 9/2008 Brewer et al.
2008/0219629 A1 9/2008 Rizoiu et al.
2008/0221558 A1 9/2008 Becker
2008/0255498 A1 10/2008 Houle
2008/0274438 A1 11/2008 Schemmer
2008/0276192 A1 11/2008 Jones et al.
2008/0285600 A1 11/2008 Marincek et al.
2008/0311045 A1 12/2008 Hardy
2008/0311540 A1 12/2008 Gottenbos et al.
2008/0314199 A1 12/2008 Niemi et al.
2008/0319453 A1* 12/2008 Tavger .............. A61C 17/0217 606/131
2009/0004621 A1 1/2009 Quan et al.
2009/0011380 A1 1/2009 Wang
2009/0031515 A1 2/2009 Rizoiu et al.
2009/0035717 A1 2/2009 Rizoiu et al.
2009/0042171 A1 2/2009 Rizoiu et al.
2009/0047624 A1 2/2009 Tsai
2009/0047634 A1 2/2009 Calvert
2009/0054881 A1 2/2009 Krespi
2009/0059994 A1 3/2009 Nemes et al.
2009/0067189 A1 3/2009 Boutoussov et al.
2009/0092947 A1 4/2009 Cao et al.
2009/0105597 A1 4/2009 Abraham
2009/0105707 A1 4/2009 Rizoiu et al.
2009/0111068 A1 4/2009 Martinez
2009/0111069 A1 4/2009 Wagner
2009/0130622 A1 5/2009 Bollinger et al.
2009/0143775 A1 6/2009 Rizoiu et al.
2009/0170052 A1 7/2009 Borczyk
2009/0208898 A1 8/2009 Kaplan
2009/0211042 A1 8/2009 Bock
2009/0220908 A1 9/2009 Divito et al.
2009/0225060 A1 9/2009 Rizoiu et al.
2009/0227185 A1 9/2009 Summers et al.
2009/0263759 A1 10/2009 Van Herpern
2009/0275935 A1 11/2009 McKee
2009/0281531 A1 11/2009 Rizoiu et al.
2009/0298004 A1 12/2009 Rizoiu
2010/0015576 A1 1/2010 Altshuler et al.
2010/0042040 A1 2/2010 Arentz
2010/0047734 A1 2/2010 Harris et al.
2010/0068679 A1 3/2010 Zappini
2010/0086892 A1 4/2010 Riozoui et al.
2010/0092922 A1 4/2010 Ruddle
2010/0125291 A1 5/2010 Rizoiu et al.
2010/0143861 A1 6/2010 Gharib
2010/0151406 A1 6/2010 Boutoussov et al.

(56) References Cited

U.S. PATENT DOCUMENTS

2010/0151407 A1 6/2010 Rizoiu et al.
2010/0152634 A1* 6/2010 Dove ................ A61C 17/0202 601/162
2010/0160838 A1 6/2010 Krespi
2010/0160904 A1 6/2010 McMillan et al.
2010/0167226 A1 7/2010 Altshuler et al.
2010/0167228 A1 7/2010 Rizoiu et al.
2010/0185188 A1 7/2010 Boutoussov et al.
2010/0190133 A1 7/2010 Martinez
2010/0206324 A1 8/2010 Paschke
2010/0209867 A1 8/2010 Becker et al.
2010/0229316 A1 9/2010 Hohlbein et al.
2010/0233645 A1 9/2010 Rizoiu
2010/0233649 A1 9/2010 McPeek et al.
2010/0261136 A1 10/2010 Schulte et al.
2010/0272764 A1 10/2010 Latta et al.
2010/0273125 A1 10/2010 Janssen et al.
2010/0279250 A1 11/2010 Pond et al.
2010/0279251 A1 11/2010 Pond
2010/0330539 A1 12/2010 Glover et al.
2011/0020765 A1 1/2011 Maxwell et al.
2011/0027746 A1 2/2011 McDonough et al.
2011/0027747 A1 2/2011 Fougere et al.
2011/0046262 A1 2/2011 Bublewitz et al.
2011/0070552 A1 3/2011 Bornstein
2011/0072605 A1 3/2011 Steur
2011/0076638 A1 3/2011 Gottenbos et al.
2011/0087605 A1 4/2011 Pono
2011/0096549 A1 4/2011 Boutoussov et al.
2011/0111365 A1* 5/2011 Gharib ................ A61C 17/024 433/81
2011/0117517 A1 5/2011 Bergheim et al.
2011/0129789 A1 6/2011 Rizoiu et al.
2011/0136935 A1 6/2011 Khor et al.
2011/0143310 A1 6/2011 Hunter
2011/0143311 A1 6/2011 Thomas et al.
2011/0151394 A1 6/2011 Rizoiu et al.
2011/0183284 A1 7/2011 Yamanaka et al.
2011/0189627 A1 8/2011 Gharib et al.
2011/0189630 A1 8/2011 Koubi
2011/0198370 A1 8/2011 Ho
2011/0200959 A1 8/2011 Rizoiu et al.
2011/0217665 A1 9/2011 Walsh et al.
2011/0229845 A1 9/2011 Chen
2011/0256503 A1 10/2011 Fraser
2011/0269099 A1 11/2011 Glover et al.
2011/0270241 A1 11/2011 Boutoussov
2011/0281230 A1 11/2011 Rizoiu et al.
2011/0281231 A1 11/2011 Rizoiu et al.
2012/0021375 A1 1/2012 Binner et al.
2012/0065711 A1 3/2012 Netchitailo et al.
2012/0077144 A1 3/2012 Fougere et al.
2012/0094251 A1 4/2012 Mössle
2012/0099815 A1 4/2012 Boutoussov et al.
2012/0135368 A1 5/2012 Rizoiu et al.
2012/0135373 A1 5/2012 Cheng et al.
2012/0141953 A1 6/2012 Mueller
2012/0148979 A1 6/2012 Ruddle
2012/0183926 A1 7/2012 Shalev
2012/0237893 A1 9/2012 Bergheim
2012/0240647 A1 9/2012 Montemurro
2012/0276497 A1 11/2012 Gharib
2012/0282566 A1 11/2012 Rizoiu et al.
2012/0282570 A1 11/2012 Mueller
2013/0040267 A1 2/2013 Bergheim
2013/0066324 A1 3/2013 Engqvist et al.
2013/0084544 A1 4/2013 Boutoussov et al.
2013/0084545 A1 4/2013 Netchitailo et al.
2013/0085485 A1 4/2013 Van Valen et al.
2013/0085486 A1 4/2013 Boutoussov et al.
2013/0086758 A1 4/2013 Boutoussov et al.
2013/0089829 A1 4/2013 Boutoussov et al.
2013/0110101 A1 5/2013 Van Valen et al.
2013/0115568 A1 5/2013 Jelovac et al.
2013/0131656 A1 5/2013 Marincek et al.
2013/0143180 A1 6/2013 Glover et al.
2013/0177865 A1 7/2013 Ostler
2013/0178847 A1 7/2013 Rizoiu et al.
2013/0190738 A1 7/2013 Lukac et al.
2013/0190743 A1 7/2013 Boutoussov et al.
2013/0216980 A1 8/2013 Boronkay et al.
2013/0236857 A1 9/2013 Boutoussov et al.
2013/0273494 A1 10/2013 Boutoussov et al.
2013/0274724 A1 10/2013 Rizoiu
2013/0288195 A1 10/2013 Mueller
2013/0296910 A1 11/2013 Deng
2013/0330684 A1 12/2013 Dillon et al.
2013/0337404 A1 12/2013 Feine
2014/0032183 A1 1/2014 Fisker et al.
2014/0072931 A1 3/2014 Fougere et al.
2014/0080090 A1* 3/2014 Laufer .............. A61C 17/0208 433/80
2014/0087333 A1 3/2014 DiVito et al.
2014/0113243 A1 4/2014 Boutoussov et al.
2014/0124969 A1 5/2014 Blaisdell et al.
2014/0127641 A1 5/2014 Hilscher et al.
2014/0134965 A1 5/2014 Karmi et al.
2014/0147804 A1 5/2014 Yamamoto et al.
2014/0170588 A1 6/2014 Miller et al.
2014/0205965 A1 7/2014 Boutoussov et al.
2014/0220505 A1* 8/2014 Khakpour .......... A61C 17/0202 433/81
2014/0220511 A1 8/2014 DiVito et al.
2014/0242551 A1 8/2014 Downs
2014/0257254 A1 9/2014 Boutoussov et al.
2014/0261534 A1 9/2014 Schepis
2014/0272782 A1 9/2014 Luettgen et al.
2014/0303692 A1 10/2014 Pignatelli et al.
2014/0342303 A1 11/2014 Altshuler et al.
2014/0349246 A1 11/2014 Johnson et al.
2015/0010878 A1 1/2015 Seibel et al.
2015/0017599 A1 1/2015 Marincek et al.
2015/0017607 A1 1/2015 Nelson et al.
2015/0030991 A1 1/2015 Sung et al.
2015/0044630 A1 2/2015 Gharib et al.
2015/0044631 A1* 2/2015 Lifshitz ................. A61C 3/025 433/81
2015/0056567 A1 2/2015 Fregoso et al.
2015/0056570 A1 2/2015 Kansal
2015/0125811 A1 5/2015 Lifshitz et al.
2015/0126984 A1 5/2015 Boutoussov et al.
2015/0147715 A1 5/2015 Breysse
2015/0147717 A1 5/2015 Taylor et al.
2015/0150650 A1 6/2015 Netchitailo et al.
2015/0173850 A1 6/2015 Garrigues et al.
2015/0182283 A1 7/2015 Boutoussov et al.
2015/0190597 A1 7/2015 Zachar et al.
2015/0216398 A1 8/2015 Yang et al.
2015/0216597 A1 8/2015 Boutoussov et al.
2015/0216622 A1 8/2015 Vartanian et al.
2015/0230865 A1 8/2015 Sivriver et al.
2015/0268803 A1 9/2015 Patton et al.
2015/0277738 A1 10/2015 Boutoussov et al.
2015/0283277 A1 10/2015 Schafer et al.
2015/0327964 A1 11/2015 Bock
2015/0335410 A1 11/2015 Zhao
2015/0342679 A1 12/2015 Boutoussov et al.
2015/0359672 A1 12/2015 Van Valen et al.
2015/0367142 A1 12/2015 Kazic et al.
2015/0374471 A1 12/2015 Stangel et al.
2016/0022392 A1 1/2016 Chang et al.
2016/0067149 A1 3/2016 Kishen
2016/0095679 A1 4/2016 Khakpour
2016/0100921 A1 4/2016 Ungar
2016/0113733 A1 4/2016 Pond et al.
2016/0113745 A1 4/2016 Golub et al.
2016/0128815 A1 5/2016 Birdee et al.
2016/0135581 A1 5/2016 Pai
2016/0149370 A1 5/2016 Marincek et al.
2016/0149372 A1 5/2016 Marincek et al.
2016/0220200 A1 8/2016 Sandholm et al.
2016/0270889 A1 9/2016 Casabonne et al.
2016/0334283 A1 11/2016 Scurtescu et al.
2016/0367346 A1 12/2016 Gharib

(56) References Cited

U.S. PATENT DOCUMENTS

| | | | |
|---|---|---|---|
| 2017/0027646 | A1 | 2/2017 | DivVito et al. |
| 2017/0036253 | A1 | 2/2017 | Lukac et al. |
| 2017/0056143 | A1 | 3/2017 | Hyun |
| 2017/0189149 | A1 | 7/2017 | Golub et al. |
| 2017/0196658 | A1 | 7/2017 | Schoeffel |
| 2017/0197071 | A1 | 7/2017 | Gottenbos |
| 2017/0216579 | A1 | 8/2017 | Becker et al. |
| 2017/0265965 | A1 | 9/2017 | Chow et al. |
| 2017/0274220 | A1 | 9/2017 | Ertl et al. |
| 2017/0281305 | A1 | 10/2017 | Bergheim |
| 2017/0281312 | A1 | 10/2017 | Khakpour et al. |
| 2017/0300220 | A1 | 10/2017 | Boutoussov et al. |
| 2017/0325889 | A1 | 11/2017 | DiVito et al. |
| 2017/0340413 | A1 | 11/2017 | Burns et al. |
| 2017/0340523 | A1 | 11/2017 | Guzman |
| 2018/0008347 | A9 | 1/2018 | DeVito et al. |
| 2018/0021104 | A1 | 1/2018 | Duncan et al. |
| 2018/0104020 | A1 | 4/2018 | Boutoussov et al. |
| 2018/0125608 | A1 | 5/2018 | Gottenbos et al. |
| 2018/0140865 | A1 | 5/2018 | Boutoussov et al. |
| 2018/0214247 | A1 | 8/2018 | Sharma et al. |
| 2018/0228581 | A1 | 8/2018 | Ouyang |
| 2018/0228582 | A1 | 8/2018 | Shin |
| 2018/0257962 | A1 | 9/2018 | Montemurro |
| 2019/0059996 | A1 | 2/2019 | Duncan et al. |
| 2019/0117078 | A1 | 4/2019 | Sharma et al. |
| 2019/0142516 | A1 | 5/2019 | Boutoussov et al. |
| 2019/0175401 | A1 | 6/2019 | Van Valen et al. |
| 2019/0282332 | A1 | 9/2019 | Lifshitz et al. |
| 2019/0336219 | A9 | 11/2019 | DiVito |
| 2020/0030067 | A1 | 1/2020 | Khakpour |
| 2020/0069402 | A1 | 3/2020 | Gharib |
| 2020/0085534 | A1 | 3/2020 | Kim et al. |
| 2020/0139146 | A1 | 5/2020 | Khakpour |
| 2020/0179209 | A1 | 6/2020 | Boutoussov et al. |
| 2020/0197143 | A1 | 6/2020 | Snyder et al. |
| 2020/0205934 | A1 | 7/2020 | Groves, Jr. et al. |
| 2020/0253369 | A1 | 8/2020 | De Gentile et al. |
| 2020/0253702 | A1 | 8/2020 | De Gentile et al. |
| 2020/0254586 | A1 | 8/2020 | Sanders et al. |
| 2020/0268491 | A1 | 8/2020 | Shotton et al. |
| 2020/0281688 | A1 | 9/2020 | Lares et al. |
| 2020/0297455 | A1 | 9/2020 | Bergheim |
| 2020/0330184 | A1 | 10/2020 | Boutoussov et al. |
| 2020/0347191 | A1 | 11/2020 | Gomurashvili |
| 2020/0360108 | A1 | 11/2020 | Gomurashvili et al. |
| 2021/0038344 | A1 | 2/2021 | Khakpour |
| 2021/0068921 | A1 | 3/2021 | Bergheim |
| 2021/0069756 | A1 | 3/2021 | Lukac et al. |
| 2021/0077234 | A1 | 3/2021 | Gharib et al. |
| 2021/0082562 | A1 | 3/2021 | Patton et al. |
| 2021/0085435 | A1 | 3/2021 | Bergheim |
| 2021/0106402 | A1 | 4/2021 | Khakpour et al. |
| 2021/0121275 | A1 | 4/2021 | Parham et al. |
| 2021/0145538 | A1 | 5/2021 | Boutoussov et al. |
| 2021/0153937 | A1 | 5/2021 | Duncan et al. |
| 2021/0186824 | A1 | 6/2021 | Gomurashvili et al. |
| 2021/0386510 | A1 | 12/2021 | Li et al. |
| 2021/0386532 | A1 | 12/2021 | Khakpour et al. |
| 2022/0015829 | A1 | 1/2022 | Boutoussov et al. |
| 2022/0022961 | A1 | 1/2022 | Boutoussov et al. |
| 2022/0031548 | A1 | 2/2022 | Boutoussov et al. |
| 2022/0054230 | A1* | 2/2022 | Lifshitz .............. A61C 17/0202 |
| 2022/0071735 | A1 | 3/2022 | Boutoussov et al. |
| 2022/0186376 | A1 | 6/2022 | Sivriver et al. |
| 2022/0202525 | A1 | 6/2022 | Boutoussov et al. |
| 2022/0208334 | A1 | 6/2022 | Patton et al. |
| 2022/0233291 | A1 | 7/2022 | DeZan et al. |
| 2022/0296346 | A1 | 9/2022 | Bergheim et al. |
| 2022/0313405 | A1 | 10/2022 | Bergheim et al. |
| 2023/0022589 | A1 | 1/2023 | Bergheim et al. |
| 2023/0028923 | A1 | 1/2023 | Gharib et al. |
| 2023/0310132 | A1 | 10/2023 | Khakpour et al. |
| 2024/0016706 | A1 | 1/2024 | Gomurashvili et al. |
| 2024/0207017 | A1 | 6/2024 | Khakpour et al. |
| 2024/0335252 | A1 | 10/2024 | Bergheim et al. |
| 2025/0160956 | A1 | 5/2025 | DiVito et al. |
| 2025/0177086 | A1 | 6/2025 | Bergheim et al. |
| 2025/0281261 | A1 | 9/2025 | Gharib et al. |
| 2025/0339236 | A1 | 11/2025 | Bergheim et al. |
| 2025/0387211 | A1 | 12/2025 | Bergheim et al. |

FOREIGN PATENT DOCUMENTS

| | | | |
|---|---|---|---|
| CH | 658604 | | 11/1986 |
| CN | 2189448 | Y | 2/1995 |
| CN | 1127982 | | 7/1996 |
| CN | 1390112 | | 1/2003 |
| CN | 2693189 | Y | 4/2005 |
| CN | 2936192 | Y | 8/2007 |
| CN | 101022852 | | 8/2007 |
| CN | 200953143 | | 10/2007 |
| CN | 201070397 | Y | 6/2008 |
| CN | 201370644 | Y | 12/2009 |
| CN | 101632849 | A | 1/2010 |
| CN | 103027762 | A | 4/2013 |
| CN | 107080697 | A | 8/2017 |
| CN | 107411976 | | 12/2017 |
| DE | 3708801 | | 9/1988 |
| DE | 4404983 | | 9/1994 |
| DE | 19645644 | | 5/1998 |
| DE | 10248336 | | 5/2004 |
| DE | 102005028925 | | 1/2007 |
| DE | 10-2010-051227 | | 5/2012 |
| EP | 0261466 | | 3/1988 |
| EP | 0436316 | | 7/1991 |
| EP | 0685454 | | 12/1995 |
| EP | 0830852 | | 3/1998 |
| EP | 0902654 | | 8/2004 |
| EP | 1886659 | | 2/2008 |
| EP | 4534039 | | 4/2025 |
| FR | 1225547 | | 7/1960 |
| FR | 2831050 | | 4/2003 |
| GB | 917633 | | 2/1963 |
| GB | 2011305 | | 7/1979 |
| JP | 51-064791 | A | 4/1976 |
| JP | S60195008 | U | 12/1985 |
| JP | H01-313048 | | 12/1989 |
| JP | 05-169039 | A | 9/1993 |
| JP | H07-155335 | | 6/1995 |
| JP | H08-117335 | A | 5/1996 |
| JP | H08-1118 | A | 9/1996 |
| JP | 09-84809 | A | 3/1997 |
| JP | 09-276292 | | 10/1997 |
| JP | 10-33548 | | 2/1998 |
| JP | H11-28219 | A | 2/1999 |
| JP | 11-113927 | A | 4/1999 |
| JP | H11-504843 | | 5/1999 |
| JP | 11-244303 | A | 9/1999 |
| JP | 2000-254153 | A | 9/2000 |
| JP | 2002-209911 | | 7/2002 |
| JP | 2004-313659 | | 11/2003 |
| JP | 3535685 | B2 | 6/2004 |
| JP | 2004-261288 | | 9/2004 |
| JP | 2005-052754 | | 3/2005 |
| JP | 2005-080802 | | 3/2005 |
| JP | 2005-095374 | | 4/2005 |
| JP | 2006-247619 | | 9/2006 |
| JP | 2008-93080 | | 4/2008 |
| JP | 2008-132099 | | 6/2008 |
| JP | 2009-045455 | | 3/2009 |
| JP | 2009-114953 | | 5/2009 |
| JP | 2010-247133 | | 11/2010 |
| JP | 2016-534786 | | 11/2016 |
| KR | 10-2008-0105713 | A | 12/2008 |
| KR | 10-2012-0084897 | A | 7/2012 |
| KR | 10-2013-0022553 | A | 3/2013 |
| KR | 10-2013-0141103 | A | 12/2013 |
| KR | 2004-72508 | Y1 | 5/2014 |
| RU | 2326611 | C1 | 12/2011 |
| TW | M 336 027 | U | 7/2008 |
| WO | WO 1992/004871 | | 4/1992 |
| WO | WO 1992/012685 | | 8/1992 |
| WO | WO 1995/035069 | | 12/1995 |

(56) References Cited

FOREIGN PATENT DOCUMENTS

| | | |
|---|---|---|
| WO | WO 1997/021420 | 6/1997 |
| WO | WO 1998/023219 | 6/1998 |
| WO | WO 1998/025536 | 6/1998 |
| WO | WO 1999/63904 | 12/1999 |
| WO | WO 2000/045731 | 8/2000 |
| WO | WO 2000/074587 | 12/2000 |
| WO | WO 2001/026577 | 4/2001 |
| WO | WO 2001/26735 | 4/2001 |
| WO | WO 2001/036117 | 5/2001 |
| WO | WO 2001/93773 | 12/2001 |
| WO | WO 2002/078644 | 10/2002 |
| WO | WO 2003/086223 | 10/2003 |
| WO | WO 2004/032881 | 4/2004 |
| WO | WO 2006/082101 | 8/2006 |
| WO | WO 2008/120018 | 10/2008 |
| WO | WO 2009/151983 | 12/2009 |
| WO | WO 2011/114718 | 9/2011 |
| WO | WO 2012/074918 | 6/2012 |
| WO | WO 2013/15700 | 1/2013 |
| WO | WO 2013/057519 | 4/2013 |
| WO | WO 2013/061251 | 5/2013 |
| WO | WO 2013/145000 | 10/2013 |
| WO | WO 2013/160888 | 10/2013 |
| WO | WO 2022/099258 | 5/2022 |
| WO | WO 2024/211619 | 10/2024 |

OTHER PUBLICATIONS

Adachi et al; Jet Structure Analyses on High-Speed Submerged Water Jets through Cavitation 110 Noises; pp. 568-574; The Japan Society of Mechanical Engineers International Journal—Series B, vol. 39, No. 3; Nov. 1996.

Ahmad et al., "Ultrasonic Debridement of Root Canals: Acoustic Cavitation and Its Relevance," Journal of Endontics, vol. 14, No. 10, pp. 486-493, Oct. 1988.

Al-Jadaa et al; Acoustic Hypochlorite Activation in Simulated Curved Canals; pp. 1408-1411; Journal of Endodontics, vol. 35, No. 10; Oct. 2009.

Alomairy, Evaluating two techniques on removal of fractured rotary nickel-titanium endodontic instruments from root canals: an in vitro study. J Endod 2009;35:559-62.

Anand et al; Prevention of Nozzle Wear in High-Speed Slurry Jets Using Porous Lubricated Nozzles; pp. 1-13; Department of Mechanical Engineering, The Johns Hopkins University, Oct. 2000.

Anantharamaiah et al; A simple expression for predicting the inlet roundness of micro-nozzles; pp. N31-N39; Journal of Micromechanics and Microengineering, vol. 17; Mar. 21, 2007.

Anantharamaiah et al; A study on flow through hydroentangling nozzles and their degradation; pp. 4582-4594; Chemical Engineering Science, vol. 61; May 2006.

Anantharamaiah et al; Numerical Simulation of the Formation of Constricted Waterjets in Hydroentangling Nozzles Effects of Nozzle Geometry; pp. 31-238; Chemical Engineering Research and Design, vol. 84; Mar. 2006.

Attin et al; Clinical evaluation of the cleansing properties of the nonistrumental technique for cleaning root canals; pp. 929-933; International Endodontic Journal, vol. 35, Issue 11; Nov. 2002.

Bader et al., "Indications and limitations of Er:YAG laser applications in dentistry," archive ouverte UNIGE, http://archive-ouverte.unige.ch. American Journal of Denistry, 2006, vol. 19, No. 3, p. 178-186.

Bahia, et al.: Physical and mechanical characterization and the influence of cyclic loading on the behaviour of nickel-titanium wires employed in the manufacture of rotary endodontic instruments. Int Endod. J. 2005;38:795-801.

Batchelor et al; Analysis of the stability of axisymmetric jets; pp. 529-551; Journal of Fluid Mechanics, vol. 14; Dec. 1962.

Begenir et al; Effect of Nozzle Geometry on Hydroentangling Water Jets: Experimental Observations; pp. 178-184; Textile Research Journal, vol. 74; Feb. 2004.

Begenir, Asli; The Role of Orifice Design in Hydroentanglement; Thesis submitted to North Carolina State University; dated Dec. 2002, in 107 pages.

Borkent et al; Is there gas entrapped on submerged silicon wafers? Visualizing nano-scale bubbles with cavitation; pp. 225-228; Solid State Phenomena, vol. 134 (2008); available online Nov. 2007.

Bremond et al; Cavitation on surfaces; pp. S3603-S3608; Journal of Physics: Condensed Matter, vol. 17; Oct. 28, 2005.

Brennen, Christopher E.; Fission of collapsing cavitation bubbles; pp. 153-166; Journal of Fluid Mechanics, vol. 472; Dec. 2002.

Buchanan, "Closed-System Negative Pressure Irrigation: A Serious Inflection Point in Root Canal Cleaning," Apr. 1, 2020. https://www.dentistrytoday.com/articles/10666.

Chang et al; Effects of Inlet Surface Roughness, Texture, and Nozzle Material on Cavitation; pp. 299-317; Atomization and Sprays, vol. 16 (2006).

Charara, et al.: "Assessment of apical extrusion during root canal procedure with the novel GentleWave system in a simulated apical environment," J Endod 2015. In Press.

Crump et al., "Relationship of broken root canal instruments to endodontic case prognosis: a clinical investigation," J Am Dent Assoc 1970;80:1341-7.

Culjat et al., "B-Scan Imaging of Human Teeth Using Ultrasound," Apr. 2003, in 4 pages.

D'Arcangelo, et al.: "Broken instrument removal-two cases," J Endod 2000;26:368-70.

Didenkulov et al; Nonlinear Acoustic Diagnostics of Scatterer Spatial Distribution in a Cavitation Jet; Nov. 19-23, 2001, pp. 276-278, XI Session of the Russion Acoustical Society.

Dumouchel, Christophe; On the experimental investigation on primary atomization of liquid streams; pp. 371-422; Experimental Fluids, vol. 45; Jun. 22, 2008.

Ebihara et al.: "Er:YAG laser modification of root canal dentine: Influence of pulse duration, repetitive irradiation and water spray," Lasers in Medical Science, 17(3), 198-207, Aug. 2002.

Eddingfield et al; Mathematical Modeling of High Velocity Water Jets; pp. 25-39; Proceedings of 1st U.S. Water Jet Conference; 1981.

EMS Electro Medical Systems, "Cleaning", in 2 pages, dated 2005, downloaded from http://www.ems-dent.com/en/endodontics cleaning. htm.

Esen, et al.: "Apical microleakage of root-end cavities prepared by CO2 laser," J Endod 2004;30:662-4.

ESI Endo Soft Instruments, EMS Electro Medical Systems, Brochure in 2 pages, downloaded from www.emsdent.com, dated Jan. 2004.

Feldman, et al.: "Retrieving broken endodontic instruments," J Am Dent Assoc. 1974:88:588-91.

Feng et al; Enhancement of ultrasonic cavitation yield by multi-frequency sonication; pp. 231-236; Ultrasonics Sonochemistry, vol. 9; Oct. 2002.

Flint, E. B., et al., "The Temperature of Cavitation", Science, vol. 253, Sep. 20, 1991, pp. 1397-1399.

Foldyna et al; Acoustic wave propagation in high-pressure system; pp. e1457-e1460; Ultrasonics vol. 44 (Supplement 1); Jun. 8, 2006.

Fors, et al.: "A method for the removal of broken endodontic instruments from root canals," J Endod 1983;9:156-9.

Fuchs, "Ultrasonic Cleaning: Fundamental Theory and Application," Blackstone-Ney Ultrasonics, Jamestown, NY, May 2002.

G.E. Reisman and C.E. Brennen, "Pressure Pulses Generated by Cloud Cavitation", FED—vol. 236, 1996 Fluids Engineering Division Conference, vol. 1, pp. 319-328, ASME 1996.

G.E. Reisman, Y.-C. Wang and C.E. Brennen, "Observations of shock waves in cloud cavitation", J. Fluid Mech. (1998), vol. 355, pp. 255-283.

Gencoglu, et al.: Comparison of the different techniques to remove fractured endodontic instruments from root canal systems. Eur J Dent 2009;3:90-5.

Ghassemieh et al; Effect of Nozzle Geometry on the Flow Characteristics of Hydroentangling Jets; pp. 444-450; Textile Research Journal, vol. 73; May 2003.

Ghassemieh et al; The effect of nozzle geometry on the flow characteristics of small water jets; pp. 1739-1753; Proceedings of

(56) References Cited

OTHER PUBLICATIONS the Institute of Mechanical Engineers, Part C: Mechanical Engineering Science, vol. 12, Sep. 2006.
Gordon, DMD, et al., "The antimicrobial efficacy of the erbium, chromium:yttrium-scandium-gallium-garnet laser with radial emitting tips on root canal dentin walls infected with *Enterococcus faecalis*," Research—Advances in Dental Products, JADA, vol. 138, Jul. 2007. RFT endolase, Root Calan Therapy System for the Waterlase MD YSGG Laser, Peer-Reviewed Clincal Articles.
Haapasalo, et al.: "Tissue dissolution by a novel multisonic ultracleaning system and sodium hypochlorite," J Endod 2014;40:1178-81.
Hahn et al; Acoustic resonances in the bubble plume formed by a plunging water jet; pp. 1751-1782; Proceedings of the Royal Society of London A, vol. 459; May 16, 2003.
Haikel, et al.: Dynamic and cyclic fatigue of engine-driven rotary nickel-titanium endodontic instruments. J Endod 1999;25:434-40.
Haikel, et al.: Dynamic fracture of hybrid endodontic hand instruments compared with traditional files. J Endod 1991;17:217-20.
Hashish, Mohamed; Experimental Studies of Cutting with Abrasive Waterjets; pp. 402-416; Proceedings of 2nd American Water Jet Conference; 1983.
Herbert et al; Cavitation pressure in water; pp. 041603-1 to 041603-22; Physical Review E, vol. 74; Oct. 2006.
Hiroyasu, Hiro; Spray Breakup Mechanism from the Hole-Type Nozzle and its Applications; pp. 511-527; Atomization and Sprays, vol. 10 (2000).
Hmud R. et al. "Cavitational Effects in Aqueous Endodontic Irrigants Generated by Near-Infrared Lasers", Journal of Endodontics, vol. 36, Issue 2, Feb. 2010, available online Dec. 4, 2009, in 4 pages.
Hoque et al; Air entrainment and associated energy dissipation in steady and unsteady plunging jets at free surface; pp. 37-45; Applied Ocean Research, vol. 30; May 2008.
Hulsmann: "Methods for removing metal obstructions from the root canal," Endod Dent Traumatol 1993;9:223-37.
Hydrocision Products: SpineJet Hydrosurgery; system webpage in 2 pages, copyright 2010, downloaded from http://www.hydrocision.com on Apr. 22, 2010.
Hydrocision SpineJet XL HydroSurgery System; Brochure in 2 pages, copyright 2004-2006, downloaded from http://www.hydrocision.com on Apr. 22, 2010.
Iqbal, et al.: "A comparison of three methods for preparing centered platforms around separated instruments in curved canals," J Endod 2006; 32:48-51.
Jackson et al; Nozzle Design for Coherent Water Jet Production; pp. 53-89; Proceeding of the 2nd US Water Jet Conference; May 1983.
Jonathan, et al., "Comparative Evaluation of the Antibacterial Efficacy of Four Different Disinfection Techniques in Minimally Instrumented Experimentally Infected Root Canals: An in vitro Study," International Journal of Laser Densitry, May-Aug. 2013; 3(2): 49-54.
Junge et al; Cell Detachment Method Using Shock-Wave-Induced Cavitation; pp. 1769-1776; Ultrasound in Medicine & Biology, vol. 29, No. 12; Dec. 2003.
Kalumuck et al; Development of High Erosivity Well Scale Cleaning Tools; pp. 1-36; Dynaflow, Inc.; Report 98012 conducted under Contract No. DE-FG07-981013684 for the US Dept. of Energy; Jul. 1999, in 36 pages.
Karasawa et al; Effect of Nozzle Configuration on the Atomization of a Steady Spray; pp. 411-426; Atomization and Sprays, vol. 2 (1992).
Kato, Hiroharu; Utilization of Cavitation for Environmental Protection—Killing Planktons and Dispersing Spilled Oil; pp. 1-8; In CAV2001: Fourth International Symposium on Caviation; California Institute of Technology, Pasadena, CA; dated Jun. 2001.
Kimura et al., "Lasers in endodontics: a review," International Endodontic Journal, 33, 173-185, 2000.
Lee et al; The efficacy of ultrasonic irrigation to remove artificially placed dentine debris from different-sized simulated plastic root canals; pp. 607-612; International Endodontic Journal, vol. 37; May 2004.
Li et al; Cavitation Resonance; pp. 031302-1 to 031302-7; Journal of Fluids Engineering, vol. 130; Mar. 2008.
Lienhard V et al; Velocity Coefficients for Free Jets From Sharp-Edged Orifices; pp. 13-17; Reprinted from Mar. 1984, vol. 106, Journal of Fluids Engineering.
Lin et al; Drop and Spray Formation from a Liquid Jet; pp. 85-105; Jan. 1998: vol. 30; Annual Review of Fluid Mechanics.
Linfield, Kevin William; A Study of the Discharge Coefficient of Jets From Angled Slots and Conical Orifices; Thesis submitted to Dept. of Aerospace Science and Engineering; University of Toronto; dated 2000; in 148 pages.
Lukac et al.: "Photoacoustic Endodontics Using the Novel SWEEPS Er:YAG Laser Modality," Journal of the Laser and Health Academy, vol. 2017, No. 1; www.laserlaserandhealth.com.
Lumkes, Jr., Control Strategies for Dynamic Systems: Design and Implementation, 2002, pp. 117-118.
Lussi et al; A new non-instrumental technique for cleaning and filling root canals; pp. 1-6; International Endodontic Journal, vol. 28; Jan. 1995.
Lussi et al; A Novel Noninstrumented Technique for Cleansing the Root Canal System; pp. 549-553; Journal of Endodontics, vol. 19, No. 11; Nov. 1993.
Lussi et al; In vivo performance of the new non-instrumentation technology (NIT) for root canal obturation; pp. 352-358; International Endodontic Journal, vol. 35; Apr. 2002.
Ma, et al.: "In vitro study of calcium hydroxide removal from mandibular molar root canals," J Endod 2015;41:553-8.
Madarati, et al.: "Efficiency of a newly designed ultrasonic unit and tips in reducing temperature rise on root surface during the removal of fractured files," J Endod 2009;35:896-9.
Madarati, et al.: "Management of intracanal separated instruments," J Endod 2013;39:569-81.
Madarati, et al.: "Qualtrough AJ. Factors contributing to the separation of endodontic files," Br Dent J 2008;204:241-5.
Maximum Dental Inc ., "Canal Clean Max", "Intra Canal Irrigation and Aspiration Device", and "SonicMax, Endo-Perio Sonic Handpiece", in 3 pages, downloaded from www.dentalmaximum.com on May 8, 2008.
Molina, et al.: "Histological evaluation of root canal debridement of human molars using the GentleWaveTM system," J Endod 2015;41:1702-5.
Nammour et al.: "External temperature during KTP-nd:YAG laser irradiation in root canals: An in vitro study," Lasers in Medical Science, 19(1), 27-32, Jul. 2004.
Nevares, et al.: "Success rates for removing or bypassing fractured instruments: a prospective clinical study," J Endod 2012;38:442-4.
Ohrn et al; Geometric Effects on Spray Cone Angle for Plain-Orifice Atomizers; pp. 253-268; Atomization and Sprays, vol. 1 (1991).
Ohrn et al; Geometrical Effects on Discharge Coefficients for Plain-Orifice Atomizers; pp. 137-153; Atomization and Sprays, vol. 1, No. 2 (1991).
Phinney, Ralph E.; The breakup of a turbulent liquid jet in a gaseous atmosphere; pp. 689-701; J. Fluid Mechanics, vol. 60, Part 4; Oct. 1973.
Piezon Master 600 Ultrasound a la carte, EMS Electro Medical Systems, EMS SA FA-319.EN ed. Mar. 2009; Brochure dated Mar. 2009, in 2 pages.
Quinn, W. R.; Experimental study of the near field and transition region of a free jet issuing from a sharp-edged elliptic orifice plate; pp. 583-614; European Journal of Mechanics—B/Fluids, vol. 26; Jul.-Aug. 2007; available online Dec. 2006.
Ramamurthi et al; Disintegration of Liquid Jets from Sharp-Edged Nozzles; pp. 551-564; Atomization and Sprays, vol. 4 (1994).
Reitz et al; Mechanism of atomization of a liquid jet; pp. 1730-1742; Physics Fluids, vol. 25, No. 10; Oct. 1982.
Roth, et al.: "A study of the strength of endodonitc files: potential for torsional breakage and relative flexibility," J Endod 1983; 9:228-32.
Ruddle, "Nonsurgical retreatment," J Endod 2004;30:827-45.

(56) References Cited

OTHER PUBLICATIONS

Sabeti, "Healing of apical periodontitis after endodontic treatment with and without obturation in dogs," Journal of Endodontics, Jul. 2006, pp. 628-633.
Sallam et al; Liquid breakup at the surface of turbulent round liquid jets in still gases; pp. 427-449; International Journal of Multiphase Flow, vol. 28; Mar. 2002.
Sawant et al; Effect of hydrodynamic cavitation on zooplankton: A tool for disinfection; pp. 320-328; Biochemical Engineering Journal, vol. 42, Issue 3; Dec. 2008.
Schoop et al., "The impact of an erbium, chromium: yttrium-scandium-gallium-garnet laser with radial-firing tips on endodontic treatment," Lasers in Medical Science, vol. 24(1):59-65, published online Nov. 20, 2007.
Schoop et al., "The use of the erbium, chromium:yttrium-scandium-gallium-garnet laser in endodontic treatment", JADA, vol. 138(7):949-955 (2007).
Schneider, et al.: "A comparison of canal preparations in straight and curved root canals," Oral Surg Oral Med Oral Pathol 1971;32:271-5.
Schneider, et al.: "NIH Image to ImageJ: 25 years of image analysis," Nat Methods 2012;9:671-5.
Shen, et al.: "Factors associated with the removal of fractured NiTi instruments from root canal systems," Oral Surg Oral Med Oral Pathol Oral Radiol Endod 2004;98:605-10.
Shi et al; Comparison-speed liquid jets; Experiments in Fluids, vol. 35; pp. 486-492; Oct. 7, 2003.
Skyttner, "Endodontic instrument separations: evaluation of a patient cases series with separated endodontic instruments and factors related to the treatment regarding separated instruments [thesis]," Stockholm: Karolinska Institutet; 2007.
Sou et al; Effects of cavitation in a nozzle on liquid jet atomization; pp. 3575-3582; International Journal of Heat and Mass Transfer, vol. 50; Mar. 2007.
Souter, et al.: "Complications associated with fractured file removal using an ultrasonic technique," J Endod 2005;31:450-2.
Soyama et al; High-Speed Observation of Ultrahigh-Speed Submerged Water Jets; pp. 411-416; Experimental Thermal and Fluid Science, vol. 12 1996).
Soyama, Hitoshi; High-Speed Observation of a Cavitating Jet in Air; Journal of Fluids Engineering, vol. 127; pp. 1095-1101; Nov. 2005.
Stamos et al., "Retreatodontics and ultrasonics", Journal of Endodontics, vol. 14., No. 1, pp. 39-42, Jan. 1, 1988.
Stamos et al., "Use of ultrasonics in single-visit endodontic therapy," Journal of Endodontics, vol. 13, No. 5, pp. 246-249, May 1, 1987.
Summers, David A; Considerations in the Comparison of Cavitating and Plain Water Jets; pp. 178-184; Rock Mechanics and Explosive Research Center, Rolla, Missouri, 1983.
Summers, David A; The Volume Factor in Cavitation Erosion; Proceedings of 6th International Conference on Erosion by Liquid and Solid Impact; University of Missouri—Rolla; Rolla, Missouri, 1983, in 12 pages.
Suslick, K. S., et al., "The Sonochemical Hot Spot", Journal of the American Chemical Society, vol. 108, No. 18, Sep. 3, 1986, pp. 5641-5642.
Suslick, K. S., et al., "Heterogeneous Sonocatalysis with Nickel Powder", Journal of the American Chemical Society, vol. 109, No. 11, May 27, 1987, pp. 3459-3461.
Suter, et al.: "Probability of removing fractured instruments from root canals," Int Endod J 2005;38:112-23.
Tafreshi et al; Simulating Cavitation and Hydraulic Flip Inside Hydroentangling Nozzles; pp. 359-364; Textile Research Journal, vol. 74, Apr. 2004.
Tafreshi et al; Simulating the Flow Dynamics in Hydroentangling Nozzles: Effect of Cone Angle and Nozzle Aspect Ratio; pp. 700-704; Textile Research Journal, vol. 73; Aug. 2003.
Tafreshi et al; The effects of nozzle geometry on waterjet breakup at high Reynolds numbers; pp. 364-371; Experiments in Fluids, vol. 35; Sep. 2, 2003.
Takeda et al., "A comparative study of the removal smear layer by three endodontic irrigants and two types of laser," International Endodontic Journal, 32, 32 39, 1999.
Takeda et al., "Comparative Study about the Removal of Smear Layer by Three Types of Laser Devices," Journal of Clinical Laser Medicine & Surgery, vol. 16, No. 2, 1998 Mary Ann Liebert, Inc. pp 117-122.
Terauchi, et al.: "Evaluation of the efficiency of a new file removal system in comparison with two conventional systems," J. Endod 2007;33:585-8.
Ward Jr.: "The use of an ultrasonic technique to remove a fractured rotary nickel-titanium instrument from the apical third of a curved root canal," Aust Endod J 2003;29:25-30.
Wohlemuth et al.: "Effectiveness of GentleWave System in Removing Separated Instruments," JOE, vol. 41, No. 11, Nov. 2015.
Yoldas, et al.: "Perforation risks associated with the use of Masserann endodontic kit drills in mandibular molars," Oral Surg Oral Med Oral Pathol Oral Radiol Endod 2004;97:513-7.
Yu et al.: "Study on removal effects of filling materials and broken files from root canals using pulsed Nd:YAG laser," J Clin Laser Med Surg 2000;18:23-8.
Zehnder, "Root Canal Irrigants", Journal of Endodontics, vol. 32, No. 5, pp. 389-398, May 2006.
Zuo et al; An Attribution of Cavitation Resonance: Volumetric Oscillations of Cloud; pp. 152-158; Journal of Hydrodynamics, vol. 21; Apr. 2009.
European Extended Search Report re EP Application No. 09743801.4, dated Jun. 4, 2012.
European Extended Search Report, dated Sep. 22, 2011, for EP Application No. 07755777.5, in 7 pages.
European Extended Search Report, re EP Application No. 08728345.3, dated Mar. 3, 2014.
European Extended Search Report, re EP Application No. 10830829.7, dated Oct. 21, 2015.
European Extended Search Report, re EP Application No. 11835265.7, dated Mar. 30, 2016, in 9 pages.
European Extended Search Report, re EP Application No. 13763534.8, dated Jan. 15, 2016.
European Extended Search Report, re EP Application No. 13775073.3, dated Nov. 3, 2015.
International Search Report and Written Opinion dated Apr. 11, 2008, for International Appl. No. PCT/US07/09633, in 8 pages.
International Preliminary Report on Patentability dated Oct. 30, 2008, for International Appl. No. PCT/US07/09633, in 5 pages.
International Search Report and Written Opinion dated Aug. 8, 2008, for International Appl. No. PCT/US08/52122, in 18 pages.
International Preliminary Report on Patentability dated Aug. 6, 2009, for International Appl. No. PCT/US08/52122, in 13 pages.
International Search Report and Written Opinion dated Jul. 29, 2009, for International Appl. No. PCT/US09/43386, in 8 pages.
International Preliminary Report and Written Opinion dated Nov. 9, 2010 for International Appl. No. PCT/US09/43386, in 6 pages.
International Search Report and Written Opinion re App. No. PCT/US2010/056620, dated Jan. 12, 2011, in 17 pages.
International Preliminary Report on Patentability re App. No. PCT/US2010/056620, issued May 15, 2012, in 10 pages.
International Preliminary Report on Patentability, re PCT Application No. PCT/US11/57401, mailed Jan. 25, 2013 in 13 pages.
International Search Report and Written Opinion from International Application No. PCT/US2011/057401, Jan. 30, 2012, in 20 pages.
International Search Report and Written Opinion, re PCT Application No. PCT/US 13/32635, mailed Jun. 17, 2013 in 14 pages.
International Search Report and Written Opinion mailed Jun. 28, 2013, re PCT Application No. PCT/US2013/036493, in 21 pages.
International Search Report and Written Opinion, re PCT Application No. PCT/US2013/077286, mailed May 27, 2014.
International Preliminary Report on Patentability, re PCT Application No. PCT/US2013/077286, issued Jun. 23, 2015, in 8 pages.
International Search Report and Written Opinion re App. No. PCT/US2014/014732, mailed Jul. 18, 2014.
International Preliminary Report on Patentability re PCT Application No. PCT/US2014/014732, issued Aug. 4, 2015.

(56) References Cited

OTHER PUBLICATIONS

International Preliminary Report on Patentability, re PCT Application No. PCT/US2014/044186, mailed Dec. 29, 2015, in 19 pages.
International Preliminary Report on Patentability, re PCT Application No. PCT/US2014/036451, issued Nov. 3, 2015, 2015, in 11 pages.
International Search Report and Written Opinion, re PCT Application No. PCT/US2015/028360, mailed Sep. 28, 2015, in 25 pages.
Hungarian Written Opinion and Search Report via/re Singapore Application No. 189554, mailed Oct. 13, 2013.
Abad-Gallegos et al, "In vitro evaluation of the temperature increment at the external root surface after Er,Cr:YSGG laser irradiation of the root canal", Med Oral Patol Oral Cir Bucal, vol. 14(12):658-662 (2009).
Abdelkarim-Elafifi et al., "Aerosols generation using Er,Cr:YSGG laser compared to rotary instruments in conservative dentistry: A preliminary study", J Clin Exp Dent, vol. 13(1):e30-6 (2021).
Altundasar et al., "Ultramorphological and histochemical changes after ER,CR:YSGG laser irradiation and two different irrigation regimes", Basic Research—Technology, vol. 32(5):465-468 (2006).
Arnabat et al., "Bactericidal activity of erbium, chromium: yttrium-scandium-gallium-garnet laser in root canals", Lasers Med Sci vol. 25:805-810 (2010).
Aydin, et al., "Fracture resistance of root-filled teeth after cavity preparation with conventional burs, Er:YAG and Er,Cr:YSGG Lasers," Eur Oral Res 2018; 52: 59-63.
Aydin et al., "Efficacy of erbium, chromium-doped yttrium, scandium, gallium and garnet laser-activated irrigation compared with passive ultrasonic irrigation, conventional irrigation, and photodynamic therapy against *Enterococcus faecalis*", ResearchGate, https://www.researchgate.net/publication/338906248, Article in The Journal of Contemporary Dental Practice, Jan. 2020.
Beader et al., "Efficacy of three different lasers on eradication of *Enterococcus faecalis* and *Candida albicans* biofilms in root canal system", ResearchGate, https://www.researchgate.net/publication/316287465, Article in Photomedicine and Laser Surgery, Apr. 2017.
Betancourt et al., "Er,Cr:YSGG laser-activated irrigation and passive ultrasonic irrigation: comparison of two strategies for root canal disinfection", Photobiomodulation, Photomedicine, and Laser Surgery, vol. 383(2):91-97 (2020).
Betancourt et al., "ER/Cr:YSGG laser-activation enhances antimicrobial and antibiofilm action of low concentrations of sodium hypochlorite in root canals", Antibiotics, vol. 8(232):1-10 (2019).
Biolase Study, Efficacy of the Er,Cr:YSGG laser in the Laser Assisted Endodontic Treatment, Blind Randomized Clinical Trial, in 332 pages, Apr. 11, 2014. URL: https://repositorio-aberto.up.pt/handle/10216/82757.
Bolhari et al., "Efficacy of Er,Cr:YSGG laser in removing smear layer and debris with two different output powers", Photomedicine and Laser Surgery, vol. 32(10):527-532 (2014).
Bornstein, Eric. "Proper use of Er: YAG lasers and contact sapphire tips when cutting teeth and bone: scientific principles and clinical application." Dentistry today 23.8 (2004): 84-89.
Cheng et al., "Evaluation of the bactericidal effect of Nd:YAG, Er:YAG, Er,Cr:YSGG laser radiation, and antimicrobial photodynamic therapy (aPDT) in experimentally infected root canals", Lasers in Surgery and Medicine, vol. 44:824-831 (2012).
Christo, Jonathan Dr., "Efficacy of Sodium Hypochlorite and Er,Cr:YSGG Laser Energised Irrigation Against an *Enterococcus faecalis* Biofilm", Sep. 2012.
Christo et al., "Efficacy of low concentrations of sodium hypochlorite and low-powered Er,Cr:YSGG laser activated irrigation against an *Enterococcus faecalis* biofilm", International Endodontic Journal, vol. 49:279-286 (2016).
De Groot, et al., "Laser-activated irrigation within root canals: cleaning efficacy and flow visualization," Int Endod J. 2009;42:1077-83.
De Moor et al., "Laser induced explosive vapor and cavitation resulting in effective irrigation of the root canal. Part 2: Evaluation of the efficacy", Lasers in Surgery and Medicine, vol. 41:520-523 (2009).
De Moor et al., "Efficacy of ultrasonic versus laser-activated irrigation to remove artificially placed dentin debris plugs", Basic Research Technology, JOE vol. 36(9):1580-1583 (2010).
Dewsnup et al., "Comparison of bacterial reduction in straight and curved canals using erbium, chromium: Yttrium-Scandium-Gallium-Garnet laser treatment versus a traditional irrigation technique with sodium hypochlorite", Basich Research—Technology, JOE, vol. 36(4):725-728 (2010).
Divito et al., "The Photoacoustic Efficacy of an Er:YAG Laser with Radial and Stripped Tips on Root Canal Dentin Walls: An SEM Evaluation," J Laser Dent 2011; 19(1):156-161.
El-Din, et al., "Antibacterial Effect of Er,Cr:YSGG Laser Under Various Irradiation Conditions in Root Canals Contaminated With *Enterococcus faecalis*," Alexandria Dental Journal. (2017) vol. 42 pp. 108-112.
Erken, "Evaluation of apically extruded debris using two niti systems associated with two irrigation techniques in primary teeth", ResearchGate, https://www.researchgate.net/publication/310465261, The Journal of Clinical Pediatric Dentistry, Nov. 2016.
Fogarty, "What is an acoustic wave?", https://www.allthescience.org/what-is-an-acoustic-wave.htm, 7 pages (2022).
George, M.D.Sc., Ph.D, et al., "Thermal Effects from Modified Endodontic Laser Tips Used in the Apical Third of Root Canals with Erbium-Doped Yttrium Aluminium Garnet and Erbium, Chromium-Doped Yttrium Scandium Gallium Garnet Lasers," Photomedicine and Laser Surgery vol. 28, No. 2, 2010, a Mary Ann Liebert, Inc., pp. 161-165.
George et al., "Laser activation of endodontic irrigants with improved conical laser fiber tips for removing smear layer in the apical third of the root canal", Basic Research—Technology, JOE, vol. 34(12):1524-1521 (2008).
George et al., Apical extrusion of root canal irrigants when using Er:YAG and ER,Cr:YSGG lasers with optical fibers: An in vitro dye study, Basic Research—Technology, JOE, vol. 34(6):706-708 (2008).
Gregorcic et al., "Optodynamic energy-conversion efficiency during an Er: YAG-laser-pulse delivery into a liquid through different fiber-tip geometries." Journal of biomedical optics 17.7 (2012): 075006.
Guidotti R, et al., "Er:YAG 2,940-nm laser fiber in endodontic treatment: a help in removing smear layer," Lasers Med Sci. 2014;29:69-75.
Ishizaki et al., "Thermographical and morphological studies of Er,Cr:YSFF laser irradiation on root canal walls", Photomedicine and Laser Surgery, vol. 22(4):291-297 (2004).
JLAD, Fall 2015, Issue 3.
Jiang, et al., "Evaluation of a Sonic Device Designed to Activate Irrigant in the Root Canal," Journal of endodontics, 36(1): 143-146, Jan. 2010.
Koch et al., "Irrigant flow during photon-induced photoacoustic streaming (PIPS) using Particle Image Velocimetry (PIV)", Clin. Oral Invest. vol. 20:381-386 (2016).
Kolnick, Justin. "Managing Refractory Endodontic Disease With Radial Apical Cleansing (Report of Two Clinical Cases)." (Sep. 2018).
Kourti, E et al., "Smear Layer Removal By Means of Erbium, Chromium: Yttrium Scandium Gallium Garnet (er,Cr:YSGG) Laser Irradiatin From Apical Third of Mesial Root Canals," International Journal of Recent Scientific Research, vol. 12, Issue, 05, pp. 41804-41808, May 2021.
Kustarci et al., "Efficacy of laser activated irrigation on apically extruded debris with different preparation systems", Photomedicine and Laser Surgery, vol. 33(7):384-389 (2015).
Licata et al., "Effectiveness of a new method of disinfecting the root canal, using Er,Cr:YSGG laser to kill *Enterococcus faecaslis* in an infected tooth model", ResearchGate, https://www.researchgate.net/publication/255688995, Article in Lasers in Medical Science, Aug. 2013.

(56) References Cited

OTHER PUBLICATIONS

Lopes et al., "Evaluation of chemical and morphological changes in radicular dentin after different final surface treatments", Micros. Res. Tech. vol. 81:973-979 (2018).
Lukac, et al., "Modeling Photoacoustic Efficiency during Erbium Laser Endodontics," Journal of the Laser and Health Academy, vol. 2013, No. 2.
Lukac, et al., "Wavelength dependence of photoninduced photoacoustic streaming technique for root canal irrigation," Journal of Biomedical Optics 21(7), 075007 (Jul. 2016).
Macedo et al., "Cavitation measurement during sonic and ultrasonic activated irrigation", Journal of Endodontics, vol. 40(4):580-583 (2014).
Martins et al., "Outcome of Er,Cr:YSGG laser-assisted treatment of teeth with apical periodontitis: A blind randomized clinical trial", Photomedicine and Laser Surgery, vol. 32(1):3-9, (2014).
Martins et al., "Efficacy of Er,Cr:YSGG laser with endodontical radial firing tips on the outcome of endodontic treatment: blind randomized controlled clinical trial with six-month evaluation", Lasers Med Sci vol. 28:1049-1055 (2013).
Matsumoto, et al. "Visualization of irrigant flow and cavitation induced by Er: YAG laser within a root canal model." Journal of endodontics 37.6 (2011): 839-843.
Matsuoka et al., "Morphological study of the Er,Cr:YSGG laser for root canal preparation in mandibular incisors with curved root canals", Photomedicine and Laser Surgery, vol. 23(5):480-484 (2005).
Merigo, et al., "Bactericidal effect of Er,Cr:YSGG laser irradiation on endodontic biofilm: An ex vivo study," Journal of Photochemistry & Photobiology, B: Biology 218 (2021) 112185.
Minas et al., "In vitro investigation of intra-canal dentine-laser beam interaction aspects: II. Evaluation of ablation zone extent and morphology", Lasers Med Sci vol. 25:867-872 (2010).
Montero-Miralles, et al., "Comparative study of debris and smear layer removal with EDTA and Er,Cr:YSGG laser," J Clin Exp Dent. 2018; 10(6):e598-602.
Mrochen, et al. "Erbium: yttrium-aluminum-garnet laser induced vapor bubbles as a function of the quartz fiber tip geometry Erbium: yttrium-aluminum-garnet laser induced vapor bubbles as a function of the quartz fiber tip geometry." Journal of biomedical optics 6.3 (2001): 344-350.
Nagahashi et al., "Er:YAG laser-induced cavitation can activate irrigation for the removal of intraradicular biofilm", Scientific Reports, https://doi.org/10.1038/s41598-022-08963-x, pp. 1-11 (2022).
Nasher et al., "Debris and smear layer removal in curved root canals using the dual wavelength Er,Cr:YSGG/Diode 940 nm laser and the XP_Endoshaper and finisher technique", ResearchGate, https://www.researchgate.net/publication/338755431, Article in Photobiomodulation Photomedicine and Laser Surgery, Jan. 2020.
Nowazesh et al., "Efficacy of root canal preparation by Er,Cr:YSGG laser irradiation with crown-down technique in Vitro", Photomedicine and Laser Surgery, vol. 23(2):196-201 (2005).
Olivi, et al., "Lasers in Endodontics," Scientific Background and Clinical Applications, 2016.
Peeters et al., "Efficacy of smear layer removal at the root tip by using ethylenediaminetetraacetic acid and erbium, chromium: Yttrium, candium, and gallium garnet laser", Basic Research—Technology, JOE, vol. 37(11):1585-1589 (2011).
Peeters, et al., "Measurement of temperature changes during cavitation generated by an erbium, chromium: Yttrium, scandium, gallium garnet laser," OJST. 2012;2:286-91.
Peeters et al., "Extrusion of irrigant in open apex teeth with periapical lesions following laser-activated irrigation and passive ultrasonic irrigation", Iranian Endodontic Journal, vol. 13(2):169-175 (2018).
Peeters et al., "Measurement of pressure changes during laser-activated irrigant by an erbium,chronium: yttrium, scandium, gallium, garnet laser", Lasers in Medical Science, DOI 10.1007/s10103-014-1605-5, Springer-Verlag London.
Peeters et al., "Radiographic examination of apical extrusion of root canal irrigants during cavitation induced by Er,Cr:YSGG laser irradiation: an in vivo study", Clin Oral Invest vol. 17:2105-2112 (2013).
Prasad, et al., Introduction to biophotonics. John Wiley & Sons, 2003.
Race et al., "Efficacy of laser and ultrasonic-activated irrigation on eradicating a mixed-species biofilm in human mesial roots", Australian Endodontic Journal, vol. 45:317-324 (2019).
Rahimi et al., "Comparison of the effect of Er,Cr-YSGG laser ultrasonic retrograde root-end cavity preparation on the integrity of root apices", Journal of Oral Science, vol. 52(1):77-81 (2010).
Roots—international magazine of endodontics, Issn 2193-4673, vol. 15, Issue Apr. 2019.
Sen et al., "Comparative safety of needle, EndoActivator, and laser-activated irrigation in overinstrumented root canals", Photomedicine and Laser Surgery, vol. 36(4):198-202 (2018).
Shaheed, et al., "Healing of Apical Periodontitis after Minimally Invasive Endodontics therapy using Er, Dr:YSGG laser: A Prospective Clinical Study," Sys Rev Pharm 2020; 11(2): 135-140.
Silva, et al., "Analysis of Permeability and Morphology of Root Canal Dentin After ER,Cr:YSGG Laser Irradiation," Photomedicine and Laser Surgery vol. 28, No. 1, pp. 103-108, 2010.
Soares et al., "Impact of Er,Cr:YSGG laser therapy on the cleanliness of the root canal walls of primary teeth", Basic Research—Technology, JOE, vol. 34(4):474-477 (2008).
Thoms, "Detection of intraoral lesions using a fluorescence camera", Proceedings of SPIE, vol. 6137:1-8 (2006).
Tokuc et al., "The bactericidal effect of 2780 nm Er,Cr:YSGG laser combined with 940 nm diode laser in *Enterococcus faecalis* elimination: A comparative study", Photobiomodulation, hotomedicine, and Laser Surgery, vol. XX(XX):1-6 (2019).
Vibration definition & meaning, Merriam-Webster, https://www.merriam-webster.com/dictionary/vibration (2023).
Merriam Webster definition of transversal, https://www.merriam-webster.com/dictionary/transversal , (2024).
Wang et al., "Evaluation of the bactericidal effect of Er,Cr:YSGG, and Nd:YAG lasers in experimentallyl infected root canals", Basic Research—Biology, JOE, vol. 33(7):830-832 (2007).
Yamazaki et al., "Effects of erbium, chromium:YSGG laser irradiation on root canal walls: A scanning electron microscopic and thermographic study", Journal of Endodontics, vol. 27(1):9-12 (2001).
European Extended Search Report, dated Mar. 8, 2018, for EP Application No. 17201637.0.
Examination Communication in European application No. 17201637.0, dated Apr. 2, 2019, in 5 pages.
European Extended Search Report re EP Application No. 14187012.1, dated Mar. 3, 2015, in 10 pages.
European Search Report, re EP Application No. 13763534.8, dated Jun. 20, 2022.
European Exam Report, re EP Application No. 14733409.8, dated May 3, 2018.
European Exam Report, re EP Application No. 14742409.7, dated Aug. 21, 2018.
International Preliminary Report on Patentability and Written Opinion, mailed Oct. 14, 2014, re PCT Application No. PCT/US2013/036493, in 14 pages.
International Search Report and Written Opinion, re PCT Application No. PCT/US2014/044186, mailed Jan. 21, 2015, in 19 pages.
International Preliminary Report on Patentability, re PCT Application No. PCT/US2015/028360, Issued Nov. 10, 2016, in 14 pages.
European Extended Search Report, re EP Application No. 18159618.0, dated Jul. 2, 2018.
European Extended Search Report, re EP Application No. 18195055.1, dated Mar. 13, 2019.
International Search Report and Written Opinion for PCT/US2021/072194, mailed on Jan. 27, 2022, in 15 pages.
International Preliminary Report on Patentability and Written Opinion for PCT/US2021/072194, dated May 8, 2023, in 12 pages.
European Extended Search Report, re EP Application No. 14765398.4, dated May 31, 2017.

(56) References Cited

OTHER PUBLICATIONS

European Supplemental Search Report, re EP Application No. 07837261.2, dated May 3, 2012.
European Supplemental Search Report, re EP Application No. 10746978.5, dated Dec. 10, 2015.
European Extended Search Report, EP Application No. 20176387.7, dated Oct. 29, 2020.
International Search Report and Written Opinion, re PCT Application No. PCT/US2014/036451, mailed Jan. 21, 2015, in 20 pages.
International Search Report and Written Opinion, re PCT Application No. PCT/US2017/057206, mailed Jan. 25, 2018, in 18 pages.
International Search Report and Written Opinion, re PCT Application No. PCT/US2018/050753, mailed Dec. 5, 2018, in 35 pages.
International Search Report and Written Opinion, re PCT Application No. PCT/US07/18664, mailed Sep. 23, 2008.
International Preliminary Report on Patentability, re PCT Application No. PCT/US07/18664, issued Feb. 24, 2009.
International Search Report and Written Opinion, re PCT Application No. PCT/US2014/030435, mailed Aug. 28, 2014.
International Preliminary Report on Patentability, re PCT Application No. PCT/US2014/030435, issued Sep. 15, 2015.
International Search Report and Written Opinion, re PCT Application No. PCT/US2010/025775, mailed Apr. 23, 2010.
International Preliminary Report on Patentability, re PCT Application No. PCT/US2010/025775, issued Sep. 6, 2011.
International Preliminary Report on Patentability, re PCT Application No. PCT/US2019/052990, issued Mar. 23, 2021.
International Invitation to Pay Additional Fees, re PCT Application No. PCT/US2019/052990, mailed Dec. 5, 2019.
International Search Report and Written Opinion, re PCT Application No. PCT/US2019/052990, mailed Feb. 6, 2020.
International Preliminary Report on Patentability, re PCT Application No. PCT/US2017/057206, issued on Apr. 23, 2019, in 8 pages.
International Preliminary Report on Patentability, re PCT Application No. PCT/US2018/050753, issued Mar. 17, 2020, in 10 pages.
International Search Report and Written Opinion, re PCT Application No. PCT/US2019/035884, mailed Sep. 12, 2019, in 18 pages.
International Preliminary Report on Patentability, re PCT Application No. PCT/US2019/035884, issued Dec. 8, 2020, in 1 pages.
International Invitation to Pay Additional Fees, re PCT Application No. PCT/US2020/033837, mailed Sep. 3, 2020.
International Search Report and Written Opinion, re PCT Application No. PCT/US2020/033837, mailed Oct. 28, 2020.
International Search Report and Written Opinion, re PCT Application No. PCT/US2020/031189, mailed Jul. 31, 2020, in 17 pages.
International Search Report and Written Opinion, re PCT Application No. PCT/US2020/033157, mailed Aug. 26, 2020, in 17 pages.
International Invitation to Pay Additional Fees, re PCT Application No. PCT/US2020/036491, mailed Sep. 18, 2020.
International Search Report and Written Opinion, re PCT Application No. PCT/US2020/036491, mailed Nov. 9, 2020.
International Preliminary Report on Patentability, re PCT Application No. PCT/IL2013/050330, dated Oct. 30, 2014.
International Preliminary Report on Patentability, re PCT Application No. PCT/IL2014/050924, dated May 6, 2016.
International Search Report and Written Opinion, re PCT Application No. PCT/IL2013/050330, mailed Jul. 30, 2013.
International Search Report and Written Opinion, re PCT Application No. PCT/IL2014/050924, mailed Mar. 19, 2015.
International Search Report and Written Opinion for PCT/US2021/053844, dated Mar. 11, 2022, in 22 pages.
Australian Office Action (Examination Report No. 2), re Application No. 2007240780, dated May 3, 2013.
Australian Office Action, re Application No. 2007240780, dated Mar. 29, 2012.
Extended European Search Report and Written Opinion for European Application No. 21175783.6, dated Dec. 13, 2021, in 8 pages.
Extended European Search Report for European Application No. 22167511.9, dated Aug. 11, 2022, in 8 pages.
European Search Report in application No. EP 21160099.4, dated Sep. 26, 2022.
European Search Report in application No. EP 201902210.0, dated Jan. 5, 2023.
European Search Report in application No. EP 22216260.4, dated Jul. 12, 2023, in 8 pages.
Extended European Search Report in application No. EP 23178563.5, dated Dec. 6, 2023, in 7 pages.
European Search Report in application No. EP 18789278.1, dated Jan. 24, 2024, in 7 pages.
European Search Report in application No. EP 23214493.1, dated Jun. 11, 2024, in 8 pages.
Extended European Search Report in application No. EP 24164011.9, dated Aug. 21, 2024, in 8 pages.
International Search Report and Written Opinion in application No. PCT/US2024/023144, mailed on Sep. 12, 2024, in 22 pages.
Examination Report in Australian application No. 2020277399, dated Oct. 19, 2024, in 3 pages.
Biolase's Opening Brief in Support of Its Motion for Leave to File Early Motion for Summary Judgmentand for Limited Stay Pending Resolution of Early Motin for Summary Judgment, *Pipstek, LLC* v. *Biolase, Inc*., Civil Action No. 23-011-JPM, filed Feb. 2, 2024.
DNTLworks ProCart II, posted May 22, 2017 online, retreived on Mar. 1, 2025, at: https://www.independentdental.com/dntlworks-procart-II-self-contained-treatment-console-2200/ (2025).
Isopropyl alcohol; Chemical Book, in 2 pages (2023).
Lion's Dental Mobile Treatment Console, posted Jun. 12, 2021 online, retrieved on Mar. 1, 2025, at: https://lionsdentalsupply.com/ProCart-TDS-Mobile-Dental-Treatment-Console (2025).
Sonendo GentleWave System, posted Dec. 5, 2022 online, retrieved on Mar. 1, 2025, at: https://sonendo.com/gentlewave-system (2025).
Super-Port Portable Dental System, posted Nov. 6, 2021 online, retrieved on Mar. 1, 2025, at: https://www.bpr-swiss.com/en/portable-units/super-port/ (2025).
Wright et al., "Memorandum Report: Excluded individuals employed by service providers in Medicaid Managed Care networks, OEI-07-09-00632", In: Office of Inspector General, Sep. 27, 2012, retrieved on Feb. 14, 2020 from https://oig.hhs.gov/oei/reports/oei-07-09-00632.pdf> entire document.
Extended European Search Report in application No. EP 24181269, dated Dec. 11, 2024, in 10 pages.
Search Report and Written Opinion in Brazilian application No. BR 112021023338-5, dated Jul. 6, 2025, in 4 pages.
Extended European Search Report in application No. EP 24214983.9, dated Jul. 31, 2025, in 17 pages.
International Preliminary Report on Patentability in application No. PCT/US2024/023144, dated Oct. 2, 2025, in 12 pages.
European Search Report in application No. EP 21802866.0, dated Mar. 6, 2026, in 10 pages.

* cited by examiner

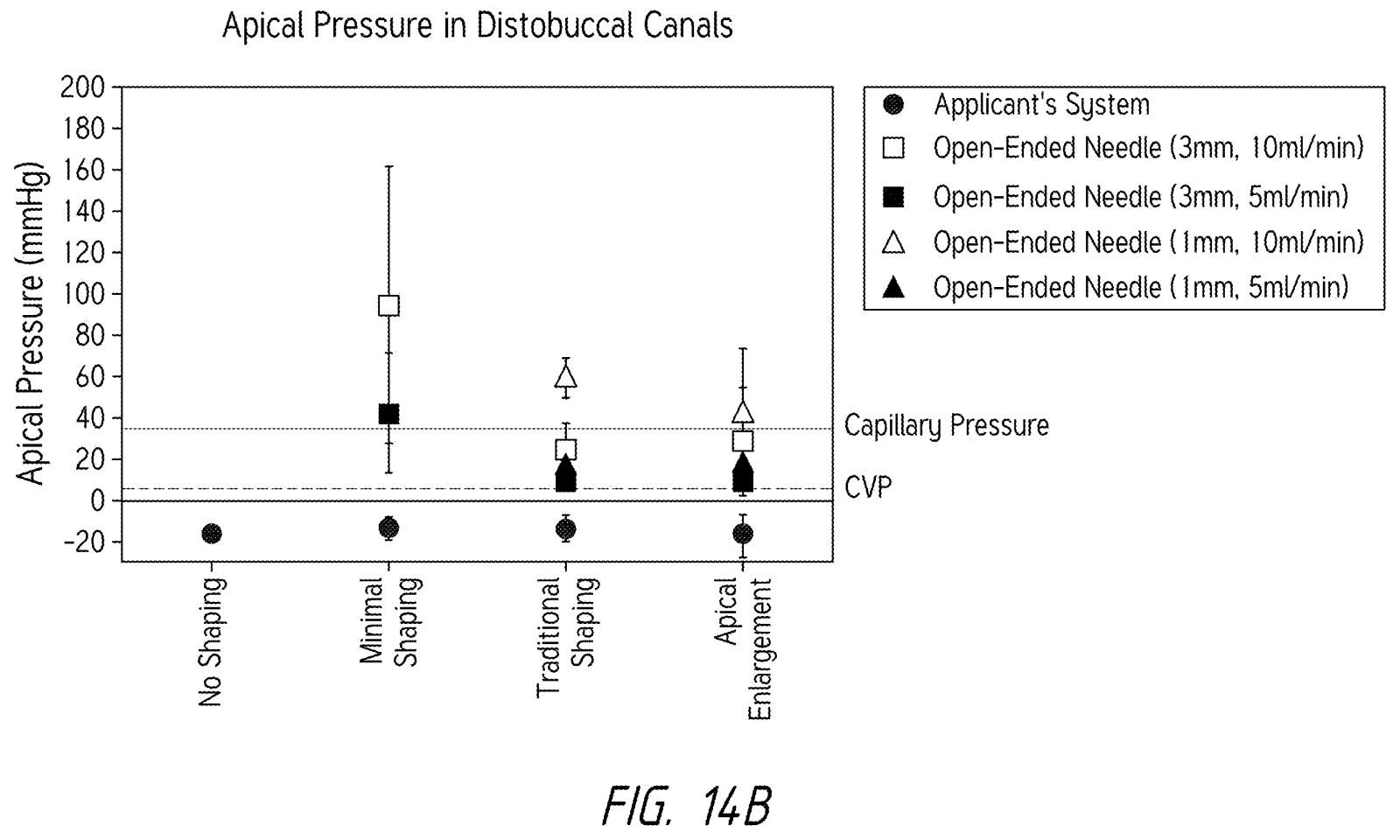

Apical Pressure in Distobuccal Canals

Apical Pressure (mmHg)

200
180
160
140
120
100
80
60
40
20
0
-20

No Shaping
Minimal Shaping
Traditional Shaping
Apical Enlargement

Capillary Pressure
CVP

Applicant's System
Open-Ended Needle (3mm, 10ml/min)
Open-Ended Needle (3mm, 5ml/min)
Open-Ended Needle (1mm, 10ml/min)
Open-Ended Needle (1mm, 5ml/min)

FIG. 14B

APPARATUS AND METHODS FOR CLEANING TEETH AND ROOT CANALS

CROSS-REFERENCE TO RELATED APPLICATIONS

This application is a continuation of U.S. patent application Ser. No. 14/137,937, filed Dec. 20, 2013, entitled "APPARATUS AND METHODS FOR CLEANING TEETH AND ROOT CANALS," and claims the benefit of U.S. Provisional Patent Application No. 61/740,351, filed Dec. 20, 2012, entitled "APPARATUS AND METHODS FOR CLEANING TEETH AND ROOT CANALS," and U.S. Provisional Patent Application No. 61/907,345, filed Nov. 21, 2013, entitled "APPARATUS AND METHODS FOR CLEANING TEETH AND ROOT CANALS," each of which is hereby incorporated by reference herein in its entirety and for all purposes.

BACKGROUND

Field of the Invention

The present disclosure relates generally to dentistry and endodontics and to apparatus, methods, and compositions for treating a tooth.

Description of the Related Art

In conventional dental and endodontic procedures, mechanical instruments such as drills, files, brushes, etc. are used to clean unhealthy material from a tooth. For example, dentists often use drills to mechanically break up carious regions (e.g., cavities) in a surface of the tooth. Such procedures are often painful for the patient and frequently do not remove all the diseased material. Furthermore, in conventional root canal treatments, an opening is drilled through the crown of a diseased tooth, and endodontic files are inserted into the root canal system to open the canal spaces and remove organic material therein. The root canal is then filled with solid matter such as gutta percha or a flowable obturation material, and the tooth is restored. However, this procedure will not remove all organic material from the canal spaces, which can lead to post-procedure complications such as infection. In addition, motion of the endodontic file and/or other sources of positive pressure may force organic material through an apical opening into periapical tissues. In some cases, an end of the endodontic file itself may pass through the apical opening. Such events may result in trauma to the soft tissue near the apical opening and lead to post-procedure complications. Accordingly, there is a continuing need for improved dental and endodontic treatments.

SUMMARY

Various non-limiting aspects of the present disclosure will now be provided to illustrate features of the disclosed apparatus, methods, and compositions. Examples of apparatus, methods, and compositions for endodontic treatments are provided.

In one embodiment, an apparatus for treating a tooth is disclosed. The apparatus can comprise a chamber having an access port which places the chamber in fluid communication with a treatment region of the tooth when the chamber is coupled to tooth. The apparatus can include a fluid motion generator coupled to the chamber, the fluid motion generator configured to direct fluid across the access port to generate fluid motion in the chamber.

In another embodiment, an apparatus for treating a tooth is disclosed. The apparatus can comprise a chamber configured to couple to a tooth. A fluid motion generator can be disposed in the chamber and configured to generate a rotational motion of fluid in the chamber. When the chamber is coupled to the tooth, the fluid motion generator can be positioned outside the tooth.

In another embodiment, a method of treating a tooth is disclosed. The method can include positioning a fluid motion generator near an access opening of the tooth. The fluid motion generator can be activated to pass a stream of fluid across the access opening of the tooth. Fluid motion can be generated at a treatment region of the tooth.

In another embodiment, a method of treating a tooth is disclosed. The method can include coupling a chamber to the tooth. The chamber can have a fluid motion generator disposed therein. The fluid motion generator can be disposed outside the tooth. The fluid motion generator can be activated to generate a rotational motion of fluid in the chamber.

In another embodiment, an apparatus for treating a tooth is disclosed. The apparatus can include a chamber configured to couple to a tooth. The apparatus can include a fluid motion generator disposed in the chamber and configured to generate a rotational motion of fluid in the chamber.

In yet another embodiment, an apparatus for treating a tooth is disclosed. The apparatus can comprise a chamber configured to couple to the tooth. A plurality of fluid motion generators can be disposed in the chamber.

In another embodiment, a method for treating a tooth is disclosed. The method can include coupling a chamber to the tooth. The chamber can include a plurality of fluid motion generators disposed therein. The plurality of fluid motion generators can be activated to clean the tooth.

In another embodiment, a method for treating a tooth is disclosed. The method can include forming an access opening in the tooth. The method can include applying a tooth seal around a perimeter of the access opening, the tooth seal having a peripheral boundary. The method can include positioning a chamber within the peripheral boundary of the tooth seal to secure the chamber to the tooth seal.

For purposes of this summary, certain aspects, advantages, and novel features of certain disclosed inventions are summarized. It is to be understood that not necessarily all such advantages may be achieved in accordance with any particular embodiment of the invention. Thus, for example, those skilled in the art will recognize that the inventions disclosed herein may be embodied or carried out in a manner that achieves one advantage or group of advantages as taught herein without necessarily achieving other advantages as may be taught or suggested herein. Further, the foregoing is intended to summarize certain disclosed inventions and is not intended to limit the scope of the inventions disclosed herein.

BRIEF DESCRIPTION OF THE DRAWINGS

The foregoing and other features, aspects, and advantages of the embodiments of the apparatus and methods of cleaning teeth are described in detail below with reference to the drawings of various embodiments, which are intended to illustrate and not to limit the embodiments of the invention. The drawings comprise the following figures in which:

FIGS. 14A-14B are plots relating to the pressure measured at or near the apical opening of the root canal during treatment.

DETAILED DESCRIPTION

The present disclosure describes apparatus, methods, and compositions for performing dental and/or endodontic procedures. Various embodiments disclosed herein can effectively and safely remove unhealthy material from a treatment region of a tooth, e.g., from within the tooth and/or from outside surfaces of the tooth. In particular, the embodiments disclosed herein can remove unhealthy materials, such as unhealthy organic matter, inorganic matter, pulp tissue, caries, stains, calculus, plaque, biofilm, bacteria, pus, decayed tooth matter, and food remnants from the treatment region without substantially damaging healthy dentin or enamel. For example, the disclosed apparatus, methods, and compositions advantageously may be used with root canal cleaning treatments, e.g., to efficiently remove unhealthy or undesirable materials such as organic and/or inorganic matter from a root canal system and/or to disinfect the root canal system. Organic material (or organic matter) includes organic substances typically found in healthy or diseased teeth or root canal systems such as, for example, soft tissue, pulp, blood vessels, nerves, connective tissue, cellular matter, pus, and microorganisms, whether living, inflamed, infected, diseased, necrotic, or decomposed. Inorganic matter includes calcified tissue and calcified structures, which are frequently present in the root canal system. In some embodiments, the root canal can be filled with an obturation material (e.g., a flowable obturation material that can be hardened into a solid or semi-solid state, gutta percha or other solid or semi-solid materials) after treatment of the root canal.

I. Overview of Various Disclosed Embodiments

A. System Overview

Figure 1A:
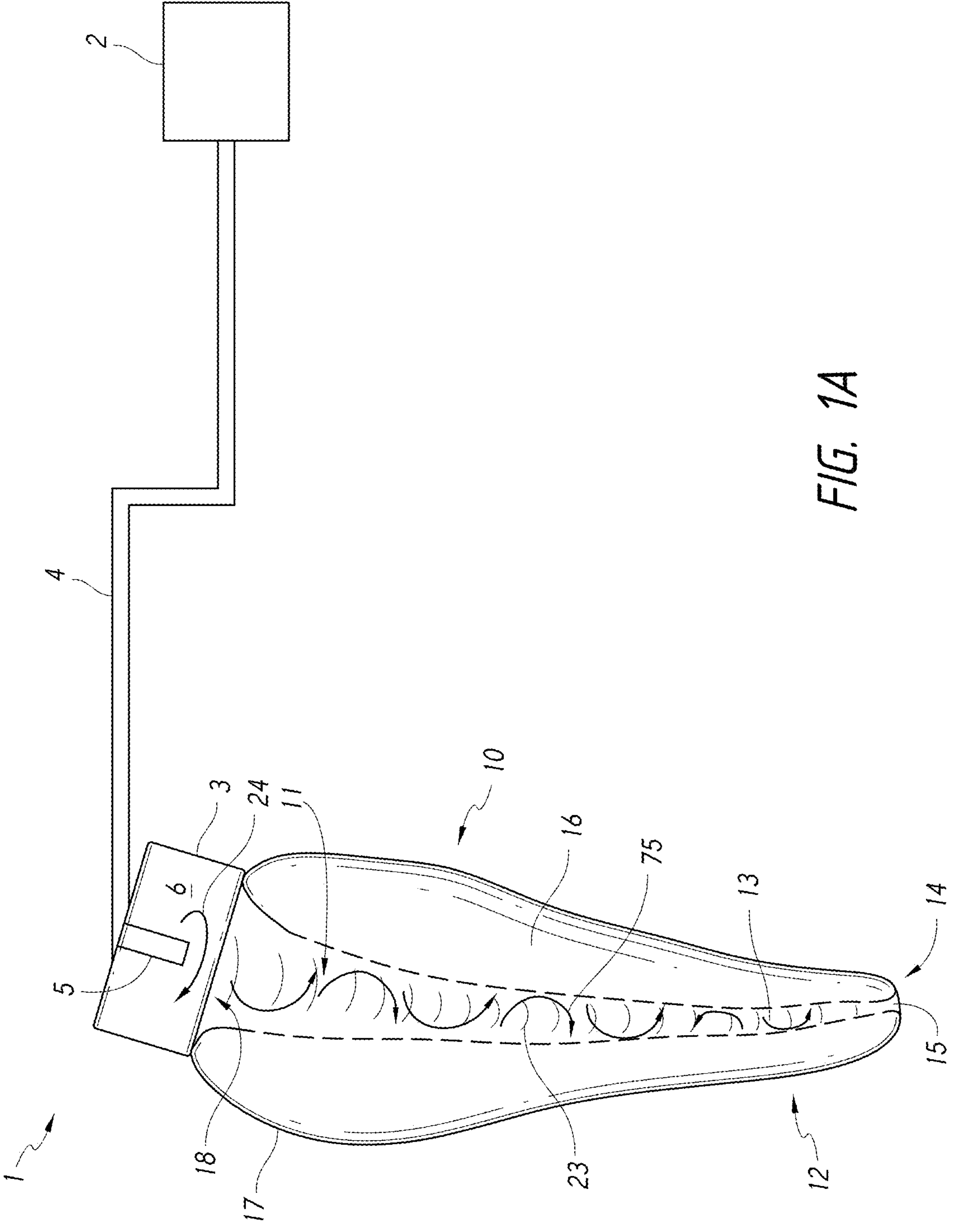
FIG. 1A is a schematic diagram of a system that includes components capable of removing unhealthy or undesirable materials from a root canal tooth.

FIG. 1A is a schematic diagram of a system 1 that includes components capable of removing unhealthy or undesirable materials from a tooth 10. The tooth 10 illustrated in FIG. 1A is a premolar tooth, e.g., a tooth located between canine and molar teeth in a mammal such as a human. The tooth 10 includes hard structural and protective layers, including a hard layer of dentin 16 and a very hard outer layer of enamel 17. A pulp cavity 11 is defined within the dentin 16. The pulp cavity 11 comprises one or more root canals 13 extending toward an apex 14 of each root 12. The pulp cavity 26 and root canal 13 contain dental pulp, which is a soft, vascular tissue comprising nerves, blood vessels, connective tissue, odontoblasts, and other tissue and cellular components. Blood vessels and nerves enter/exit the root canal 13 through a tiny opening, the apical foramen or apical opening 15, near a tip of the apex 14 of the root 12. It should be appreciated that, although the tooth 10 illustrated herein is a premolar, the embodiments disclosed herein can advantageously be used to treat any suitable type of tooth, including molars, canines, incisors, etc.

As illustrated in FIG. 1A, the system 1 can be used to remove unhealthy materials (such as organic and inorganic matter) from an interior of the tooth 10, e.g., from the root canal 13 of the tooth 10. For example, an endodontic access opening 18 can be formed in the tooth 10, e.g., on an occlusal surface, a buccal surface, or a lingual surface. The access opening 18 provides access to a portion of a pulp cavity 11 of the tooth 10. The system 1 can include a console 2, a pressure wave generator 5, and a coupling member 3 adapted to couple to the tooth 10. The coupling member 3 can define a chamber 6 configured to retain fluid therein. One or more conduits 4 can electrically, mechanically, and/or fluidly connect the console 2 with the coupling member 3 and pressure wave generator 5. The console 2 can include a control system and various fluid management systems configured to operate the pressure wave generator 5 during a treatment procedure.

As explained herein, the system 1 can be used in cleaning procedures to clean substantially the entire root canal system. In other embodiments, such as obturation procedures, the system 1 can be used to fill substantially the entire root canal system with an obturation or filler material. For example, in various embodiments disclosed herein, the pressure wave generator 5 can generate pressure waves 23 of sufficient power and relatively low frequencies to produce fluid motion 24 in the chamber 6—such that the pressure wave generators 5 disclosed herein can act as a fluid motion generator—and can generate pressure waves of sufficient power and relatively higher frequencies to produce surface effect cavitation on a dental surface, either inside or outside the tooth. That is, for example, the pressure wave generators 5 disclosed herein can act as fluid motion generators to generate large-scale or bulk fluid motion 24 in or near the tooth 10, and can also generate smaller-scale fluid motion at higher frequencies. In some arrangements, the fluid motion 24 in the chamber 6 can generate induced fluid motion such as vortices 75, swirl 76 (see FIG. 2B), etc. in the tooth 10 and root canal 13 that can clean and/or fill the canal 13.

Figure 1B:
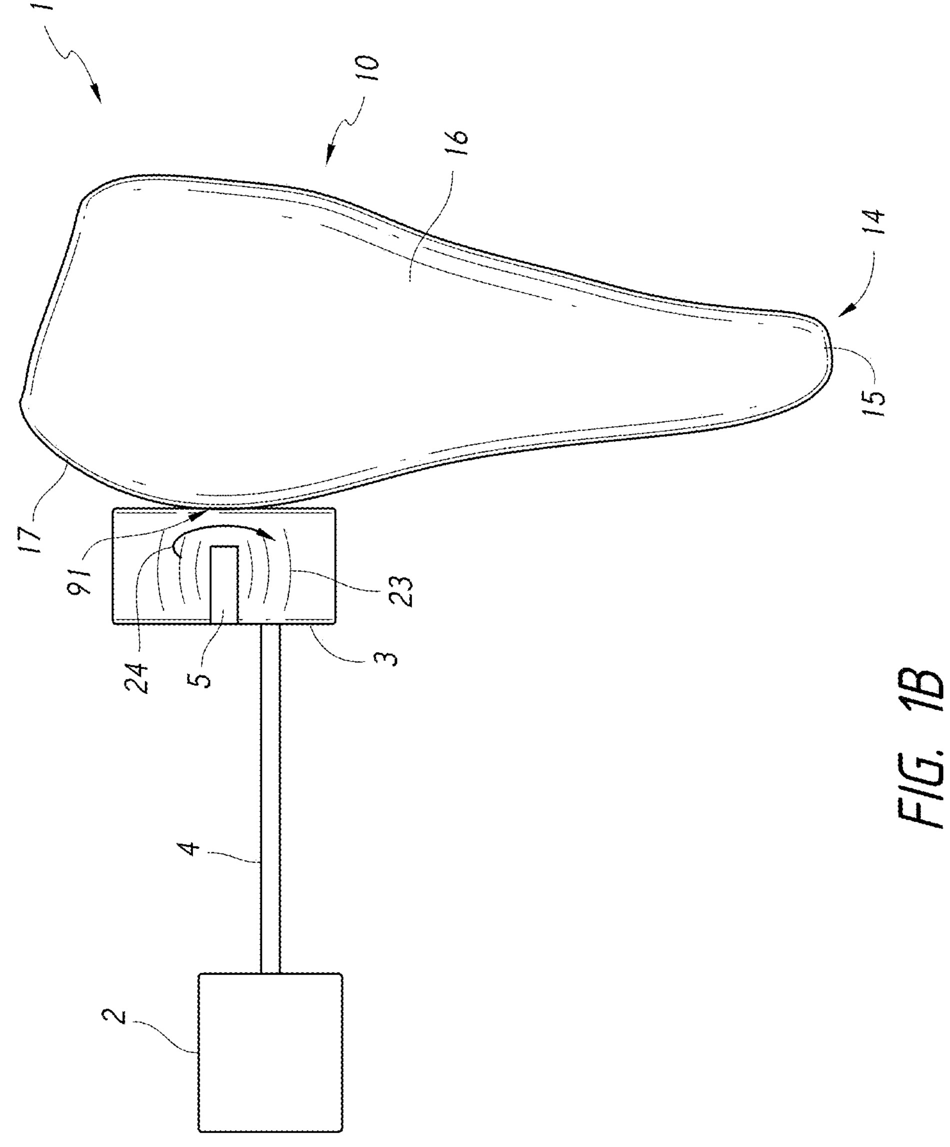
FIG. 1B is a schematic diagram of a system that includes components capable of removing unhealthy or undesirable material from a treatment region on an exterior surface of the tooth.

FIG. 1B is a schematic diagram of a system 1 that includes components capable of removing unhealthy or undesirable material from a treatment region 91 on an exterior surface of the tooth. For example, as in FIG. 1A, the system 1 can include a coupling member 3 and a pressure wave generator 5. The coupling member 3 can communicate with a console 2 by way of one or more conduits 4. Unlike the system 1 of FIG. 1A, however, the coupling member 3 is coupled to a treatment region 91 on an exterior surface of the tooth 10. For example, the system 1 of FIG. 1B can be activated to clean an exterior surface of the tooth 10, e.g., a carious region of the tooth 10. In other embodiments, the system 1 can be activated to fill a treated region on the exterior surface of the tooth 10. As with the embodiment of FIG. 1A, fluid motion 24 can be generated in the coupling member 3 and chamber, which can act to clean and/or fill the treatment region 91 of the tooth 10.

Figure 2A:
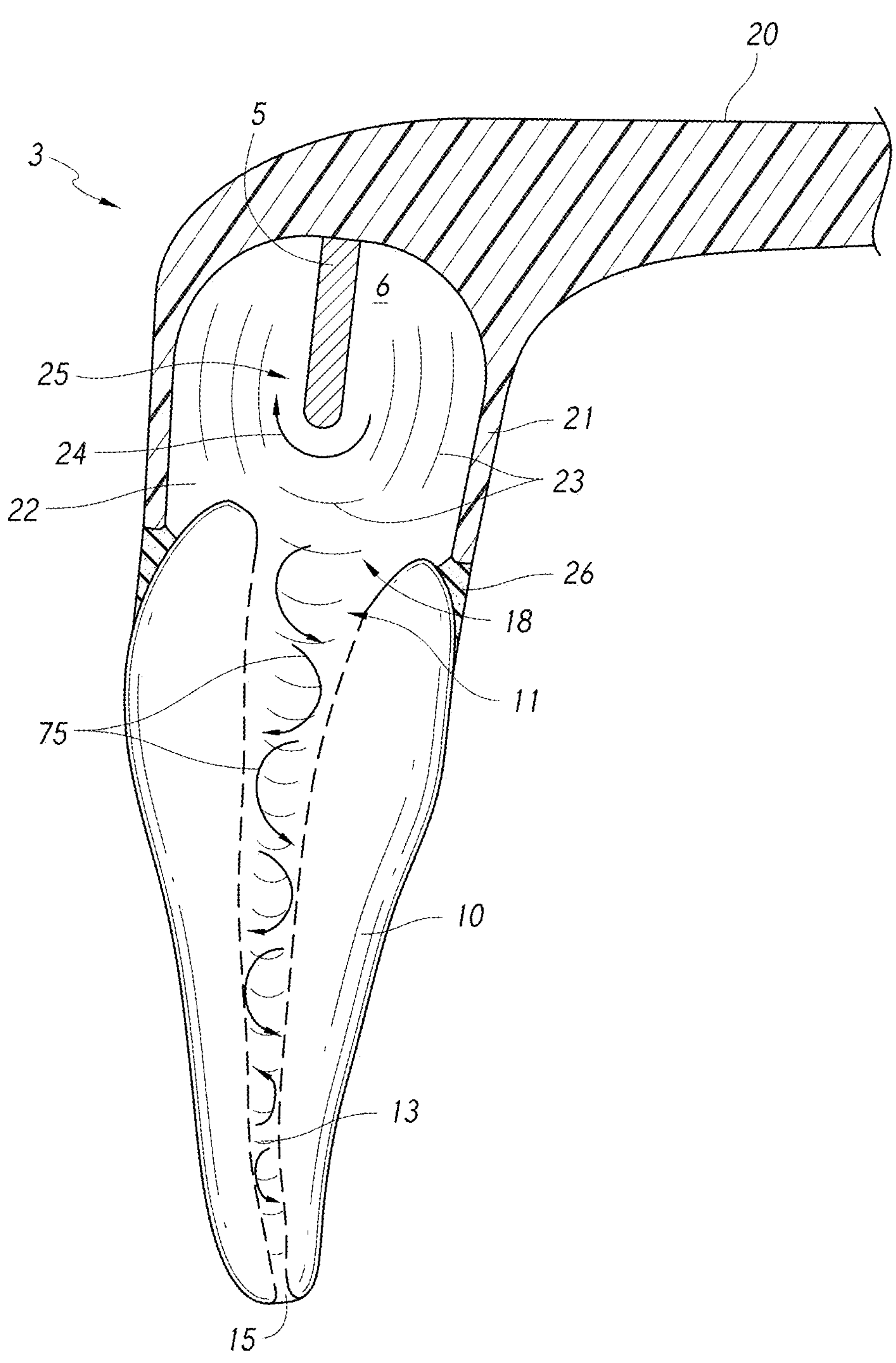
FIG. 2A is a schematic side cross-sectional view of a coupling member coupled to a tooth and a pressure wave generator having a distal end portion disposed in a chamber outside the tooth.

FIG. 2A is a schematic side cross-sectional view of a coupling member 3 coupled to a tooth 10 and a pressure wave generator 5 having a distal end portion 25 disposed in a chamber 6 outside the tooth 10. The coupling member 3 can be adapted to couple to the tooth 10 to provide a stable platform during the dental procedure. The coupling member 3 can define or include a chamber 6 configured to retain fluid 22. For example, the chamber 6 can be substantially filled with a fluid 22 o provide a propagation medium upon and/or through which the pressure wave generator 5 acts. The fluid 22 can be a treatment fluid in various cleaning treatments to substantially clean a treatment region of the tooth (such as in root canal treatments, treatments of carious regions, treatments of plaque and other unhealthy deposits). Alternatively, in obturation treatments, the fluid 22 can comprise a flowable obturation material having a flowable state that can be hardened into a solid state, and the pressure wave generator 5 can be activated to substantially fill or obturate the treatment region. The obturation material, once it fills the treatment region, can be hardened by a catalyst, be it heat, light, or chemical.

Moreover, the chamber 6 and coupling member 3 can prevent fluid 22 and/or waste materials from leaving the tooth 10. In various embodiments, the coupling member 3 can also be configured to regulate fluid pressure in the tooth 10 such that liquid can flow out from the chamber 6 if pressure rises above a predetermined threshold. In the embodiment of FIG. 2A, the coupling member 3 comprises a distal portion 21 of a handpiece 20 (see, e.g., FIG. 3B). For example, the distal portion 21 of the handpiece 20 can be shaped to define walls enclosing the chamber 6. In other embodiments, the coupling member 3 can be applied to the tooth 10 with a mechanical clasp or clamp, a dental adhesive, or by pressure applied by the patient by biting on the coupling member 3. In still other embodiments, a separate cap or fluid retainer can be removably coupled to the distal portion 21 of the handpiece 20.

During a dental treatment, a clinician can apply the coupling member 3 to the tooth 10. As illustrated in FIGS. 1A and 2A, for example, the clinician can apply the coupling member 3 over the access opening 18. The clinician can secure the coupling member 3 to the tooth 10 by way of a tooth seal 26. In some embodiments, one or more alignment features can be applied to align the coupling member 3 to the treatment region of the tooth 10 (see, e.g., FIGS. 8A-8C). In some embodiments, the coupling member 3 can be attached to the tooth 10 in a manner that permits the clinician to rotate or otherwise orient the coupling member 3 and pressure wave generator 5 at a desired orientation relative to the tooth 10 (see, e.g., FIG. 8B). In still other embodiments, the clinician can apply the coupling member 3 and pressure wave generator 5 to an exterior surface of the tooth 10. For example, the clinician can apply the coupling member 3 over a carious region formed near an outer surface of the tooth 10. In yet other embodiments, the clinician or a user can apply the coupling member 3 over an exterior surface of the tooth 10 to remove undesirable dental deposits, such as plaque, calculus, biofilms, etc.

Figure 2B:
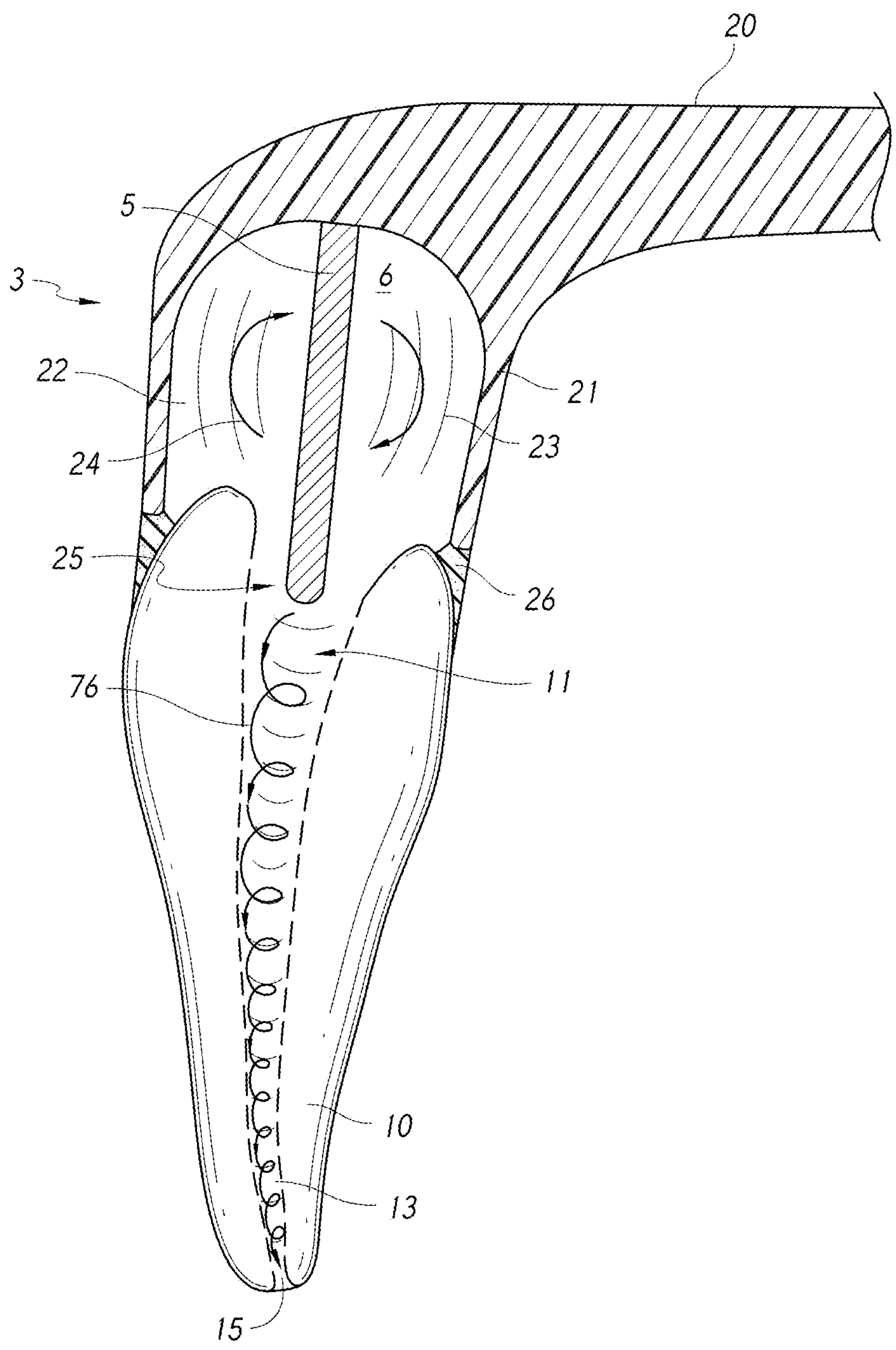
FIG. 2B is a schematic side cross-sectional view of a coupling member coupled to a tooth and a pressure wave generator having a distal end portion disposed inside the tooth.

The pressure wave generator 5 can be coupled with or integrally formed with the coupling member 3. In some embodiments, the pressure wave generator 5 can comprise an elongated member extending from the coupling member 3 through a portion of the chamber 6. As shown in FIGS. 1A and 2A, the distal end portion 25 of the pressure wave generator 5 can be disposed in the chamber 5 defined by the coupling member 3. As shown in FIG. 2A, the distal end portion 25 of the pressure wave generator 5 can be disposed outside the tooth 10, e.g., outside the pulp cavity 11. In other embodiments, the distal end portion 25 of the pressure wave generator 5 can extend into an interior space of the tooth 10, e.g., the pulp cavity 11. For example, FIG. 2B is a schematic side cross-sectional view of a coupling member 3 coupled to a tooth 10 and a pressure wave generator 5 having a distal end portion 25 disposed inside the tooth 10, e.g., inside a portion of the pulp cavity 11.

During cleaning procedures, the distal end portion 25 of the pressure wave generator 5 can be submerged in treatment fluid retained in the chamber 6 by the coupling member 3. The pressure wave generator 5 can be activated, and unhealthy materials (e.g., unhealthy organic matter, inorganic matter, pulp tissue, caries, stains, calculus, plaque, biofilm, bacteria, pus, decayed tooth matter, and food remnants) can be safely and efficiently removed from the tooth 10. For example, in the embodiments illustrated in FIGS. 1A-2B, diseased pulp and other undesirable materials can be removed from the pulp cavity 11 and root canal 13 of the tooth 10.

The pressure wave generator 5 can clean treatment regions of the tooth 10 that are remote from the pressure wave generator 5. For example, in root canal procedures, the pressure wave generator can clean substantially the entire root canal 13, including laterally-extending tubules and various small cracks and crevices that are formed in the tooth 10. Similarly, in other cleaning procedures, such as procedures that clean carious regions, plaque, other dental deposits, etc., the pressure wave generators 5 disclosed herein can clean substantially the entire treatment region of the tooth. The pressure wave generators 5 disclosed herein can therefore improve patient outcomes by removing unhealthy materials from the entire treatment region, which reduces the risk of infection or recurrences of unhealthy material at the treatment region.

In other embodiments, the pressure wave generator 5 can fill or obturate the treatment region of the tooth (e.g., a cleaned root canal space, a cleaned carious region on an exterior surface of the tooth, etc.) after cleaning. For example, in root canal procedures, the disclosed pressure wave generators 5 can substantially fill the entire root canal system, including the main canals, laterally-extending tubules, and various small cracks, spaces, crevices, etc. The improved obturation provided by the pressure wave generators 5 disclosed herein can improve patient outcomes by reducing the risk of infection from unobturated spaces in cleaned canals.

Various embodiments of the pressure wave generator 5 disclosed herein can clean and/or fill the tooth 10 by way of a combination of several different phenomena. For example, the pressure wave generator 5 can generate pressure waves 23 that propagate through the fluid 22 and inside the tooth 10, and the pressure wave generator 5 can also act as a fluid motion generator to generate a motion 24 of fluid 22 in the chamber 6.

The fluid motion 24 generated by the fluid motion generators disclosed herein (e.g., the pressure wave generators 5) can be induced by flowing the fluid across an access port of the chamber 6 and/or the coupling member 3. For example, the fluid 22 can be flowed across the access port in a direction substantially parallel to a plane of the access port and/or perpendicular to the central axis of the root canal 13. The fluid motion 24 described in each embodiment disclosed herein can comprise rotational or non-rotational flow patterns in the chamber 6. The fluid motion 24 can be laminar or turbulent. For example, in laminar fluid motions 24, larger or bulk fluid motion may be generated. In turbulent fluid motions 24, smaller fluid motions or perturbations can be generated. In some arrangements, a combination of laminar and turbulent flow may be generated. The fluid flow 24 in the chamber and the induced flow (e.g., vortices, swirl, etc.) in the tooth can be generated in a substantially continuous manner or can be intermittent or periodic. In some embodiments, the fluid motion 24 can comprise rotational motion, e.g., the fluid can rotate about an axis transverse to a central axis of the root canal 13 (see, e.g., FIG. 2A). In some arrangements, the fluid motion 24 can induce vortices 75 flowing about an axis substantially perpendicular to the central axis of the root canal 13 (see, e.g., FIG. 2A). In other embodiments, the fluid motion 24 can be generated about the central axis of the root canal 13 and can generate a swirl flow 76 that can propagate through the canal 13 (see, e.g., FIG. 2B). In still other embodiments, the fluid motion 24 can comprise planar fluid flow, e.g., fluid flow that comprises planar wavefronts. In some embodiments, the fluid motion 24 can comprise unsteady or chaotic flow.

As explained herein, the pressure waves 23 can enhance the chemical reactions produced between treatment fluids and the unhealthy material to enable the detachment of unhealthy materials from the tooth 10 in a safe and efficient manner. For example, the pressure wave generator 5 can be configured to induce acoustic cavitation throughout the tooth 10, which can assist in removing unhealthy materials from larger spaces in the tooth, such as the main root canal 13, as well as from extremely small spaces in the tooth 10, such as tubules and various cracks and crevices that may be formed in the tooth 10.

In tooth cleaning procedures, the motion 24 of the fluid 22 can also improve the cleaning of the tooth 10 by refreshing the chemical reactants used in the fluid 22, which can act to speed up the chemical reactions between the fluid 22 and the unhealthy materials in the tooth. Furthermore, the motion 24 of the fluid 22 can impart momentum in the tooth 10 that helps to dislodge the unhealthy or undesirable materials from the tooth 10 and to irrigate the dislodged materials out of the tooth 10. As explained herein, the motion 24 of the fluid 22 can also reduce apical pressures at or near the apical opening 15 of the tooth 10.

Accordingly, the pressure waves 23 and motion 24 generated by the systems disclosed herein can improve patient outcomes as compared with other treatments by cleaning unhealthy materials from both large and small spaces of the tooth, and by enhancing the chemical reactions between the fluid 22 and the unhealthy materials to be removed from the tooth 10. Furthermore, because the tooth 10 is cleaned without the use of a file, drill, brush, or other abrasive instrument, the systems and methods disclosed herein can clean the tooth with little or no discomfort to the patient. In addition, in obturation procedures, the embodiments disclosed herein can advantageously obturate or fill substantially the entire canal(s) and/or branch structures therefrom, as explained in greater detail below.

In various implementations, the pressure wave generator 5 comprises one or more embodiments of the various apparatus described herein. For example, the pressure wave generator 5 can include a liquid jet device. In some embodiments, the liquid jet device comprises a positioning member (e.g., a guide tube) having a channel or lumen along which or through which a liquid jet can propagate. The distal end portion of the positioning member may include an impingement surface on which the liquid jet impinges and is deflected into jets or spray. The distal end portion of the positioning member may include one or more openings that permit the jet to interact with the fluid in the surrounding environment (e.g., fluid in the tooth chamber) and also permit the deflected liquid to exit the positioning member and interact with the surrounding environment and fluid 22 in the chamber 6 and/or tooth 10. The result of these interactions can be the generation of pressure waves and fluid motion in the tooth 10, which can at least partially clean the tooth 10. By generating fluid motion 24 in the tooth 10, the pressure wave generators 5 may act as fluid motion generators. In some treatment methods, the openings disposed at or near the distal end portion of the positioning member are submerged in the fluid 22 retained in the chamber 6 by the coupling member 3.

In some embodiments, the pressure wave generator 5 may include a sonic, ultrasonic, or megasonic device (e.g., a sonic, ultrasonic, or megasonic paddle, horn, or piezoelectric transducer), a mechanical stirrer (e.g., a motorized propeller or paddle or rotating/vibrating/pulsating disk or cylinder), an optical system that can provides optical energy to the chamber 6 (e.g., an optical fiber that propagates laser light into the chamber 6), or any other device that can cause sufficient rotational fluid motion and acoustic waves to be generated in the tooth or in a propagation medium in the tooth (e.g., the fluid retained in a tooth chamber).

B. Enhancing the Treatment of Teeth

The embodiments disclosed herein can advantageously remove undesirable or unhealthy materials from a tooth such that substantially all the unhealthy material is removed while inducing minimal or no discomfort and/or pain in the patient. For example, when activated by the clinician, the pressure wave generator 5 can induce various fluidic effects that interact with the unhealthy material to be removed, even when the pressure wave generator 5 is disposed at a position remote from the treatment region of the tooth, e.g., the region of the tooth that includes the unhealthy or undesirable material to be removed. The pressure wave generator 5 can impart energy to the fluid 22 that induces the relatively large-scale or bulk circulation or movement 24 of liquid in the chamber 6 and tooth 10, and that also generates pressure waves 23 that propagate through the fluid 22 and tooth 10. The generated fluid motion 24 and pressure waves 23 can magnify or enhance the properties of the fluid 22 to enhance cleaning of the tooth 10. In some embodiments, the pressure wave generator 5 can be used to obturate or fill the root canals and/or other treated regions of the tooth.

(1) Chemistry of Various Treatment Fluids

As explained above, in cleaning procedures, the fluid 22 can comprise a treatment fluid that can be introduced into the tooth 10 and the chamber 6 to assist in removing unhealthy or undesirable materials from the tooth 10. The treatment fluids can be selected based on the chemical properties of the fluids when reacting with the undesirable or unhealthy material to be removed from the tooth 10. The treatment fluids disclosed herein can include any suitable fluid, including, e.g., water, saline, etc. Various chemicals can be added to treatment fluid for various purposes, including, e.g., tissue dissolving agents (e.g., NaOCl or bleach), disinfectants (e.g., chlorhexidine), anesthesia, fluoride therapy agents, ethylenediaminetetraacetic acid (EDTA), citric acid, and any other suitable chemicals. For example, any other antibacterial, decalcifying, disinfecting, mineralizing, or whitening solutions may be used as well. The clinician can supply the various fluids to the tooth in one or more treatment cycles, and can supply different fluids sequentially or simultaneously.

During some treatment cycles, bleach-based solutions (e.g., solutions including NaOCl) can be used to dissociate diseased tissue (e.g., diseased organic matter in the root canal 13) and/or to remove bacteria from the tooth 10. One example of a treatment solution comprises water or saline with 0.3% to 6% bleach (NaOCl). In some methods, tissue dissolution and dental deposit removal in the presence of bleach may not occur when the bleach concentration is less than 1%. In some treatment methods disclosed herein, tissue dissolution and dental deposit removal can occur at smaller (or much smaller) concentrations.

During other treatment cycles, the clinician can supply an EDTA-based solution to remove undesirable or unhealthy calcified material from the tooth 10. For example, if a portion of the tooth 10 and/or root canal 13 is shaped or otherwise instrumented during the procedure, a smear layer may form on the walls of the canal 13. The smear layer can include a semi-crystalline layer of debris, which may include remnants of pulp, bacteria, dentin, and other materials. Treatment fluids that include EDTA may be used to remove part or all of the smear layer, and/or calcified deposits on the tooth 10.

During yet other cycles, for example, the clinician may supply a treatment fluid that comprises substantially water. The water can be used to assist in irrigating the tooth before, during, and/or after the treatment. For example, the water can be supplied to remove remnants of other treatment fluids (e.g., bleach or EDTA) between treatment cycles. Because bleach has a pH that tends to be a base and because EDTA is an acid, it can be important to purge the tooth 10 and chamber 6 between bleach and EDTA treatments to avoid potentially damaging chemical reactions. Furthermore, the water can be supplied with a sufficient momentum to help remove detached materials that are disrupted during the treatment. For example, the water can be used to convey waste material from the tooth 10.

Various solutions may be used in combination at the same time or sequentially at suitable concentrations. In some embodiments, chemicals and the concentrations of the chemicals can be varied throughout the procedure by the clinician and/or by the system to improve patient outcomes. For example, during an example treatment procedure, the clinician can alternate between the use of water, bleach, and EDTA, in order to achieve the advantages associated with each of these chemicals. In one example, the clinician may begin with a water cycle to clean out any initial debris, then proceed with a bleach cycle to dissociate diseased tissue and bacteria from the tooth. A water cycle may then be used to remove the bleach and any remaining detached materials from the tooth 10. The clinician may then supply EDTA to the tooth to remove calcified deposits and/or portions of a smear layer from the tooth 10. Water can then be supplied to remove the EDTA and any remaining detached material from the tooth 10 before a subsequent bleach cycle. The clinician can continually shift between cycles of treatment fluid throughout the procedure. The above example is for illustrative purposes only. It should be appreciated that the order of the cycling of treatment liquids may vary in any suitable manner and order.

Thus, the treatment fluids used in the embodiments disclosed herein can react chemically with the undesirable or unhealthy materials to dissociate the unhealthy materials from the healthy portions of the tooth 10. The treatment fluids can also be used to irrigate waste fluid and/or detached or delaminated materials out of the tooth 10. In some embodiments, as explained in more detail herein in Section VIII, the treatment solution (including any suitable composition) can be degassed, which may improve cavitation and/or reduce the presence of gas bubbles in some treatments. In some embodiments, the dissolved gas content can be less than about 1% by volume. Additional properties and characteristics of the treatment fluid 22 are presented in more detail herein in Section VII.

(2) Enhancement of Cleaning Using Pressure Waves

As explained herein, a pressure wave generator 5 can remove unhealthy materials from a tooth by propagating pressure waves 23 through a propagation medium (e.g., the treatment fluid) to the treatment region, which can include one or more teeth and/or gums. Without being limited by theory, a few potential ways that the pressure waves 23 remove undesirable materials are presented herein. Note that these principles, and the principles described above, may be generally applicable for each embodiment disclosed herein.

In some arrangements, cavitation may be induced by the generated pressure waves 23. Upon irradiation of a liquid (e.g., water or other treatment fluid) with high intensity pressure or pressure waves 23, acoustic cavitation may occur. The oscillation or the implosive collapse of small cavitation bubbles can produce localized effects, which may further enhance the cleaning process, e.g., by creating intense, small-scale localized heat, shock waves, and/or microjets and shear flows. Therefore, in some treatment methods, acoustic cavitation may be responsible for or involved in enhancing the chemical reactions, sonochemistry, sonoporation, soft tissue/cell/bacteria dissociation, delamination and breakup of biofilms.

For example, if the treatment liquid contains chemical(s) that act on a particular target material (e.g., diseased organic or inorganic matter, stains, caries, dental calculus, plaque, bacteria, biofilms, etc.), the pressure waves 23 (acoustic field) and/or the subsequent acoustic cavitation may enhance the chemical reaction via agitation and/or sonochemistry. Indeed, the pressure waves 23 can enhance the chemical effects that each composition has on the unhealthy material to be removed from the tooth. For example, with a bleach-based treatment fluid, the generated pressure waves 23 can propagate so as to dissociate tissue throughout the entire tooth 10, including in the dentinal tubules and throughout tiny cracks and crevices of the tooth 10. As another example, with an EDTA-based treatment fluid, the generated pressure waves 23 can propagate so as to remove the smear layer and/or calcified deposits from the tooth 10, including in the tubules and/or in tiny cracks and crevices formed in the tooth 10. With a water-based treatment fluid, the generated pressure waves 23 can propagate so as to flush and/or irrigate undesirable materials from the tooth, including in tubules and tiny cracks and crevices. Accordingly, the generated pressure waves 23 can enhance the removal of undesirable or unhealthy materials from the tooth 10 by magnifying the chemical effects of whatever treatment fluid composition is used during a particular treatment cycle.

Furthermore, sonoporation, which is the process of using pressure waves and/or the subsequent acoustic cavitation to modify the permeability of the bacterial cell plasma membrane, may also expedite the chemical reaction that removes the microorganisms from the tooth. It should also be appreciated that generated pressure waves, and/or the subsequent acoustic cavitation of certain frequencies, may result in cellular and bacterial rupture and death (e.g., lysis) as well as removal of decayed and weakened dentin and enamel. The cellular and bacterial rupture phenomenon may kill bacteria which might otherwise reinfect the gingival pockets and/or the oral cavity.

Generated pressure waves and/or the subsequent acoustic cavitation may also loosen the bond of the structure of the unhealthy material (e.g., diseased tissue, calculus, biofilm, caries, etc.), and/or the pressure waves may dissociate the unhealthy material from the tooth 10. In some cases, pressure waves and/or acoustic cavitation may loosen the bond between the cells and the dentin and/or delaminate the tissue from the tooth. Furthermore, the pressure waves and/or the subsequent acoustic cavitation may act on decayed hard tissue (which may be relatively weak and loosely connected) through vibrations and/or shock waves, and/or the microjets created as a result of cavitation bubble implosion, to remove decayed hard tissue from other healthy portions of the tooth.

Additional details of the acoustic effects produced by the pressure wave generators disclosed herein may be found herein in more detail in Section VII.

(3) Enhancement of Cleaning Using Large-Scale Fluid Motion

In some arrangements, bulk fluid motion 24 (e.g., fluid rotation, convection, planar flow, chaotic flow, etc.) can enhance the cleaning of unhealthy material from a diseased tooth. For example, the fluid motion 24 generated in the chamber 6 and/or tooth 10 can impart relatively large momentum to the tooth, which can help dissociate and irrigate unhealthy materials from the tooth. Furthermore, the fluid motion 24 can induce vortices 75 and/or swirl 76 in the tooth 10 that can result in negative pressures (or low positive pressures) near the apical opening 15 of the tooth 10. The resulting negative pressures at the apical opening 15 can prevent or reduce an amount of material extruded through the apical opening 15 and into the jaw of the patient. By preventing or reducing the amount of extruded material, the risk of infection can be lowered or eliminated, and patient outcomes can be substantially improved.

In addition, due to relatively short time scales of the chemical reaction processes between the fluid 22 and the unhealthy materials as compared to that of diffusion mechanisms, a faster mechanism of reactant delivery such as "macroscopic" liquid circulation may be advantageous in some of the embodiments disclosed herein. For example, liquid circulation with a time scale comparable to (and preferably faster than) that of chemical reaction may help replenish the reactants at the chemical reaction front and/or may help to remove the reaction byproducts from the reaction site. The relatively large convective time scale, which may relate to effectiveness of the convection process, can be adjusted and/or optimized depending on, e.g., the location and characteristics of the source of circulation.

Furthermore, it should be appreciated that the introduction of liquid circulation or other fluid motion 24 generally does not eliminate the diffusion process, which may still remain effective within a thin microscopic layer at the chemical reaction front. Liquid circulation can also cause a strong irrigation effect at the treatment site (e.g. removing diseased tissue deep in the canal 13 and/or tubules and small spaces and cracks of the tooth 10) and may therefore result in loosening and/or removing large and small pieces of debris from the treatment site.

In some arrangements, various properties can be adjusted to enhance bulk fluid motion and/or fluid circulation, e.g., fluid motion in the chamber 6. For example, the position of the pressure wave generator 5 relative to the location of the treatment site can be adjusted. As explained herein, in some embodiments, the pressure wave generator 5 is disposed such that the pressure wave generator 5 passes a stream of liquid across the access opening 18. For example, the pressure wave generator 5 can be disposed to induce fluid motion 24 about an axis transverse to a central axis of the root canal 13, which can generate vortices 75 that propagate throughout the canal 13. In some embodiments, the fluid motion 24 can be generated about the central axis of the root canal 13, which can induce swirl motion 76 in the root canal 13. The fluid flow 24 over the access port or access opening of the tooth 10 can be varied. For example, the momentum of the fluid 24 can be varied to create the desired flow in the root canals 13. Furthermore, the angle of the fluid flow 24 relative to the access port can be varied to control the apical pressure in the canals 13, e.g., to induce apical pressures that are more positive, more negative, etc. The geometry of the space surrounding the pressure wave generator 5 and treatment site (e.g., the geometry of the coupling member 3) can also be varied. It should also be appreciated that circulation may be affected by the viscosity of the fluid 22 and/or the mechanism of action of the pressure wave generator 5. For example, the pressure wave generator 5, such as a jet of liquid ejected through an inlet opening, a stirrer such as a propeller or a vibrating object, etc., can be selected to enhance fluid motion of the treatment fluid. In some aspects, the input power of the source of liquid circulation can also be adjusted, such as the source of a pump that drives a liquid jet in some embodiments.

(4) Enhancement of Other Dental and Endodontic Procedures

In some embodiments, the pressure wave generators 5 disclosed herein can enhance other dental and endodontic procedures. For example, after cleaning a tooth (e.g., a root canal inside the tooth, a carious region on or near an exterior surface of the tooth, etc.), the treatment region can be filled with an obturation or filler material. In some embodiments, the filler material can be supplied to the treatment region as a flowable material and can be hardened to fill the treatment region (e.g., the cleaned root canal or carious region, etc.). In some embodiments, a pressure wave generator 5 can be activated to supply the obturation material throughout the treatment region.

For example, after a root canal procedure, the pressure wave generator can supply the flowable obturation material into the tooth and root canal. The large-scale fluid movement generated by the pressure wave generator 5 can assist in propagating the obturation material throughout relatively large spaces, such as the main root canal or canals. For example, the pressure wave generator 5 may introduce sufficient momentum such that the flowable obturation material propagates throughout the canal space without introducing additional instrumentation into the tooth. For example, the bulk fluid motion of the obturation material into the canal may be such that the clinician may not need to or desire to enlarge the canals. By reducing or eliminating canal enlargement, patient outcomes and pain levels can be improved. In some arrangements, the bulk fluid motion of the flowable obturation material can be generated at relatively low frequencies produced by the pressure wave generator.

In addition to generating large-scale or bulk fluid motion of the obturation material throughout the canal, the pressure wave generators 5 disclosed herein can generate higher frequency perturbations to propagate the obturation material into smaller cracks, spaces, and crevices in the tooth. For example, higher-frequency effects, such as acoustic cavitation, can assist in propagating the filler material throughout the tooth.

Accordingly, the pressure wave generators disclosed herein can enhance the filling of a treatment region such as a root canal, carious region of the tooth, etc. For example, the obturation material can be propagated at a distance such that it flows into the treatment region from a remote pressure wave generator 5 (which may be disposed outside the tooth). Large-scale or bulk fluid motion of the obturation material can fill larger canal spaces or other treatment regions without further enlargening the treatment region. Smaller-scale and/or higher frequency agitation by the pressure wave generator 5 can propagate the obturation material into smaller cracks and spaces of the tooth. By filling substantially all the cleaned spaces of the tooth, the disclosed methods can improve patient outcomes relative to other methods by reducing the risk of infection in spaces unfilled by the obturation material.

II. Overview of Features of the Disclosed Systems

A. Pressure Wave Generators

A pressure wave generator 5 can be used in various disclosed embodiments to clean a tooth 10, e.g., from interior or exterior portions of the tooth 10 and/or gums. In other embodiments, the pressure wave generator 5 can be used to fill or obturate a cleaned root canal or other treatment region of the tooth 10. In some embodiments, the pressure wave generator 5 can comprise an elongated member having an active distal end portion 25. The active distal end portion 25 can be activated by a user to apply energy to the treatment tooth 10 to remove unhealthy or undesirable material from the tooth 10.

As explained herein, the disclosed pressure wave generators 5 can be configured to generate pressure waves 23 and fluid motion 24 with energy sufficient to clean undesirable material from a tooth 10. The pressure wave generator 5 can be a device that converts one form of energy into acoustic waves and bulk fluid motion (e.g., rotational motion) within the fluid 22. The pressure wave generator 5 can induce, among other phenomena, both pressure waves and bulk fluid dynamic motion in the fluid 22 (e.g., in the chamber 6), fluid circulation, turbulence, vortices and other conditions that can enable the cleaning of the tooth. The pressure wave generator 5 disclosed in each of the figures described herein may be any suitable type of pressure wave generator.

The pressure wave generator 5 can be used to clean the tooth 10 by creating pressure waves that propagate through the fluid 22, e.g., through treatment fluid at least partially retained in the chamber 6. In some implementations, the pressure wave generator 5 may also create cavitation, acoustic streaming, turbulence, etc. In various embodiments, the pressure wave generator 5 can generate pressure waves or acoustic energy having a broadband power spectrum (see, e.g., FIGS. 4A-4C). For example, the pressure wave generator 5 can generate pressure waves at multiple different frequencies, as opposed to only one or a few frequencies. Without being limited by theory, it is believed that the generation of power at multiple frequencies can help to remove various types of organic and/or inorganic materials that have different material or physical characteristics at various frequencies.

The pressure wave generator 5 (e.g., high-speed liquid jet, ultrasonic transducer, a laser fiber, etc.) can be placed at the desired treatment location in or on the tooth 10. The pressure wave generator 5 can create pressure waves 23 and fluid motion 24 within the fluid 22 inside a substantially-enclosed chamber 6. In general, the pressure wave generator 5 can be sufficiently strong to remove unhealthy materials such as organic and/or inorganic tissue from teeth 10. In some embodiments, the pressure wave generator 5 can be configured to avoid substantially breaking down or harming natural dentin and/or enamel.

(1) Liquid Jet Apparatus

For example, in some embodiments, the pressure wave generator 5 can comprise a liquid jet device. The liquid jet can be created by passing high pressure liquid through an orifice. The liquid jet can create pressure waves within the treatment liquid. In some embodiments, the pressure wave generator 5 comprises a coherent, collimated jet of liquid. The jet of liquid can interact with liquid in a substantially-enclosed volume (e.g., the chamber and/or the mouth of the user) and/or an impingement member to create the acoustic waves. In addition, the interaction of the jet and the treatment fluid, as well as the interaction of the spray which results from hitting the impingement member and the treatment fluid, may assist in creating cavitation and/or other acoustic effects to clean the tooth.

In various embodiments, the liquid jet device can comprise a positioning member (e.g., a guide tube) having a channel or lumen along which or through which a liquid jet can propagate. The distal end portion of the positioning member can include one or more openings that permit the deflected liquid to exit the positioning member and interact with the surrounding environment in the chamber 6 or tooth 10. In some treatment methods, the openings disposed at or near the distal end portion of the positioning member can be submerged in liquid that can be at least partially enclosed in the chamber 6 attached to or enclosing a portion of the tooth 10. In some embodiments, the liquid jet can pass through the guide tube and can impact an impingement surface. The passage of the jet through the surrounding treatment fluid and impact of the jet on the impingement surface can generate the acoustic waves in some implementations. The flow of the submerged portion of the liquid jet may generate a cavitation cloud within the treatment fluid. The creation and collapse of the cavitation cloud may, in some cases, generate a substantial hydroacoustic field in or near the tooth. Further cavitation effects may be possible, including growth, oscillation, and collapse of cavitation bubbles. In addition, as explained above, bulk fluid motion, such as rotational flow, may be induced. The induced rotational flow can enhance the cleaning process by removing detached material and replenishing reactants for the cleaning reactions. These (and/or other) effects may lead to efficient cleaning of the tooth.

Figure 3A:
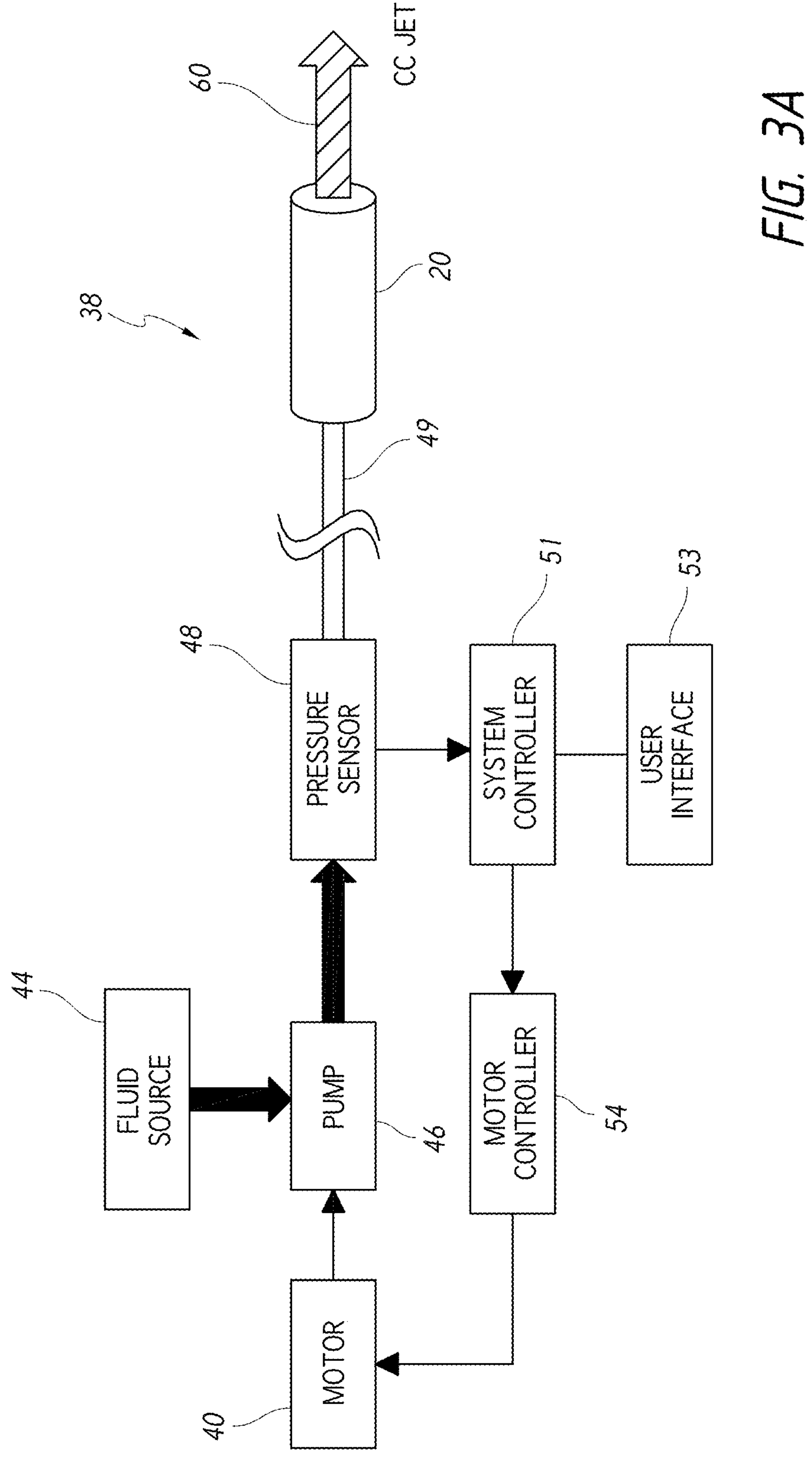
FIG. 3A is a block diagram that schematically illustrates an embodiment of a system adapted to generate a high-velocity jet of fluid for use in dental procedures.

FIG. 3A is a block diagram that schematically illustrates an embodiment of a system 38 adapted to generate a high-velocity jet 60 of fluid for use in dental procedures. The system 38 comprises a motor 40, a motor controller 54, a fluid source 44, a pump 46, a pressure sensor 48, a system controller 51, a user interface 53, and a handpiece 20 that can be operated by a dental practitioner to direct the jet 60 toward desired locations in a patient's mouth. The pump 46 can pressurize fluid received from the fluid source 44. The pump 46 may comprise a piston pump in which the piston is actuatable by the motor 40. The motor 40 can be controlled by way of the motor controller 54. The high-pressure liquid from the pump 46 can be fed to the pressure sensor 48 and then to the handpiece 20, for example, by a length of high-pressure tubing 49. The pressure sensor 48 may be used to sense the pressure of the liquid and communicate pressure information to the system controller 51. The system controller 51 can use the pressure information to make adjustments to the motor 40 and/or the pump 46 to provide a target pressure for the fluid delivered to the handpiece 20. For example, in embodiments in which the pump 46 comprises a piston pump, the system controller 51 may signal the motor 40 to drive the piston more rapidly or more slowly, depending on the pressure information from the pressure sensor 48. In some embodiments, the pressure of the liquid that can be delivered to the handpiece 20 can be adjusted within a range from about 500 psi to about 50,000 psi (1 psi is 1 pound per square inch and is about 6895 Pascal (Pa)). In certain embodiments, it has been found that a pressure range from about 2,000 psi to about 15,000 psi produces jets that are particularly effective for endodontic treatments. In some embodiments, the pressure is about 10,000 psi.

The fluid source 44 may comprise a fluid container (e.g., an intravenous bag) holding any of the treatments fluids described herein. The treatment fluid may be degassed, with a dissolved gas content less than normal (e.g., non-degassed) fluids. Examples of treatment fluids include sterile water, a medical-grade saline solution, an antiseptic or antibiotic solution (e.g., sodium hypochlorite), a solution with chemicals or medications, or any combination thereof. More than one fluid source may be used. In certain embodiments, it is advantageous for jet formation if the liquid provided by the fluid source 44 is substantially free of dissolved gases, which may reduce the effectiveness of the jet and the pressure wave generation. Therefore, in some embodiments, the fluid source 44 comprises degassed liquid such as, e.g., degassed distilled water. A bubble detector (not shown) may be disposed between the fluid source 44 and the pump 46 to detect bubbles in the liquid and/or to determine whether liquid flow from the fluid source 44 has been interrupted or the container has emptied. Also, as discussed above degassed fluids may be used. The bubble detector can be used to determine whether small air bubbles are present in the fluid that might negatively impact jet formation or acoustic wave propagation. Thus in some embodiments, a filter or de-bubbler (not shown) can be used to remove small air bubbles from the liquid. The liquid in the fluid source 44 may be at room temperature or may be heated and/or cooled to a different temperature. For example, in some embodiments, the liquid in the fluid source 44 can be chilled to reduce the temperature of the high velocity jet 60 generated by the system 38, which may reduce or control the temperature of the fluid inside a tooth 10. In some treatment methods, the liquid in the fluid source 44 can be heated, which may increase the rate of chemical reactions that may occur in the tooth 10 during treatment.

The handpiece 20 can be configured to receive the high pressure liquid and can be adapted at a distal end to generate a high-velocity beam or jet 60 of liquid for use in dental procedures. In some embodiments, the system 38 may produce a coherent, collimated jet of liquid. The handpiece 20 may be sized and shaped to be maneuverable in the mouth of a patient so that the jet 60 may be directed toward or away from various portions of the tooth 10. In some embodiments, the handpiece 20 comprises a distal housing or coupling member that can be coupled to the tooth 10.

The system controller 51 may comprise a microprocessor, a special or general purpose computer, a floating point gate array, and/or a programmable logic device. The system controller 51 may be used to control safety of the system 38, for example, by limiting system pressures to be below safety thresholds and/or by limiting the time that the jet 60 is permitted to flow from the handpiece 20. The system 38 may also include a user interface 53 that outputs relevant system data or accepts user input (e.g., a target pressure). In some embodiments, the user interface 53 comprises a touch screen graphics display. In some embodiments, the user interface 53 may include controls for a dental practitioner to operate the liquid jet apparatus. For example, the controls can include a foot switch to actuate or deactuate the jet. In some embodiments, the motor 40, motor controller 54, pump 46, fluid source 44, pressure sensor 48, system controller 51, and user interface 53 can be integrated in the console 2 illustrated schematically in FIGS. 1A-1B.

The system 38 may include additional and/or different components and may be configured differently than shown in FIG. 3A. For example, the system 38 may include an aspiration pump that is coupled to the handpiece 20 (or an aspiration cannula) to permit aspiration of organic matter from the mouth or tooth 10. In other embodiments, the system 38 may comprise other pneumatic and/or hydraulic systems adapted to generate the high-velocity beam or jet 60.

Additional details of a pressure wave generator and/or pressure wave generator that includes a liquid jet device may be found at least in ¶¶ [0045]-[0050], [0054]-[0077] and various other portions of U.S. Patent Publication No. US 2011/0117517, published May 19, 2011, and in ¶¶ [0136]-[0142] and various other portions of U.S. Patent Publication No. US 2012/0237893, published Sep. 20, 2012, each of which is incorporated by reference herein in its entirety and for all purposes.

As has been described, a pressure wave generator can be any physical device or phenomenon that converts one form of energy into acoustic waves within the treatment fluid and that induces rotational fluid motion in the chamber 6 and/or tooth 10. Many different types of pressure wave generators (or combinations of pressure wave generators) are usable with embodiments of the systems and methods disclosed herein.

(2) Mechanical Energy

Mechanical energy pressure wave generators can also include rotating objects, e.g. miniature propellers, eccentrically-confined rotating cylinders, a perforated rotating disk, etc. These types of pressure wave generators can also include vibrating, oscillating, or pulsating objects such as sonication devices that create pressure waves via piezoelectricity, magnetostriction, etc. In some pressure wave generators, electric energy transferred to a piezoelectric transducer can produce acoustic waves in the treatment fluid. In some cases, the piezoelectric transducer can be used to create acoustic waves having a broad band of frequencies.

(3) Electromagnetic Energy

An electromagnetic beam of radiation (e.g., a laser beam) can propagate energy into a chamber, and the electromagnetic beam energy can be transformed into acoustic waves as it enters the treatment fluid. In some embodiments, the laser beam can be directed into the chamber 6 as a collimated and coherent beam of light. The collimated laser beam can be sufficient to generate pressure waves as the laser beam delivers energy to the fluid. Furthermore, in various embodiments, the laser beam can be focused using one or more lenses or other focusing devices to concentrate the optical energy at a location in the treatment fluid. The concentrated energy can be transformed into pressure waves sufficient to clean the undesirable materials. In one embodiment, the wavelength of the laser beam or electromagnetic source can be selected to be highly absorbable by the treatment fluid in the chamber or mouth (e.g., water) and/or by the additives in the treatment fluid (e.g., nanoparticles, etc.). For example, at least some of the electromagnetic energy may be absorbed by the fluid (e.g., water) in the chamber, which can generate localized heating and pressure waves that propagate in the fluid. The pressure waves generated by the electromagnetic beam can generate photo-induced or photo-acoustic cavitation effects in the fluid. In some embodiments, the localized heating can induce rotational fluid flow in the chamber 6 and/or tooth 10 that further enhances cleaning of the tooth 10 (see, e.g., FIG. 10C). The electromagnetic radiation from a radiation source (e.g., a laser) can be propagated to the chamber by an optical waveguide (e.g., an optical fiber), and dispersed into the fluid at a distal end of the waveguide (e.g., a shaped tip of the fiber, e.g., a conically-shaped tip). In other implementations, the radiation can be directed to the chamber by a beam scanning system.

The wavelength of the electromagnetic energy may be in a range that is strongly absorbed by water molecules. The wavelength may in a range from about 300 nm to about 3000 nm. In some embodiments, the wavelength is in a range from about 400 nm to about 700 nm, about 700 nm to about 1000 nm (e.g., 790 nm, 810 nm, 940 nm, or 980 nm), in a range from about 1 micron to about 3 microns (e.g., about 2.7 microns or 2.9 microns), or in a range from about 3 microns to about 30 microns (e.g., 9.4 microns or 10.6 microns). The electromagnetic energy can be in the ultraviolet, visible, near-infrared, mid-infrared, microwave, or longer wavelengths.

The electromagnetic energy can be pulsed or modulated (e.g., via a pulsed laser), for example with a repetition rate in a range from about 1 Hz to about 500 kHz. The pulse energy can be in a range from about 1 mJ to about 1000 mJ. The pulse width can be in a range from about 1 μs to about 500 μs, about 1 ms to about 500 ms, or some other range. In some cases, nanosecond pulsed lasers can be used with pulse rates in a range from about 100 ns to about 500 ns. The foregoing are non-limiting examples of radiation parameters, and other repetition rates, pulse widths, pulse energies, etc. can be used in other embodiments.

The laser can include one or more of a diode laser, a solid state laser, a fiber laser, an Er:YAG laser, an Er:YSGG laser, an Er, Cr:YAG laser, an Er, Cr:YSGG laser, a Ho:YAG laser, a Nd:YAG laser, a CTE:YAG laser, a $CO_2$ laser, or a Ti:Sapphire laser. In other embodiments, the source of electromagnetic radiation can include one or more light emitting diodes (LEDs). The electromagnetic radiation can be used to excite nanoparticles (e.g., light-absorbing gold nanorods or nanoshells) inside the treatment fluid, which may increase the efficiency of photo-induced cavitation in the fluid. The treatment fluid can include excitable functional groups (e.g., hydroxyl functional groups) that may be susceptible to excitation by the electromagnetic radiation and which may increase the efficiency of pressure wave generation (e.g., due to increased absorption of radiation). During some treatments, radiation having a first wavelength can be used (e.g., a wavelength strongly absorbed by the liquid, for instance water) followed by radiation having a second wavelength not equal to the first wavelength (e.g., a wavelength less strongly absorbed by water) but strongly absorbed by another element, e.g. dentin, or nanoparticles added to solution. For example, in some such treatments, the first wavelength may help create bubbles in the fluid, and the second wavelength may help disrupt the tissue.

The electromagnetic energy can be applied to the chamber 6 for a treatment time that can be in a range from about one to a few seconds up to about one minute or longer. A treatment procedure can include one to ten (or more) cycles of applying electromagnetic energy to the tooth. A fluid can circulate or otherwise move in the chamber during the treatment process, which advantageously may inhibit heating of the tooth 10 (which may cause discomfort to the patient). The movement or circulation of treatment fluid (e.g., water with a tissue dissolving agent) in the chamber 6 can bring fresh treatment fluid to tissue and organic matter as well as flush out dissolved material from the treatment site. In some treatments using electromagnetic radiation, movement of the treatment fluid can increase the effectiveness of the cleaning (as compared to a treatment with little or no fluid circulation).

In some implementations, electromagnetic energy can be added to other fluid motion generation modalities. For example, electromagnetic energy can be delivered to a chamber in which another pressure wave generator (e.g., a liquid jet) is used to generate the acoustic waves.

(4) Acoustic Energy

Acoustic energy (e.g., ultrasonic, sonic, audible, and/or lower frequencies) can be generated from electric energy transferred to, e.g., an ultrasound or other transducer or an ultrasonic tip (or file or needle) that creates acoustic waves in the treatment fluid. The ultrasonic or other type of acoustic transducer can comprise a piezoelectric crystal that physically oscillates in response to an electrical signal or a magnetostrictive element that converts electromagnetic energy into mechanical energy. The transducer can be disposed in the treatment fluid, for example, in the fluid inside the chamber. As explained herein with respect to FIGS. 4A-4C, for example, ultrasonic or other acoustic devices used with the embodiments disclosed herein are preferably broadband and/or multi-frequency devices. For example, unlike the power spectra of the conventional ultrasonic transducer shown in FIG. 4B, ultrasonic or other acoustic devices used with the disclosed embodiments preferably have broadband characteristics similar to those of the power spectra of FIGS. 4A-4B (acoustic power of a liquid jet device).

(5) Further Properties of Some Pressure Wave Generators

A pressure wave generator 5 can be placed at a desired location with respect to the tooth 10. The pressure wave generator 5 creates pressure waves within the fluid 22 inside the chamber 6 (the generation of acoustic waves may or may not create or cause cavitation). The acoustic or pressure waves 23 propagate throughout the fluid 22 inside the chamber 6, with the fluid 22 in the chamber 6 serving as a propagation medium for the pressure waves 23. The pressure waves 23 can also propagate through tooth material (e.g., dentin). It is believed, although not required, that as a result of application of a sufficiently high-intensity acoustic wave, acoustic cavitation may occur. The collapse of cavitation bubbles may induce, cause, or be involved in a number of processes described herein such as, e.g., sonochemistry, tissue dissociation, tissue delamination, sonoporation, and/or removal of calcified structures. In some embodiments, the pressure wave generator can be configured such that the acoustic waves (and/or cavitation) do not substantially break down natural dentin in the tooth 110. The acoustic wave field by itself or in addition to cavitation may be involved in one or more of the abovementioned processes.

In some implementations, the pressure wave generator 5 generates primary cavitation, which creates acoustic waves, which may in turn lead to secondary cavitation. The secondary cavitation may be weaker than the primary cavitation and may be non-inertial cavitation. In other implementations, the pressure wave generator 5 generates acoustic waves directly, which may lead to secondary cavitation.

The energy source that provides the energy for the pressure wave generator 5 can be located outside the handpiece 20, inside the handpiece 20, integrated with the handpiece 20, etc.

Additional details of pressure wave generators (e.g., which may comprise a pressure wave generator) that may be suitable for use with the embodiments disclosed herein may be found, e.g., in ¶¶ [0191]-[0217], and various other portions of U.S. Patent Publication No. US 2012/0237893, published Sep. 20, 2012, which is incorporated by reference herein for all purposes.

Other pressure wave generators may be suitable for use with the disclosed embodiments. For example, a fluid inlet can be disposed at a distal portion of a handpiece and/or can be coupled to a fluid platform in some arrangements. The fluid inlet can be configured to create movement of the fluid in a chamber 6, turbulence in the fluid in the chamber, fluid motion 24 of the fluid 22 in the chamber 6 and/or produce other dynamics in the fluid in the chamber 6*r*. For example, the fluid inlet can inject fluid into or on the tooth to be treated. In addition, mechanical stirrers and other devices can be used to enhance fluid motion and cleaning. The fluid inlet can improve the circulation of the treatment fluid in a chamber, which can enhance the removal of unhealthy materials from the tooth 10. For example, as explained herein, faster mechanisms of reactant delivery such as "macroscopic" liquid circulation may be advantageous in some of the embodiments disclosed herein.

In some embodiments, multiple pressure wave generators can be disposed in or on the chamber 6. As explained herein, each of the multiple pressure wave generators can be configured to propagate acoustic waves at a different frequency or range of frequencies. For example, different acoustic frequencies can be used to remove different types of materials. The multiple pressure wave generators can be activated simultaneously and/or sequentially in various arrangements.

B. Coupling Members

The coupling members 3 disclosed herein can be adapted to couple or orient the pressure wave generator 5 relative to the tooth 10. In some embodiments disclosed herein, the coupling member 3 can be configured to retain fluid 22 in a treatment chamber 6. In some embodiments, the coupling member 3 can be coupled to or formed with a distal portion 21 of the handpiece 20. The coupling member 3 can include or define the chamber 6 configured to retain fluid 22. Liquid can be introduced into the chamber 6 through a fluid inlet connected to, or disposed in or on, the handpiece 20. Waste treatment liquid can be removed through the coupling member 3 by way of a fluid outlet and further into the handpiece 20. In various arrangements, the coupling member 3 may be configured to cover a portion of a tooth, a whole surface of the tooth, and/or multiple teeth.

In some embodiments, the coupling member 3 can be applied to the tooth 10 with a mechanical clasp or clamp, a dental adhesive, or by pressure applied by the patient by biting on the coupling member 3. In still other embodiments, a separate cap or fluid retainer can be removably coupled to the distal portion 21 of the handpiece 20.

Additional details of coupling members 3 may be similar to those of fluid retainers, flow restrictors or caps disclosed, e.g., in ¶¶ [0052]-[0053], [0115]-[0117] and various other portions of U.S. Patent Publication No. US 2011/0117517, published May 19, 2011, and in ¶¶ [0040]-[0043], [0170]-[01 [0293]-[0299], [0316]-[0319] and various other portions of U.S. Patent Publication No. US 2012/0237893, published Sep. 20, 2012, each of which is incorporated by reference herein for all purposes.

The coupling member 3 can also include various components that enhance aspiration and irrigation before, during, and/or after the treatment procedure. In some embodiments, fluid 22 can enter the chamber 6 via a fluid inlet, such as a treatment liquid inflow conduit. The fluid inlet can pass through or along the handpiece 20. Under steady state operation, the amount of liquid entering the at least partially enclosed chamber 6 can be substantially the same as the amount of liquid leaving chamber 6 through the fluid outlet. In some embodiments, the fluid inlet can be driven by a pump, which can be controlled by the console 2. Furthermore, the fluid inlet can be the same as the pressure wave generator 5 in some embodiments, such as in embodiments that employ a liquid jet device. Additional details of fluid inlets that may be suitable for use with the embodiments disclosed herein may be found, e.g., in ¶¶ [0075]-[0078] and various other portions of U.S. Patent Publication No. US 2012/0237893, published Sep. 20, 2012, which is incorporated by reference herein for all purposes.

As explained above, the coupling member 3 can also have a fluid outlet, e.g., an outflow conduit to transfer liquid out of the chamber 6 during the procedure. In some embodiments, waste treatment liquid may be allowed to spill directly into the patient's mouth. In other embodiments, however, waste treatment liquid (as well as removed material and byproduct gases) can be transferred through the fluid outlet, which can pass through or along the handpiece 20. The fluid outlet can be active or passive. In the case of a passive fluid outlet, the waste treatment liquid may move through the fluid outlet due to capillary forces, gravity, or because of a slight overpressure created in the enclosed chamber 6. In the case of an actively pumped fluid outlet, the waste liquid can be transferred using a pump, suction, or other device that draws liquid out through the outlet. In one example, the fluid outlet is connected to the suction system and/or vacuum lines in the clinician's office. For example, in some embodiments, the inlet and outlet can be adjusted to maintain a balanced amount of fluid in coupling member 3. Additional details of fluid outlets that may be suitable for use with the embodiments disclosed herein may be found, e.g., in ¶¶ [0079]-[0081] and various other portions of U.S. Patent Publication No. US 2012/0237893, published Sep. 20, 2012, which is incorporated by reference herein for all purposes.

As explained herein, the coupling member 3 can also include one or more vents to regulate pressure of the fluid 22. The vents can be disposed in a portion of the handpiece 20 in some arrangements, such as along a waste line or fluid outlet. The vents can take the form of a permeable or semi-permeable material (e.g., a sponge), openings, pores, or holes, etc. Additional details of vents that may be suitable for use with the embodiments disclosed herein may be found, e.g., in ¶¶ [0071]-[0073], [0082]-[0086], [0177]-[0194] and various other portions of U.S. Patent Publication No. US 2012/0237893, published Sep. 20, 2012, which is incorporated by reference herein for all purposes.

C. Handpiece

The systems disclosed herein can include a handpiece 20. The handpiece 20 can be configured to apply the coupling member 3 to the tooth 10 and/or to position the pressure wave generator 5 relative to the treatment site. Treatment liquids can be transferred into and out of the chamber 6 by way of the handpiece 20.

The handpiece 20 can provide the operator, user or clinician with a handheld device to hold during the procedure. For example, the handpiece 20 can include user-friendly grips and a user-friendly shape to grasp. The clinician can manipulate the handpiece 20 to accurately position the coupling member 3 and/or pressure wave generator 5 at a desired position on the tooth 10. In addition, the handpiece 20 can allow the clinician to move or rotate the coupling member 3 and pressure wave generator 5 during the procedure so as to dispose the pressure wave generator 5 at a desirable position relative to the treatment region in the tooth 10. Alternatively, the handpiece 20 can also provide a device for the operator to clamp or attach to the tooth 10 such that the handpiece 20 does not require substantial user intervention during the procedure. The handpiece 20 can be disposable (e.g., single-use), or the handpiece 20 can be reusable. In one embodiment, the handpiece 20 is disposable, but the pressure wave generator 5 is reusable. The handpiece 20 can be formed of any suitable material. In some embodiments, the handpiece 20 can be formed of a plastic material. In other embodiments, the handpiece 20 can be formed of a metal. Additional details of handpieces that may be suitable for use with the embodiments disclosed herein may be found, e.g., in ¶¶ [0107], [0138]-[0142], [0156]-[0161] and various other portions of U.S. Patent Publication No. US 2012/0237893, published Sep. 20, 2012, which is incorporated by reference herein for all purposes.

Figure 3B:
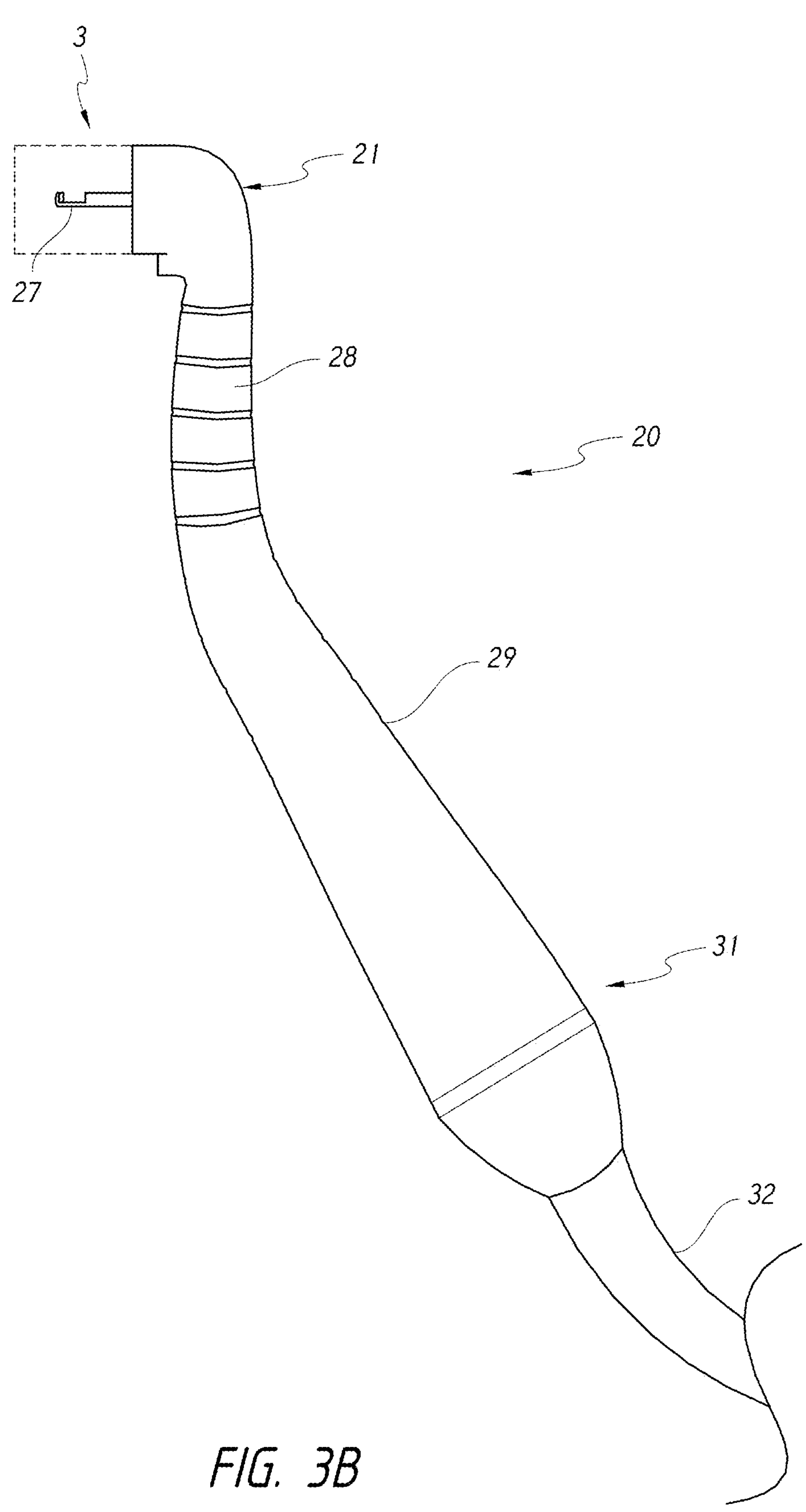
FIG. 3B is a schematic side view illustrating an embodiment of a handpiece comprising a guide tube for delivery of a liquid jet to a portion of the tooth.

For example, FIG. 3B is a schematic side view illustrating an embodiment of a handpiece 20 comprising an embodiment of a guide tube 27 for delivery of a liquid jet to a portion of a tooth 10. The handpiece 20 comprises an elongated tubular barrel 29 having a proximal end 31 that is adapted to engage tubing 32 from the system 38 and a distal end 21 adapted to be coupled or attached to the tooth 10. The barrel 29 may include features or textures 28 that enhance grasping the handpiece 20 with the fingers and thumb of the operator. The handpiece 20 can be configured to be handheld. In some cases, the handpiece 20 can be configured to be portable, movable, orientable, or maneuverable with respect to the patient. In some implementations, the handpiece 20 can be configured to be coupled to a positioning device (e.g., a maneuverable or adjustable arm). The distal end 21 of the handpiece 20 can comprise the coupling member 3 that can be coupled to the tooth 10.

The handpiece 20 may include a fluid inlet for delivering fluid 22 to the chamber 6, a fluid outlet for removing fluid from the tooth 10 (e.g., waste fluid), a pressure wave generator 5, a power line (e.g., to provide energy to a pressure wave generator), or a combination of some or all of the foregoing. The handpiece 20 may include other components such as, e.g., an irrigation line to irrigate the tooth area, a light source to illuminate the tooth area, etc. In some cases, the pressure wave generator 5 (e.g., a liquid jet) comprises the fluid inlet (e.g., the jet). The handpiece 20 can be used to apply the pressure wave generator 5 relative to the tooth 10. The handpiece 20 can be applied to the tooth 10 so as to create a substantially closed fluid circuit as the distal end 21 of the handpiece 20 engages the tooth 10, thereby enabling fluid to be delivered into and out of the chamber 6 without substantial spillage or leakage into the patient's mouth. As described herein, the handpiece 20 and/or the coupling member 3 may include a fluid retention member (e.g., sponge or vent) to reduce the likelihood of fluid leakage and/or to allow fluid to flow from the chamber 6 (e.g., to inhibit overpressurization or under-pressurization). The fluid retention member can be configured to inhibit air from entering the chamber 6 and tooth 10 (which may reduce the effectiveness of cavitation) while permitting air to enter a fluid outlet (e.g., suction line).

D. Tooth Seal and Alignment Features

A tooth seal 26 disclosed herein can be configured to temporarily secure the coupling member 3 to the tooth 10. The tooth seal 26 can be configured to flow onto or near an occlusal surface of the tooth in a flowable state. The tooth seal 26 can be configured to set and/or harden to hold its shape during treatment. In addition, the tooth seal 26 can be easily removed or pulled from the tooth 10 after use. In some arrangements, the sealing material can easily be reshaped using tools such as a dental bur, knife, etc. For example, in various embodiments, the sealing material can be shaped (e.g., planarized or curved) to support a planar coupling surface (e.g., a washer, one or more support magnets, etc.). The coupling member 3 and/or handpiece 3 can couple to the coupling surface, and the pressure wave generator 5 (e.g., a liquid jet device) can extend through the coupling surface such that a distal end portion 25 of the pressure wave generator 5 is disposed in the chamber 6 of the coupling member 3.

The tooth seal 26 can comprise any suitable sealant. For example, the tooth seal 26 can be a substantially semi-flexible material that can set or harden in less than about 30 seconds. The tooth seal 26 can be any suitable material that is able to seal the coupling member 3 to the tooth 10, but that also can easily be removed from the tooth 10. Examples of suitable sealing materials can include silicones, impression materials, bite registration materials, etc. In some embodiments, for example, the sealing materials can include 3M Imprint™ Bite, Jet Blue Bite by Colténe Whaledent®, LuxaBite bite registration material by DMG America, Alpha-Dam™ LC Gingival Dam Material or any other suitable sealant. In other embodiments, however, the tooth seal may not be used.

In some embodiments, the tooth seal 26 can comprise a permeable or semi-permeable material, such that waste fluid can flow from within the tooth 10 and/or chamber 6 through the tooth seal 6 and outside the tooth 10. In various embodiments, the tooth seal 26 can comprise a peripheral boundary shaped to secure the chamber 6 and/or coupling member 3 to the tooth seal 26. For example, in some embodiments, the tooth seal 26 can comprise a locking wall extending upwardly relative to the tooth. The locking wall can be shaped to laterally restrain the coupling member 3 during treatment. In some embodiments, a mating tube can extending outwardly from the chamber 6 and can surround an access port of the chamber 6. The mating tube can be positioned within the access opening 18 of the tooth 10 to substantially align the coupling member 3 and pressure wave generator 5 with the treatment region of the tooth 10.

In various embodiments, the tooth seal 26 can be shaped to permit the user to rotate the coupling member 3 relative to the tooth 10 to position the pressure wave generator 5 and coupling member 3 at a desired orientation relative to the treatment region of the tooth 10. For example, the tooth seal 26 can comprise a concave surface, and the distal end portion 21 of the handpiece 20 can be pressed against and/or coupled to the concave surface. The curved distal end portion 21 of the handpiece 20 can have a shape complementary to that of the curved tooth seal 26.

III. Examples of Power Generated by Pressure Wave Generators

Figure 4A:
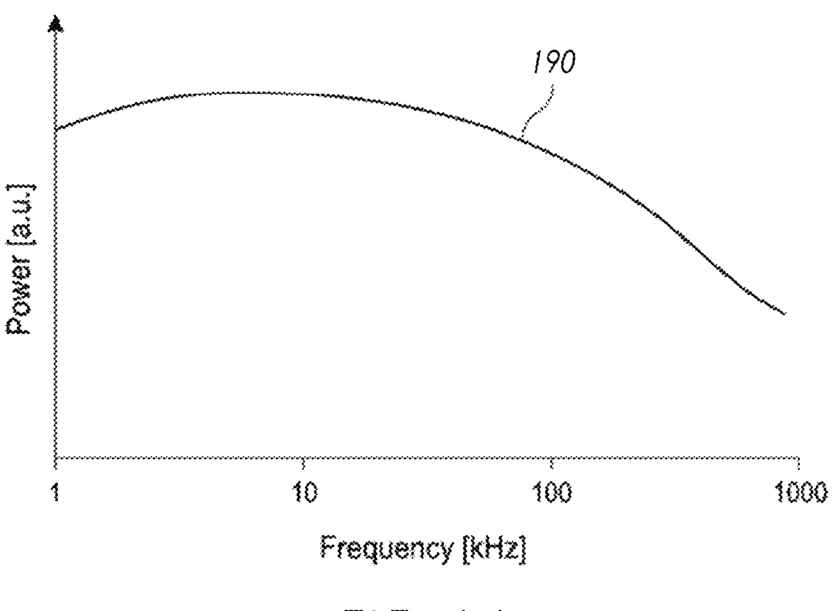
FIGS. 4A and 4B are graphs that schematically illustrate possible examples of power generated by different embodiments of the pressure wave generators disclosed herein.
Figure 4B:
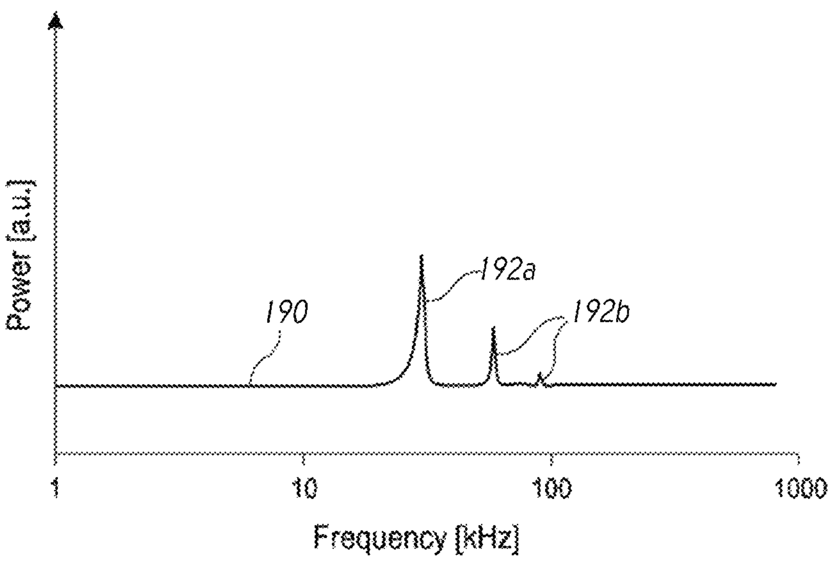

FIGS. 4A and 4B are graphs that schematically illustrate possible examples of power that can be generated by different embodiments of the pressure wave generator 5. These graphs schematically show acoustic power (in arbitrary units) on the vertical axis as a function of acoustic frequency (in kHz) on the horizontal axis. The acoustic power in the tooth may influence, cause, or increase the strength of effects including, e.g., acoustic cavitation (e.g., cavitation bubble formation and collapse, microjet formation), acoustic streaming, microerosion, fluid agitation, fluid circulation and/or rotational motion, sonoporation, sonochemistry, and so forth, which may act to dissociate organic material in or on the tooth and effectively clean the undesirable materials, e.g., undesirable organic and/or inorganic materials and deposits. In some embodiments, these effects can enhance or enable the obturation or filling of treated root canals or other treatment regions of the tooth, For example, the embodiments disclosed herein can advantageously obturate or fill substantially the entire canal(s) and/or branch structures therefrom, as explained in greater detail above. In various embodiments, the pressure wave generator can produce a pressure wave including acoustic power (at least) at frequencies above: about 1 Hz, about 0.5 kHz, about 1 kHz, about 10 kHz, about 20 kHz, about 50 kHz, about 100 kHz, or greater. The pressure wave can have acoustic power at other frequencies as well (e.g., at frequencies below the aforelisted frequencies).

The graph in FIG. 4A represents a schematic example of acoustic power generated by a liquid jet impacting a surface disposed within a chamber on or around the tooth that is substantially filled with liquid and by the interaction of the liquid jet with fluid in the chamber. This schematic example shows a broadband spectrum 190 of acoustic power with significant power extending from about 1 Hz to about 1000 kHz, including, e.g., significant power in a range of about 1 kHz to about 1000 kHz (e.g., the bandwidth can be about 1000 kHz). The bandwidth of the acoustic energy spectrum may, in some cases, be measured in terms of the 3-decibel (3-dB) bandwidth (e.g., the full-width at half-maximum or FWHM of the acoustic power spectrum). In various examples, a broadband acoustic power spectrum can include significant power in a bandwidth in a range from about 1 Hz to about 500 kHz, in a range from about 1 kHz to about 500 kHz, in a range from about 10 kHz to about 100 kHz, or some other range of frequencies. In some implementations, a broadband spectrum can include acoustic power above about 1 MHz. In some embodiments, the pressure wave generator can produce broadband acoustic power with peak power at about 10 kHz and a bandwidth of about 100 kHz. In various embodiments, the bandwidth of a broadband acoustic power spectrum is greater than about 10 kHz, greater than about 50 kHz, greater than about 100 kHz, greater than about 250 kHz, greater than about 500 kHz, greater than about 1 MHz, or some other value. In some cleaning methods, acoustic power between about 1 Hz and about 200 kHz, e.g., in a range of about 20 kHz to about 200 kHz may be particularly effective at cleaning teeth. The acoustic power can have substantial power at frequencies greater than about 1 kHz, greater than about 10 kHz, greater than about 100 kHz, or greater than about 500 kHz. Substantial power can include, for example, an amount of power that is greater than 10%, greater than 25%, greater than 35%, or greater than 50% of the total acoustic power (e.g., the acoustic power integrated over all frequencies). In some arrangements, the broadband spectrum 190 can include one or more peaks, e.g., peaks in the audible, ultrasonic, and/or megasonic frequency ranges.

The graph in FIG. 4B represents a schematic example of acoustic power generated by an ultrasonic transducer disposed in a chamber on or around the tooth that is substantially filled with liquid. This schematic example shows a relatively narrowband spectrum 192 of acoustic power with a highest peak 192*a* near the fundamental frequency of about 30 kHz and also shows peaks 192*b* near the first few harmonic frequencies. The bandwidth of the acoustic power near the peak may be about 5 to 10 kHz, and can be seen to be much narrower than the bandwidth of the acoustic power schematically illustrated in FIG. 4A. In other embodiments, the bandwidth of the acoustic power can be about 1 kHz, about 5 kHz, about 10 kHz, about 20 kHz, about 50 kHz, about 100 kHz, or some other value. The acoustic power of the example spectrum 192 has most of its power at the fundamental frequency and first few harmonics, and therefore the ultrasonic transducer of this example may provide acoustic power at a relatively narrow range of frequencies (e.g., near the fundamental and harmonic frequencies). The acoustic power of the example spectrum 190 exhibits relatively broadband power (with a relatively high bandwidth compared to the spectrum 192), and the example liquid jet can provide acoustic power at significantly more frequencies than the example ultrasonic transducer. For example, the relatively broadband power of the example spectrum 190 illustrates that the example jet device provides acoustic power at these multiple frequencies with energy sufficient to break the bonds between the decayed and healthy material so as to substantially remove the decayed material from the carious region.

It is believed, although not required, that pressure waves having broadband acoustic power (see, e.g., the example shown in FIG. 4A) can generate acoustic cavitation or other means of cleaning and disinfection that is more effective at cleaning teeth (including cleaning, e.g., unhealthy materials in or on the tooth) than cavitation generated by pressure waves having a narrowband acoustic power spectrum (see, e.g., the example shown in FIG. 4B). Further, broadband acoustic power can also generate sufficient energy at frequencies capable of obturating or filling a root canal or other treatment region (such as a treated carious region on an exterior surface of the tooth). For example, a broadband spectrum of acoustic power can produce a relatively broad range of bubble sizes in the cavitation cloud and on the surfaces on the tooth, and the implosion of these bubbles may be more effective at disrupting tissue than bubbles having a narrow size range. Relatively broadband acoustic power may also allow acoustic energy to work on a range of length scales, e.g., from the cellular scale up to the tissue scale. Accordingly, pressure wave generators that produce a broadband acoustic power spectrum (e.g., some embodiments of a liquid jet) can be more effective at tooth cleaning for some treatments than pressure wave generators that produce a narrowband acoustic power spectrum. In some embodiments, multiple narrowband pressure wave generators can be used to produce a relatively broad range of acoustic power. For example, multiple ultrasonic tips, each tuned to produce acoustic power at a different peak frequency, can be used. As used herein, broadband frequencies and broadband frequency spectrum is defined regardless of secondary effects such as harmonics of the main frequencies and regardless of any noise introduced by measurement or data processing (e.g., FFT); that is, these terms should be understood when only considering all main frequencies activated by the pressure wave generator.

Figure 4C:
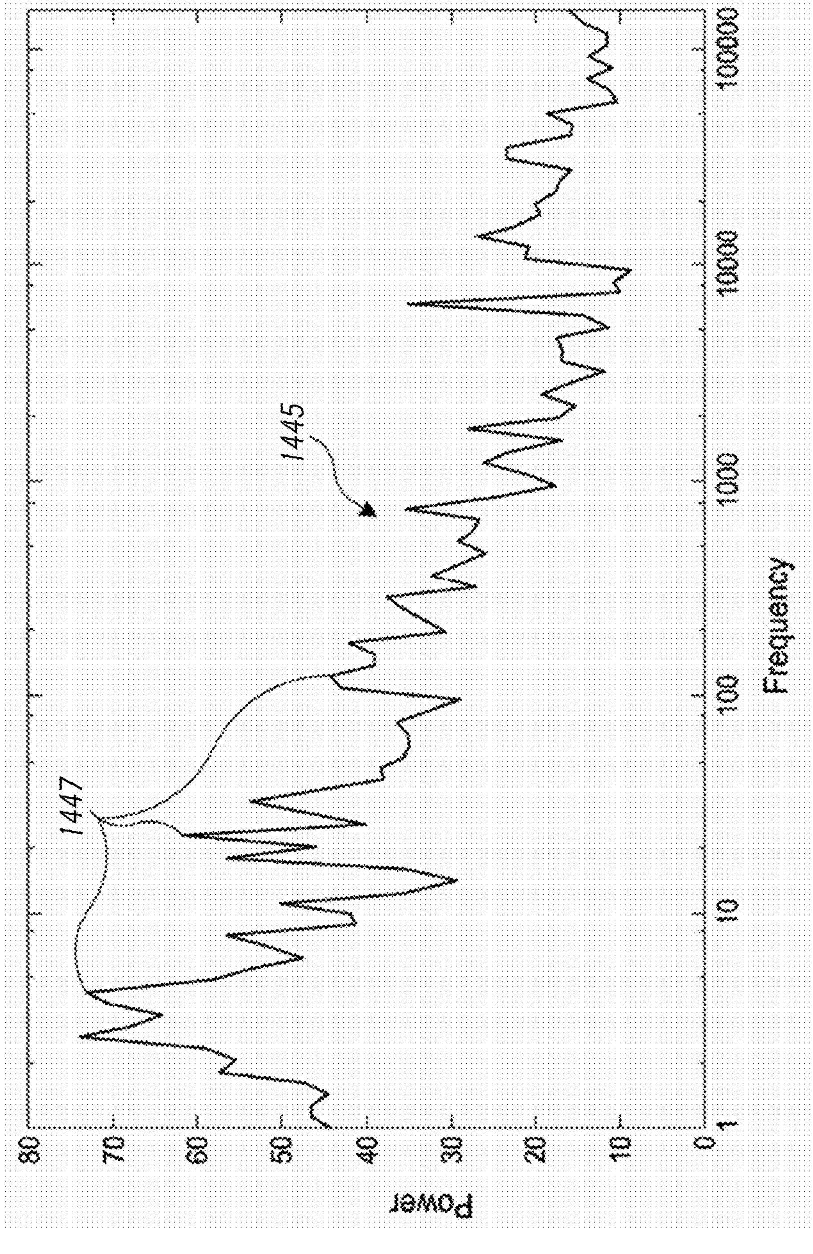
FIG. 4C is a graph of an acoustic power spectrum 1445 generated at multiple frequencies.

FIG. 4C is a graph of an acoustic power spectrum 1445 generated at multiple frequencies by the pressure wave generators disclosed herein. For example, the spectrum 1445 in FIG. 4C is an example of acoustic power generated by a liquid jet impacting a surface disposed within a chamber on, in, or around the tooth that is substantially filled with liquid and by the interaction of the liquid jet with fluid in the chamber. The spectrum 1445 of FIG. 4C represents acoustic power detected by a sensor spaced apart from the source of the acoustic energy, e.g., the pressure wave generator. The data was acquired inside an insulated water tank data when the distance between the power wave generator and the hydrophone (e.g., sensor) being about 8 inches. The vertical axis of the plot represents a measure of acoustic power: Log ($P_{acoustic}^2$), referred to herein as "power units". The units of $P_{acoustic}$ in the measurement were μPa (micro Pascal). Thus, it should be appreciated that the actual power at the source may be of a different magnitude because the sensor is spaced from the acoustic power generator. However, the general profile of the power spectrum at the source should be the same as the spectrum 1445 detected at the sensor and plotted in FIG. 4C. It should also be understood that, although the plot shows frequencies only up to 100 KHz, the power above 100 KHz was greater than zero—the data just was not plotted. It should further be noted that, as would be appreciated by one skilled in the art, the plot and the values would also depend on other parameters, such as, for example, the size and shape of the tank in which data was acquired, the insulation of the inner surface of the tank, the relative distance between the source (e.g., power wave generator), and the free water surface of the tank.

As shown in FIG. 4C, the spectrum 1445 can include acoustic power at multiple frequencies 1447, e.g., multiple discrete frequencies. In particular, the spectrum 1445 illustrated in FIG. 4C includes acoustic power at frequencies in a range of about 1 Hz to about 100 KHz. The acoustic power can be in a range of about 10 power units to about 80 power units at these frequencies. In some arrangements, the acoustic power can be in a range of about 30 power units to about 75 power units at frequencies in a range of about 1 Hz to about 10 kHz. In some arrangements, the acoustic power can be in a range of about 10 power units to about 30 power units at frequencies in a range of about 1 KHz to about 100 kHz. In some embodiments, for example, the broadband frequency range of the pressure waves generated by the pressure wave generators disclosed herein can comprise a substantially white noise distribution of frequencies (see, e.g., FIG. 11B and associated disclosure).

Pressure wave generators that generate acoustic power associated with the spectrum 1445 of FIG. 4C can advantageously and surprisingly clean undesirable materials from teeth. As explained above, the generation of power at multiple frequencies can help to remove various types of organic and/or inorganic materials that have different material or physical characteristics, and/or different bonding strengths at various frequencies. For example, some undesirable materials may be removed from the teeth and/or gums at relatively low acoustic frequencies, while other materials may be removed from the teeth at relatively high acoustic frequencies, while still other materials may be removed at intermediate frequencies between the relatively low and relatively high frequencies. As shown in FIG. 4C, lower frequency cleaning phases can be activated at higher powers, and higher frequency cleaning phases can be activated at lower powers. In other embodiments, low frequency cleaning phases may be activated at relatively low powers, and high frequency cleaning phases may be activated at relatively high powers. Pressure wave generators that generate acoustic power at multiple frequencies (e.g., multiple discrete frequencies) are capable of cleaning undesirable materials and decayed matter from interior and/or exterior portions of teeth.

In the embodiments disclosed herein, treatment procedures can be activated to generate acoustic power at various frequency ranges. For example, some treatment phases may be activated at lower frequencies, and other treatment phases may be activated at higher frequencies. The pressure wave generators disclosed herein can be adapted to controllably generate acoustic power at any suitable frequencies 1447 of the spectrum 1445. For example, the pressure wave generators disclosed herein can be adapted to generate power at multiple frequencies 1447 simultaneously, e.g., such that the delivered acoustic power in a particular treatment procedure can include a desired combination of individual frequencies. For example, in some procedures, power may be generated across the entire frequency spectrum 1445. In some treatment phases, the pressure wave generator can deliver acoustic power at only relatively low frequencies, and in other treatment phases, the pressure wave generator can deliver power at only relatively high frequencies, as explained herein. Further, depending on the desired treatment procedure, the pressure wave generator can automatically or manually transition between frequencies 1447 according to a desired pattern, or can transition between frequencies 1447 randomly. In some arrangements, relatively low frequencies can be associated with large-scale bulk fluid movement, and relatively high frequencies can be associated with small-scale, high-energy oscillations.

In some embodiments, the treatment procedure may include one or more treatment phases. In each treatment phase, energy can be applied at a different frequency or band of frequencies. For example, in one phase, energy (e.g., pressure or acoustic waves) propagating at a relatively low frequency (or band of frequencies) may be generated. The low frequency pressure waves can interact with the treatment fluid in the chamber and can induce removal of large-scale dental deposits or materials. Without being limited by theory, the low frequency pressure waves can remove a substantial portion of the unhealthy materials in the tooth. For example, the low frequency waves may have a sufficiently high energy at suitably low frequencies to remove large deposits or materials from the tooth. The acoustic power at the relatively low frequencies can include acoustic power at any suitable low-frequency band of the power spectrum of the pressure wave generator (see, e.g., FIG. 4A). For example, in some embodiments, the acoustic power in the first, low-frequency range can include one or more frequencies in a range of about 0.1 Hz to about 100 Hz, for example in a range of about 1 Hz to about 50 Hz in some arrangements.

In another phase, acoustic energy may be generated at relatively high frequencies. At higher frequencies, the pressure wave generator can be configured to remove smaller deposits and debris. For example, at higher frequencies, the pressure waves can propagate through the treatment fluid. The higher frequency waves can remove smaller portions from relatively small locations, such as crevices, cracks, spaces, and irregular surfaces of the tooth. In some embodiments, degassed liquid can be used to enhance the removal of matter from these small spaces. When the higher frequency cleaning is performed after the lower frequency cleaning, in some embodiments, the high frequency waves (and/or intermediate frequency waves) can clean the remainder of the unhealthy material left behind from the low frequency cleaning. In the relatively high frequency phases, acoustic energy can be generated in a range of about 10 kHz to about 1000 kHz, e.g., in a range of about 100 kHz to about 500 kHz.

In some embodiments, the treatment procedure can progress from the relatively low frequencies (or bands of frequencies) toward higher frequencies (or bands of frequencies). For example, the procedure can move from the relatively low frequency phase(s), through intermediate frequency phase(s), until the high frequency phase(s) are reached. Thus, in some embodiments, the treatment procedure can provide a gradual and/or substantially continuous transition between relatively low and relatively high frequencies. As the treatment progresses through the frequencies, unhealthy dental deposits or materials of varying size and type can be removed by the pressure wave generator. In other embodiments, however, the treatment procedure can transition or switch between frequencies (or bands of frequencies) or phases (e.g., between high, low and/or intermediate frequencies or bands of frequencies) at discrete levels. At various intermediate frequency ranges, acoustic energy can be generated in a range of about 100 Hz to about 10 kHz. For example, in some embodiments, the various phases of the treatment procedures described above may be activated by the user or clinician, or the pressure wave generator can be configured to automatically transition between the phases. In some embodiments, for example, the pressure wave generator can randomly switch between high, low, and intermediate frequencies.

Various treatment procedures may include any suitable number of treatment phases at various different frequencies. Furthermore, although various low- and high-frequency phases may be described above as occurring in a particular order, in other embodiments, the order of activating the low- and high-frequency phases, and/or any intermediate frequency phases, may be any suitable order. Furthermore, the treatment procedures and phases described herein can also be used to fill or obturate treatment regions of a tooth after cleaning. In obturation procedures, the embodiments disclosed herein can advantageously obturate or fill substantially the entire canal(s) and/or branch structures therefrom, as explained in greater detail herein.

IV. Examples of Coupling Members

Figure 5:
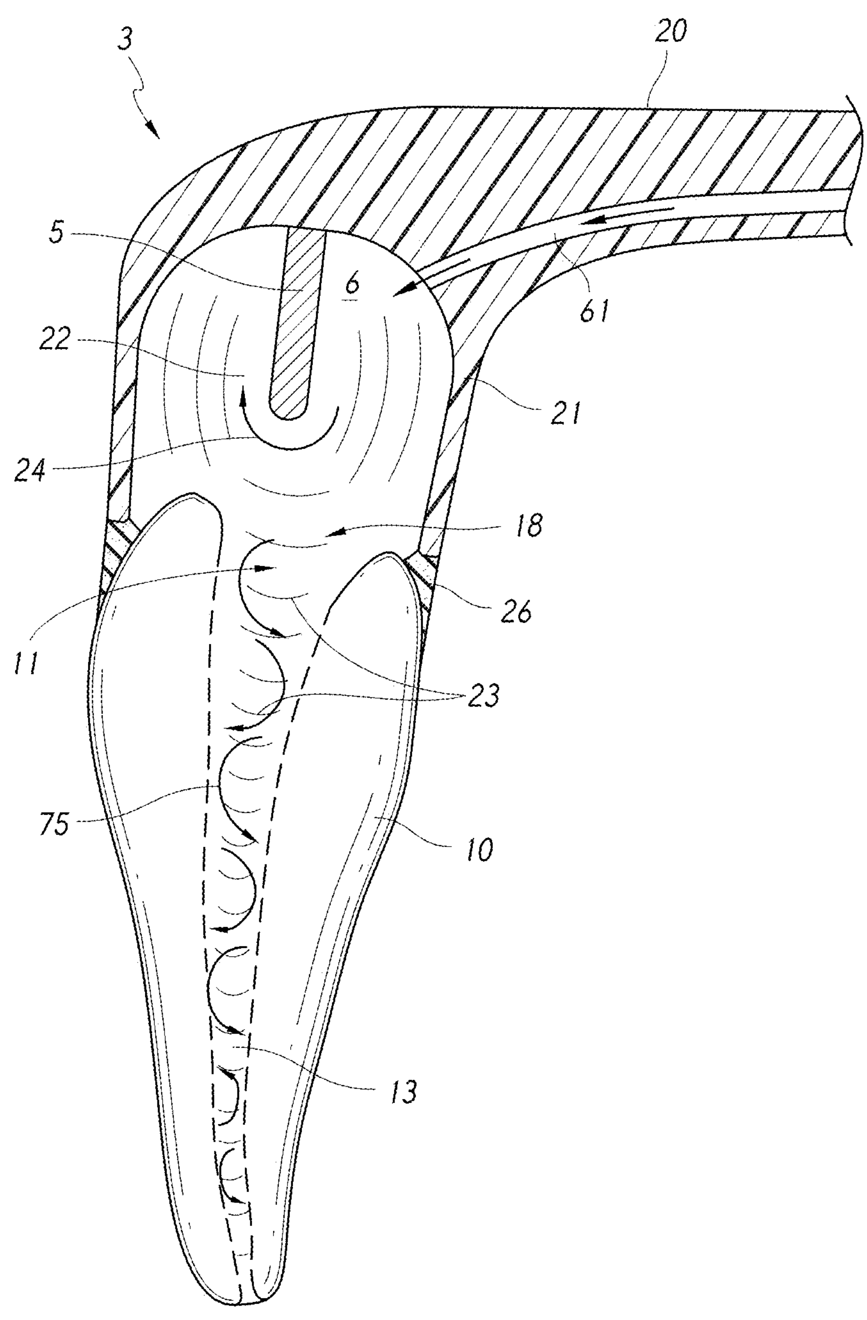
FIG. 5 is a schematic cross-sectional side view of a coupling member having a fluid inlet passing therethrough.

FIG. 5 is a schematic cross-sectional side view of a coupling member 3 having a fluid inlet 61 passing therethrough. In FIG. 5, the coupling member 3 comprises a distal portion 21 of a handpiece 20. A pressure wave generator 5 can be coupled to or integrally formed with the coupling member 3. As shown in FIG. 5, the pressure wave generator 5 can be disposed inside a chamber 6 of the coupling member 3 and outside the tooth 10. The coupling member 3 can be applied over an access opening 18 of the tooth 10. For example, a tooth seal 26 can be applied in flowable form over a top (e.g., occlusal) surface of the tooth 10 to provide a stable coupling surface to which the coupling member 3 can be secured. In some embodiments, the tooth seal 26 can be hardened to form a substantially solid material.

Once the coupling member 3 is secured to the tooth 10, the chamber 6 of the coupling member 3 can be at least partially, and in some arrangements substantially, filled with a suitable fluid 22. For example, as explained above, a treatment fluid can be used in cleaning treatments. An obturation material can be used in filling or obturation procedures. The fluid inlet 61 can comprise a hole or port in fluid communication with a fluid inlet line passing through or along the handpiece 20. Fluid 22 can be supplied actively (e.g., by way of a pump) or passively (e.g., by way of gravity or other potential flow) from the console 2 through the inlet line of the handpiece 20 and into the chamber 6. The pulp cavity 11 and/or chamber 6 of the coupling member 3 can be substantially filled with the fluid 22. For example, a controller in the console 2 can controllably direct the fluid 22 into the chamber 6 through the fluid inlet 61.

During a treatment procedure, the pressure wave generator 6 can be activated to generate sufficient fluid motion 24 and/or pressure waves 23 to clean unhealthy materials from the tooth 10, e.g., from the pulp cavity 11 and root canal 13. The fluid motion 24 can act to detach or break up the undesirable materials in the tooth 10, and can remove the materials from the tooth 10. For example, the fluid motion 24 can remove large particles or deposits of diseased tissue in some arrangements. The fluid motion 24 can also act to replenish chemical reactants supplied with the fluid 22. The pressure waves 23 can propagate through the fluid 22 and tooth to enhance the reactivity of the fluid 22 with the unhealthy materials in the tooth 10. For example, the pressure waves 23 can induce acoustic cavitation and other fluidic effects described herein that can enable the removal of unhealthy or undesirable materials from small spaces in the tooth 10, such as tubules, cracks, crevices, etc. The pressure wave generator 5 of FIG. 5 can be any suitable pressure wave generator disclosed herein, such as, a liquid jet device. In other embodiments, as explained above, the pressure wave generator 5 can also be used to fill or obturate the root canal 13. In such arrangements, the fluid 22 can comprise a flowable obturation material. The embodiments disclosed herein can advantageously obturate or fill substantially the entire canal(s) and/or branch structures therefrom, as explained in greater detail herein.

The tooth seal 26 can comprise a fluid-permeable material in the embodiment of FIG. 5. For example, the tooth seal 26 can include pores or other spaces through which waste fluid can flow. Accordingly, during a treatment procedure, fluid 22 can enter the tooth 10 and chamber 6 by way of the fluid inlet 61, and waste fluid can exit the tooth 10 and/or chamber 6 by way of the permeable tooth seal 26.

Figure 6:
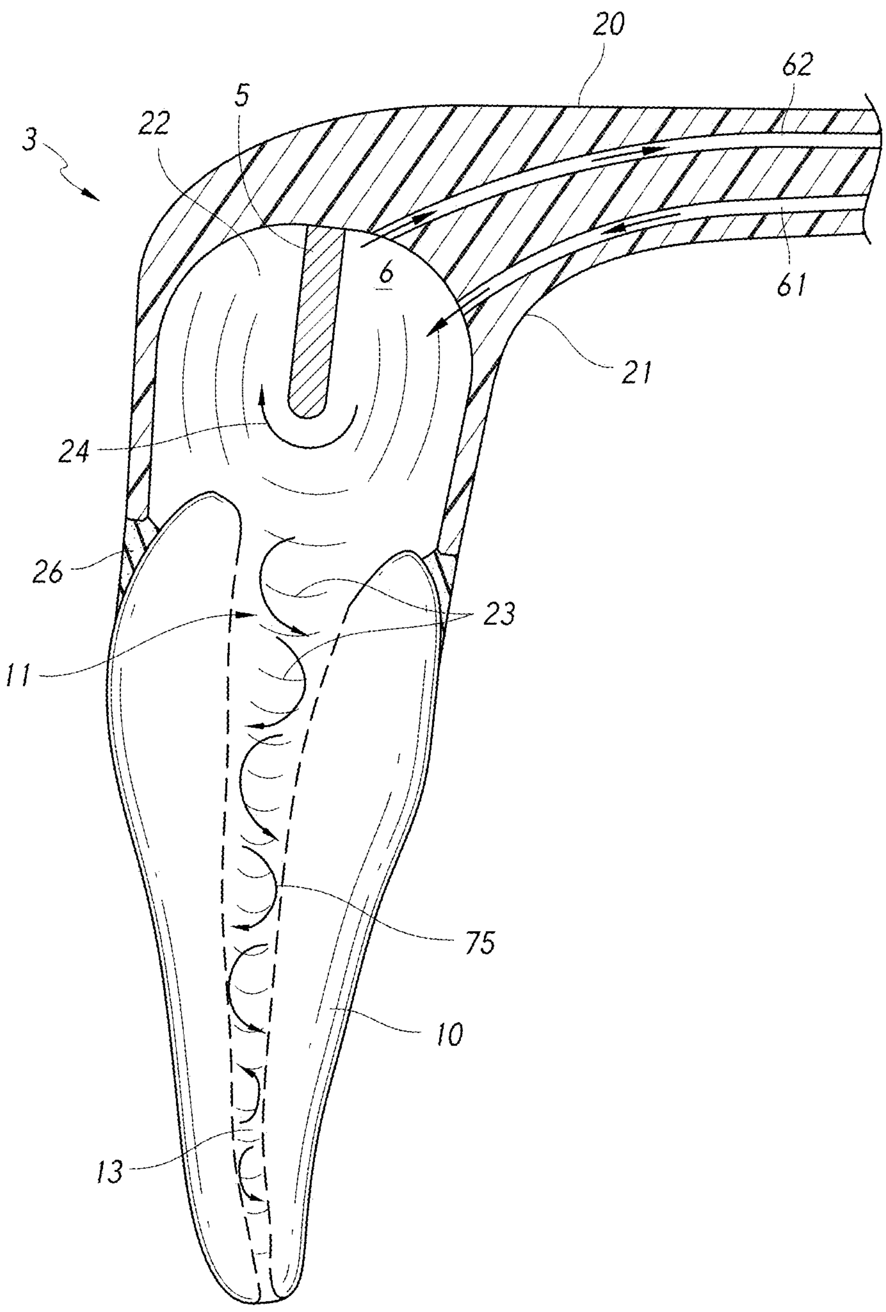
FIG. 6 is a schematic cross-sectional side view of a coupling member having a fluid inlet and a fluid outlet passing therethrough.

FIG. 6 is a schematic cross-sectional side view of a coupling member 3 having a fluid inlet 61 and a fluid outlet 62 passing therethrough. As with FIG. 5, a pressure wave generator 5 can be coupled to or integrally formed with the coupling member 3, and can be disposed in the chamber 6 of the coupling member 3. As explained herein, the pressure wave generator 5 can be used to clean and/or fill a tooth 10. Furthermore, as with the embodiment of FIG. 5, the fluid inlet 61 can be formed through the handpiece 20 and coupling member 3 to supply fluid 22 to the chamber 6 and the tooth 10. As above, the pressure wave generator 5 can be activated to induce pressure waves 23 and fluid motion 24 to clean unhealthy materials from the tooth 10. The pressure wave generator 5 of FIG. 6 can be any suitable pressure wave generator disclosed herein, such as, a liquid jet device.

In addition, a fluid outlet 62 can be disposed through the handpiece 20 to convey fluid out of the tooth 10 and chamber 6. For example, the fluid outlet 62 can act as a waste line, in which waste fluid can be expelled from the chamber 6 and tooth 10. The fluid outlet 62 can be incorporated to allow waste liquid to exit the chamber 6 into a hose which can be connected to a collection canister or a drain. The fluid outlet 62 can be an active or passive outlet. For a passive fluid outlet 62, in some cases the waste treatment liquid moves through a conduit due to capillary forces, gravity, or because of a slight overpressure created in the enclosed volume. For an actively pumped fluid outlet 62, the waste liquid can be transferred using a pump, suction, or other device that draws liquid out through an outflow conduit. In some arrangements, for example, the fluid outlet 62 can be connected to the suction system and/or vacuum lines in the clinician's office. In the embodiment of FIG. 6, the tooth seal 26 may or may not be permeable to fluid.

Accordingly, the embodiment disclosed in FIG. 6 can include both the inlet port 61 and the outlet port 62, which can balance the amount of fluid 22 in the tooth 10 at a given time. For example, the console 2 can be programmed such that the amount of fluid entering the tooth 10 and/or chamber 6 through the inlet port 61 is substantially the same as the amount of fluid exiting the tooth 10 and/or chamber 6 through the outlet port 62.

Figure 7A:
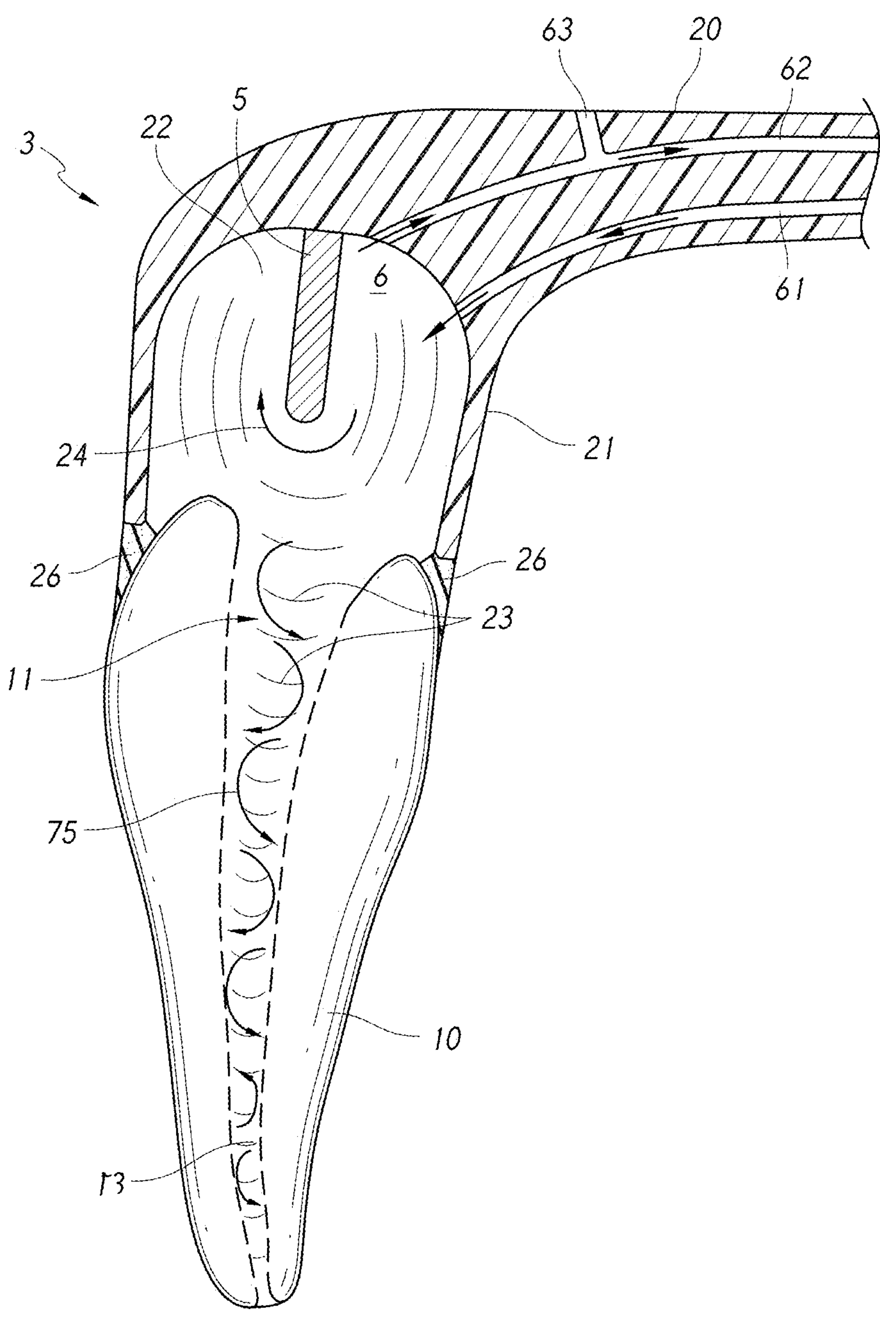
FIG. 7A is a schematic cross-sectional side view of a coupling member having a fluid inlet, a fluid outlet, and a vent configured to regulate a pressure inside the chamber and/or tooth.

FIG. 7A is a schematic cross-sectional side view of a coupling member 3 having a fluid inlet 61, a fluid outlet 62, and a vent 63 configured to regulate a pressure inside the chamber 6 and/or tooth 10. As with the embodiments of FIGS. 6A and 6B, the coupling member 3 can be coupled to or formed with a pressure wave generator 5 adapted to clean and/or fill a tooth 10. The coupling member 3 can be part of the distal end portion 21 of the handpiece 20. The coupling member 3 can couple to the tooth by way of the tooth seal 26.

The pressure wave generator 5 can be disposed inside the chamber 6 outside the tooth 10. The pressure wave generator 5 of FIG. 7A can be any suitable pressure wave generator disclosed herein, such as, a liquid jet device. Fluid 22 can be supplied to the tooth 10 and chamber 6 by way of the fluid inlet 61. For example, the fluid 22 can substantially fill the chamber 6. The pressure wave generator 5 can be activated to clean unhealthy material from the tooth 10. For example, as explained herein, the pressure wave generator 5 can generate pressure waves 23 and fluid motion 24 sufficient to clean and/or fill the tooth 10.

As shown in FIG. 7A, one or more vents 63 can be provided or formed in the coupling member 3 and/or the distal end portion 21 of the handpiece 20. The vent(s) 63 can act to at least partially regulate pressure of the fluid 22 inside the chamber 6 of the coupling member 3. For example, the vent(s) 63 can be disposed along the fluid outlet 62 (e.g., waste line). The vent 63 can fluidly communicate with the exterior environs, and air from the exterior environs can be entrained with the fluid outlet line 62.

In some vented arrangements, the inlet and outlet flow rates can be driven by independent driving forces. For example, in some implementations, the fluid inlet 61 can be in fluid communication with and driven by a pressure pump, while the fluid outlet 62 can be in fluid communication with and controlled via an evacuation system (e.g., a suction or vacuum pump). In other implementations, the fluid inlet 61 or outlet 62 can be controlled with a syringe pump. The pressures of the fluid inlet 61 and the fluid outlet 62 can be such that a negative net pressure is maintained in the chamber 6. Such a net negative pressure can assist delivering the treatment fluid into the chamber 6 from the fluid inlet 61.

In various embodiments described herein, the vents 63 can take the form of a permeable or semi-permeable material (e.g., a sponge), openings, pores, or holes, etc. The use of vents in a controlled fluid system can lead to one or more desirable advantages. For example, the evacuation system can collect waste fluid from the chamber 6, as long as there is any available. If there is a pause in treatment (e.g. the time between treatment cycles), waste fluid flow may stop, and the evacuation system may start drawing air through the one or more vents 63 to at least partially compensate for the lack of fluid supplied to the evacuation system, rather than depressurizing the chamber 6. If the evacuation system stops working for any reason, the waste fluid may flow out through the one or more vents 63 into the patient's mouth or onto a rubber dam (if used), where it can be collected by an external evacuation line. Therefore, the use of vent(s) can tend to dampen the effects of the applied pressure differential, and therefore can inhibit or prevent negative or positive pressure buildup. Also note that positive or negative pressure inside the chamber 6 can exert some amount of force on the sealing material(s), and as such a stronger seal may be required to withstand such force in some cases. Possible advantages of some vented systems include that the vent(s) help relieve pressure increases (or decreases) inside the chamber 6, reduce or eliminate the forces acting on the tooth seal 26, and therefore render the sealing more feasible and effective.

Figure 7B:
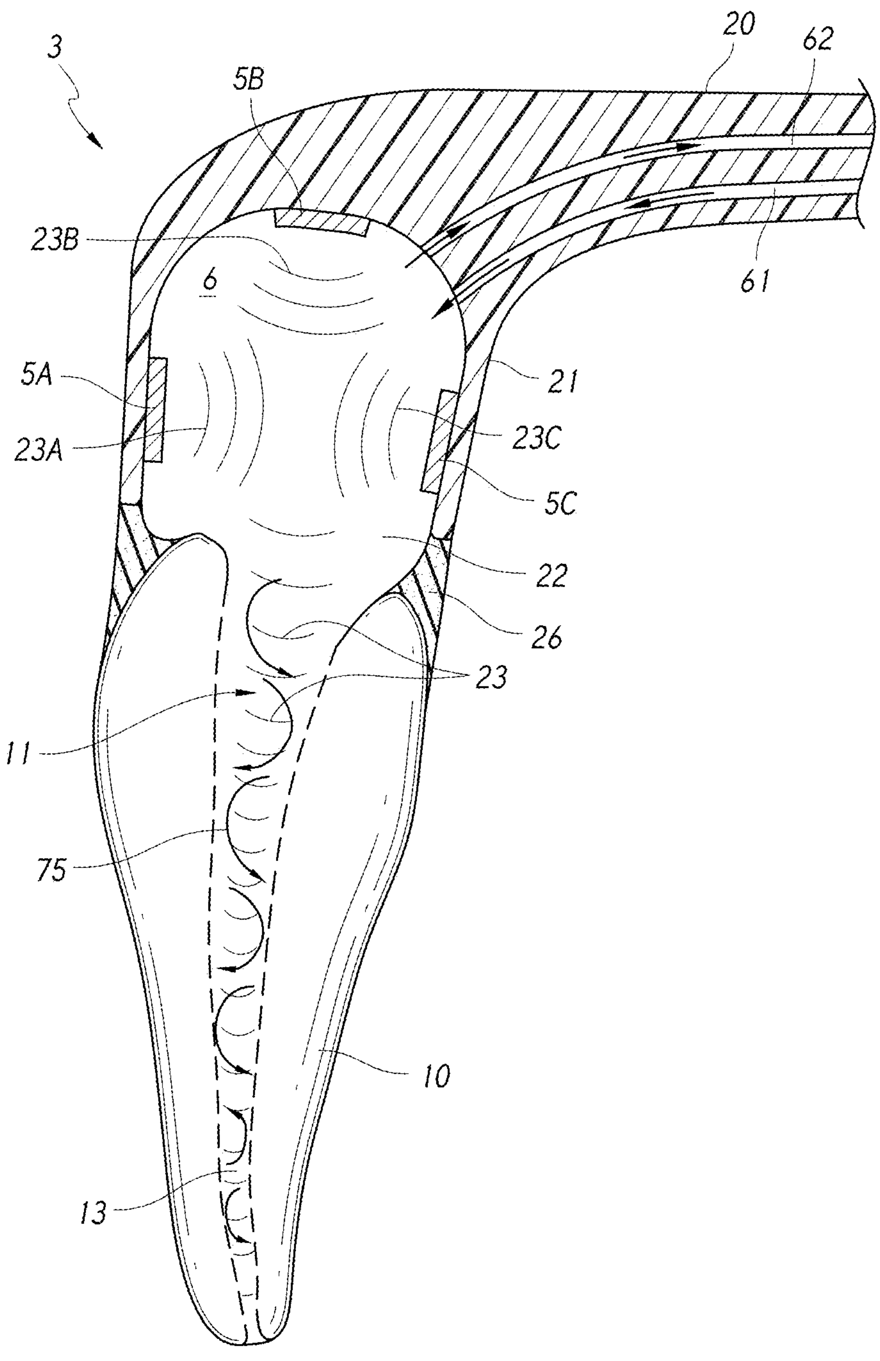
FIG. 7B is a schematic cross-sectional side view of a plurality of pressure wave generators coupled with a coupling member.

FIG. 7B is a schematic cross-sectional side view of a plurality of pressure wave generators 5A, 5B, 5C coupled with a coupling member 3. As with the embodiments of FIGS. 5-7A, the pressure wave generators 5A, 5B, 5C can be disposed in the chamber 6 of the coupling member 3 outside the tooth 10. For example, the pressure wave generators 5A, 5B, 5C can be coupled to walls of the coupling member 3. The pressure wave generators 5A, 5B, 5C of FIG. 7B can be any suitable pressure wave generator disclosed herein, such as a liquid jet device. In some embodiments, at least one of the pressure wave generators 5A, 5B, 5C can comprise an acoustic energy source. The pressure wave generators 5A, 5B, 5C can be the same type of pressure wave generator, or they can be different types of pressure wave generators. Although three pressure wave generators 5A, 5B, 5C are shown in FIG. 7B, it should be appreciated that there could be any suitable number of pressure wave generators, such as one, two, four, five, or more.

As above, the coupling member 3 can be coupled to the tooth 10 by way of the tooth seal 26. Fluid 22 can be supplied to the chamber 6 by way of the fluid inlet 61. For example, the fluid 22 can substantially fill the chamber 6. The fluid outlet 62 can convey waste fluid out of the tooth 10 and the chamber 6. Although not illustrated in FIG. 7B, one or more vents can also be provided to regulate the pressure in the chamber 6 and tooth 10.

During a treatment procedure, the pressure wave generators 5A, 5B, 5C can be activated sequentially or simultaneously. Advantageously, in some embodiments, the pressure wave generators 5A, 5B, 5C can be configured to generate corresponding pressure waves 23A, 23B, and 23C having different frequencies and/or powers. For example, the pressure wave generator 5A can generate a corresponding pressure wave 23A having a first frequency or a first range of frequencies. The pressure wave generator 5B can generate a corresponding pressure wave 23B having a second frequency or a second range of frequencies different form the first frequency or first range. The pressure wave generator 5C can generate a corresponding pressure wave 23C having a third frequency or a third range of frequencies that are different from the first and second frequencies/ranges. In some embodiments, the frequency ranges may overlap. In still other embodiments, the frequencies and ranges of frequencies can be about the same. For example, in some embodiments, each pressure wave generator 5A, 5B, 5C can generate pressure waves 23A, 23B, 23C across the full spectrum illustrated in FIG. 4A or 4C.

As explained herein, different frequencies of pressure waves may be effective at detaching or disrupting different types of tissue. For example, some frequencies may be more effective at detaching relatively large portions of unhealthy material from the tooth 10, and other frequencies may be more effective at detaching relatively small portions of unhealthy material from the tooth 10. Still other frequencies may be particularly effective at detaching intermediate sized portions from the tooth 10. In some embodiments, the acoustic frequencies that are effective at detaching material from the tooth 10 may be related to the composition of unhealthy material to be removed. For example, some frequencies may be more effective at removing diseased pulp tissue, while other frequencies may be more effective at removing calcified deposits. Still other frequencies may be effective at removing bacteria, biofilms, caries, plaque, calculus, etc.

To completely clean the tooth 10, it can be desirable to remove all types of unhealthy or undesirable materials from the tooth 10. For example, it can be desirable to remove organic and inorganic tissue from the root canal 13, in addition to bacteria, biofilms, and portions of the smear layer (if applicable). For exterior surfaces or portions of the tooth 10, it can be desirable to remove carious regions, in addition to dental deposits such as plaque, calculus, etc. Accordingly, during a treatment procedure, it can be desirable to propagate pressure waves 23A, 23B, 23C across the full range of frequencies that correspond to effective detachment of all types of unhealthy materials. In some embodiments, the full range of frequencies can be applied substantially simultaneously. For example, an acoustic signal comprising a random or noisy distribution of frequencies can be applied to the tooth 10 to clean all the unhealthy portions from the tooth 10.

In other embodiments, pressure wave generators 5A, 5B, 5C corresponding to a particular range of frequencies may be applied sequentially to sequentially remove the various types and/or sizes of unhealthy material from the tooth 10. For example, during a first treatment phase, the pressure wave generator 5A may be activated first to propagate pressure waves 23A corresponding to the first frequency or range of frequencies. During a second treatment phase, the pressure wave generator 5B may be activated next to propagate pressure waves 23B corresponding to the second frequency or range of frequencies. During a third treatment phase, the pressure wave generator 5C may be activated to propagate pressure waves 23C corresponding to the third frequency or range of frequencies. In some embodiments, the clinician can select the treatment phase as desired, e.g., to target a specific type or size of unhealthy material. In other embodiments, the system can be configured such that the treatment phases are automatically cycled in order to activate each of the plurality of pressure wave generators. In some arrangements, the system can be configured such that the treatment phases are randomly cycled.

Furthermore, the pressure wave generators 5A, 5B, 5C can act to induce bulk fluid movement, e.g., fluid motion 24 in the chamber 6, as described herein. In addition, in some embodiments, the pressure wave generators 5A, 5B, 5C can act to obturate or fill a treated tooth or treatment region. Accordingly, in the embodiment of FIG. 7B, multiple pressure wave generators 5A, 5B, 5C can be used sequentially and/or simultaneously to propagate acoustic waves in multiple frequency bands to substantially clean and/or fill the tooth 10 or a treatment region thereof.

V. Examples of Tooth Seals and Alignment Features

Figure 8A:
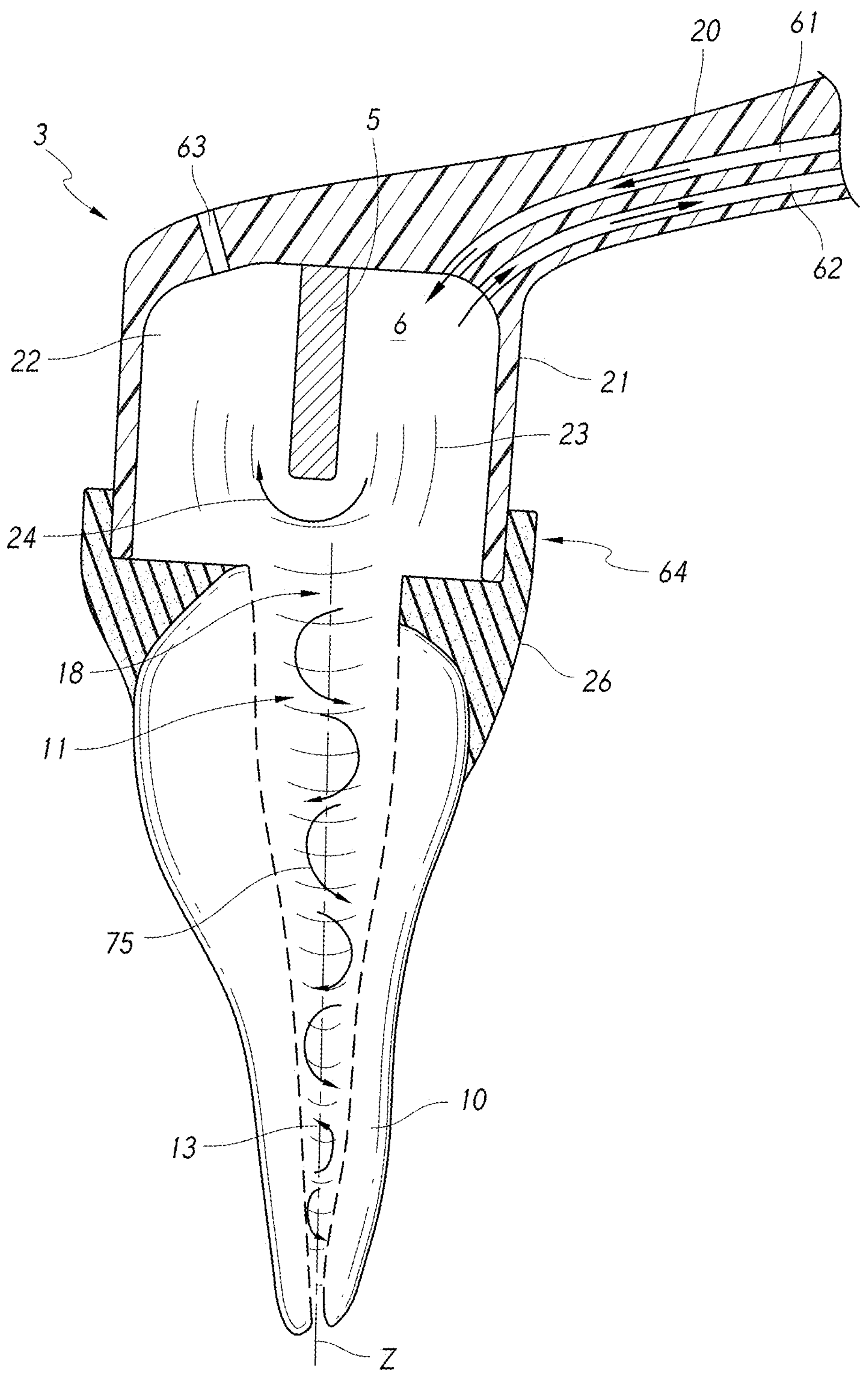
FIG. 8A is a schematic side cross-sectional view of a coupling member attached or coupled to a tooth by way of a locking tooth seal.

FIG. 8A is a schematic side cross-sectional view of a coupling member 3 attached or coupled to a tooth 10 by way of a locking tooth seal 26. It can be important to provide a stable coupling surface upon which to couple the coupling member 3. For example, if the coupling member 3 and pressure wave generator 5 are permitted to move significantly relative to the tooth 10, then the results of the procedure may be inconsistent and unsuitable.

Accordingly, the clinician can form an access opening 18 in the tooth 10. The tooth seal 26 can be applied around a perimeter of the access opening 18 such that the tooth seal 26 comprises a peripheral boundary. The chamber 6 and positioning member 3 can be positioned within the peripheral boundary of the tooth seal 26 to secure the chamber 6 and positioning member 3 to the tooth seal 26. Furthermore, it can be important to prevent or reduce lateral movement of the positioning member 3 relative to the tooth 10, e.g., movement transverse to a central axis Z of the root canal 13. For example, a locking wall 64 can be defined along the periphery of the tooth seal 26. The locking wall 64 can extend upwardly relative to the tooth 10, such that the wall 64 prevents lateral movement of the positioning member 3 and to help secure the coupling member 3 to the tooth 10. The lateral wall 64 can be defined to have a width or diameter slightly larger than a corresponding width or diameter of the coupling member 3. The lateral wall 64 can be defined to have tolerances such that a snug fit is formed between the seal 26 and the coupling member 3.

In some embodiments, the clinician can form the tooth seal 26 and locking wall 64 using a mold. The mold can be shaped to correspond to the ultimate profile of the seal 26 and locking wall 64. For example, the clinician can apply the mold about the tooth 10 and can flow the sealing material inside the mold in a flowable state. The sealing material can be cured (e.g., heated, exposed to ultraviolet light, etc.) such that the sealing material hardens into a solid or semi-solid state. In other embodiments, the clinician can manually shape the tooth seal 26 and locking wall 64 to have the desired dimensions and shape.

The clinician can apply the coupling member 3 to the seal 26 between and/or within the boundary defined by the locking wall 64. The seal 26 can comprise a substantially planar surface upon which the distal end of the coupling member 3 rests. As explained above, the locking walls 64 can prevent lateral movement of the coupling member 3. In some embodiments, the coupling member 3 can be attached to the seal 26, while in other embodiments, the clinician can press the coupling member 3 against the seal 26.

Fluid 22 can be supplied to the chamber 6 by way of the fluid inlet 61 such that the chamber 6 is at least partially or substantially filled with the fluid 22. The pressure wave generator 5 can be activated to substantially clean and/or fill the tooth 10. For example, as explained herein, the pressure wave generator 5 can induce pressure waves 23 and fluid motion 24 in the chamber 6 and/or tooth 10 that are sufficient to clean and/or fill the tooth 10. As above, the pressure wave generator 5 of FIG. 8A can be any suitable pressure wave generator, such as a liquid jet device. Waste fluid can flow out of the tooth 10 and chamber 6 by way of the fluid outlet 62 along the handpiece 20. A vent 63 can be provided to regulate the pressure in the tooth 10 and/or chamber 6. As shown in FIG. 8A, for example, the vent 63 can be formed through a wall of the coupling member 3 to provide fluid communication with the exterior environs, e.g., air.

Figure 8B:
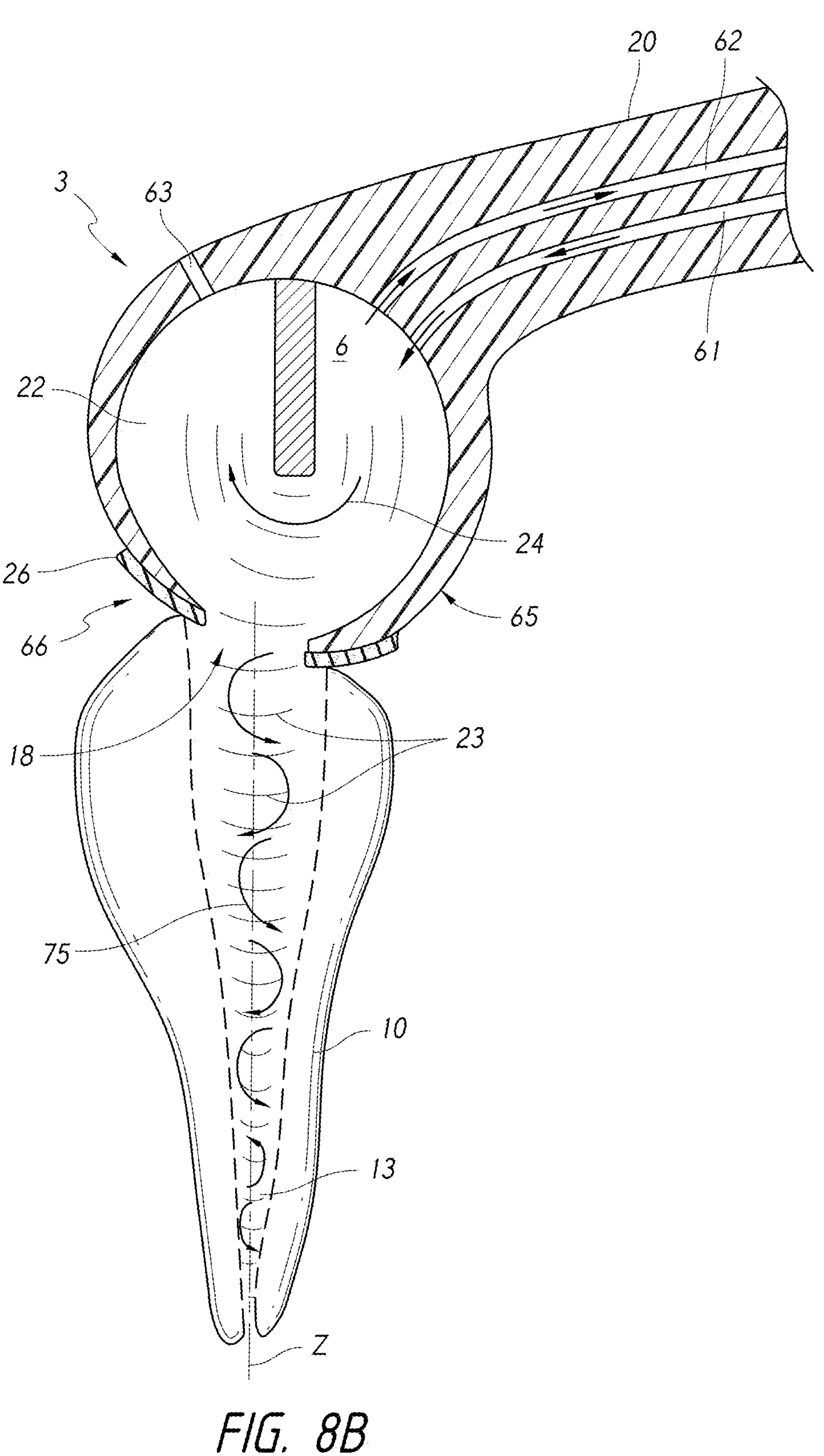
FIG. 8B is a schematic side cross-sectional view of a coupling member having a curved distal end portion shaped to mate with a curved surface of a tooth seal.

FIG. 8B is a schematic side cross-sectional view of a coupling member 3 having a curved distal end portion 65 shaped to mate with a curved surface 66 of a tooth seal 26. As shown in FIG. 8B, the coupling member 3 can be ball-shaped in some embodiments. In some procedures, it may be desirable for the clinician to rotate the coupling member 3 and pressure wave generator 5 to a desired orientation relative to the tooth 10. For example, the clinician may desire to position the pressure wave generator 5 at a particular location and/or orientation relative to the access opening 18 of the tooth 10. As explained herein, it can be advantageous in some arrangements to direct or pass fluid across the access opening 18 transverse to a central axis Z of the root canal 13.

In some embodiments, the tooth seal 26 can be applied to the tooth 10 about the access opening 18 such that the tooth seal 26 comprises a curved surface 66, e.g., a surface defining a concave portion facing the coupling member 3 and an opposing convex portion facing the tooth 10. As above, the seal 26 can be formed using a mold in some embodiments. In other embodiments, the clinician can manually shape the curved surface 66 of the tooth seal 26. The curved surface 66 of the tooth seal 26 can be defined to have a curvature (e.g., a radius of curvature) that is approximately the same as a curved distal portion 65 of the coupling member 3.

After forming the tooth seal 26, the clinician can apply the curved distal portion 65 of the coupling member 3 to the corresponding curved surface 66 of the tooth seal 26 such that the curved distal portion 65 mates with the complementary curved surface 66 of the seal 26. In some embodiments, the tooth seal 26 is fixed relative to the tooth 10 and the curved distal portion 65 is rotationally free to move relative to the seal 26. In other embodiments, the curved surface 66 of the tooth seal 26 and the curved distal portion 65 are coupled together and free to rotate relative to the tooth 10 and access opening 18.

As explained above, fluid 22 is supplied to the chamber 6 and the tooth 10 by way of the fluid inlet 61. For example, the chamber 6 can be substantially filled with the fluid 22. The pressure wave generator 5 can be activated to substantially clean the tooth 10, e.g., to remove unhealthy materials from the tooth. The pressure wave generator 5 can generate pressure waves 23 and fluid motion 24 sufficient to clean the tooth 10. Waste fluid can be removed from the tooth 10 and chamber 6 by way of the fluid outlet 62. The vent 63 can be provided in the coupling member 3 to regulate the pressure in the tooth 10 and/or chamber 6.

During the treatment procedure, the clinician may want to manipulate the coupling member 3 and/or pressure wave generator 5 to orient the pressure wave generator 5 at a desired orientation and/or position. In the embodiment of FIG. 8B, for example, the clinician can manually rotate the handpiece 20, which in turn rotates the coupling member 3 and the curved distal portion 65 of the coupling member 3. The curved distal portion 65 can rotate relative to the curved surface 66 of the tooth seal 26 until the coupling member 3 and pressure wave generator 5 are oriented relative to the tooth 10 at a desired orientation. Accordingly, the tooth seal 26 and curved coupling member 3 can advantageously be used by a clinician to rotate the coupling member 3 relative to the tooth 10.

Figure 8C:
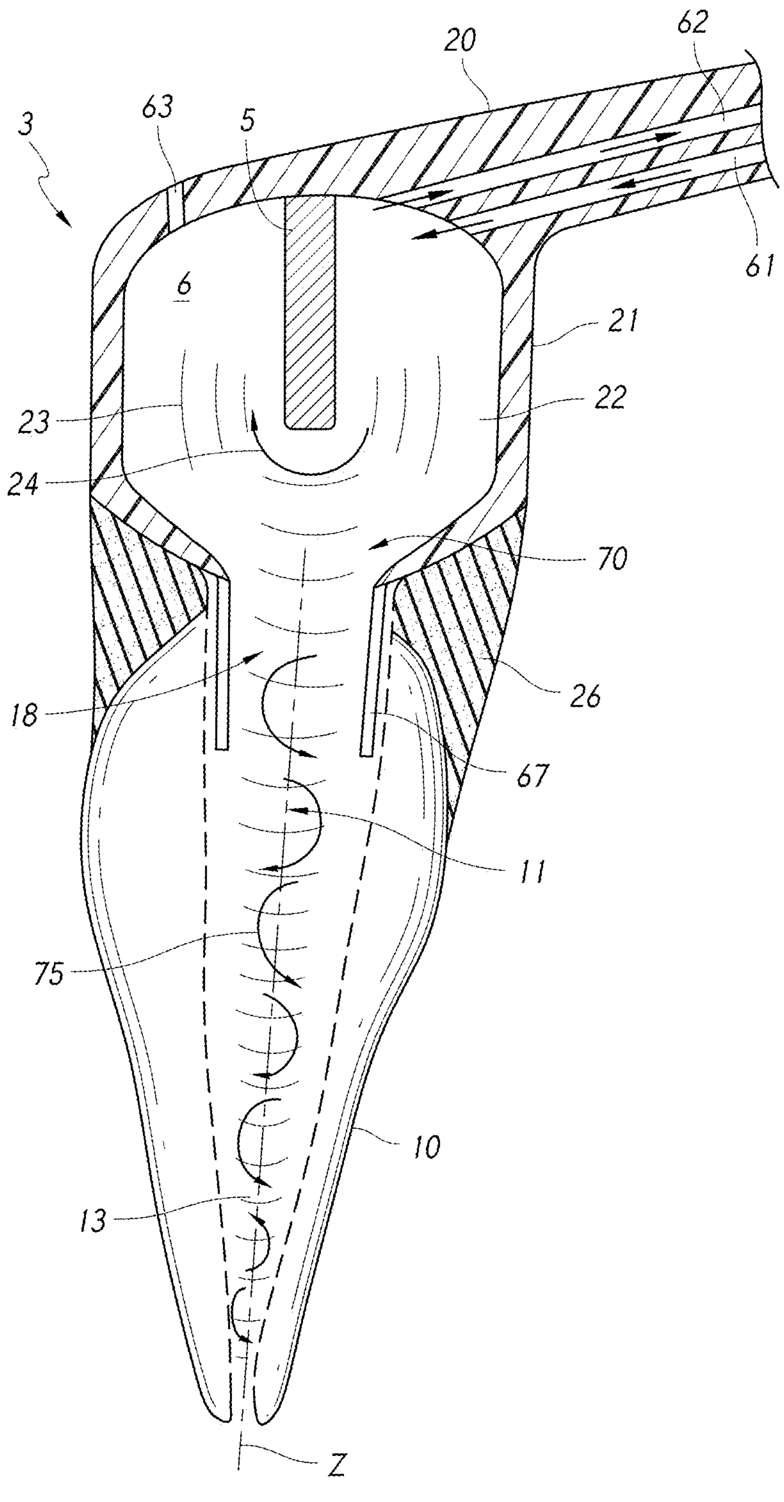
FIG. 8C is a schematic side cross-sectional view of a coupling member having an alignment feature comprising a mating tube sized and shaped to fit through an access opening formed in the tooth.

FIG. 8C is a schematic side cross-sectional view of a coupling member 3 having an alignment feature comprising a mating tube 67 sized and shaped to fit through an access opening 18 formed in the tooth 10. As shown in FIG. 8C, the coupling member 3 can comprise an access aperture 70 that defines an opening configured to provide fluid communication between the chamber 6 and the tooth 10. The mating tube 67 can surround and extend from the access aperture 70 of the coupling member 3.

In some embodiments, such as treatment procedures applied to a premolar tooth, it can be challenging to align the coupling member 3 to the access opening 18 of the tooth 10. Accordingly, in some embodiments, the clinician can form the access opening 18 and can apply the tooth seal 26 about the access opening 18 of the tooth 10. The clinician can apply the coupling member 3 to the tooth seal 26 such that the mating tube 67 is inserted through the access opening 18 and into a portion of the tooth 10. As shown in FIG. 8C, the mating tube 67 can help the clinician find the access opening 18 during treatment. Furthermore, the mating tube 67 can help laterally secure the coupling member 3 relative to the tooth 10. For example, the mating tube 67 can prevent the coupling member 3 from translating in a direction transverse to a central axis Z of the root canal 13 during treatment. The coupling member 3 can be attached to the seal 26, or the clinician can press the coupling member 3 against the tooth seal 26.

As above, the chamber 6 can be substantially filled with fluid 22 supplied by the fluid inlet 61. The pressure wave generator 5 can be activated to generate pressure waves 23 and fluid motion 24 in the chamber 6 and/or tooth 10. The pressure wave generator 5 can act to substantially clean and/or fill the tooth 10. Waste fluid can be removed by the fluid outlet 62. A vent 63 can be provided to regulate the pressure in the tooth 10 and/or chamber 6. Accordingly, the embodiment disclosed in FIG. 8C can advantageously align the coupling member 3 with the access opening 18 of the tooth 10 and can help to secure the coupling member 3 relative to the tooth 10.

VI. Examples of Pressure Wave Generators

Figure 9A:
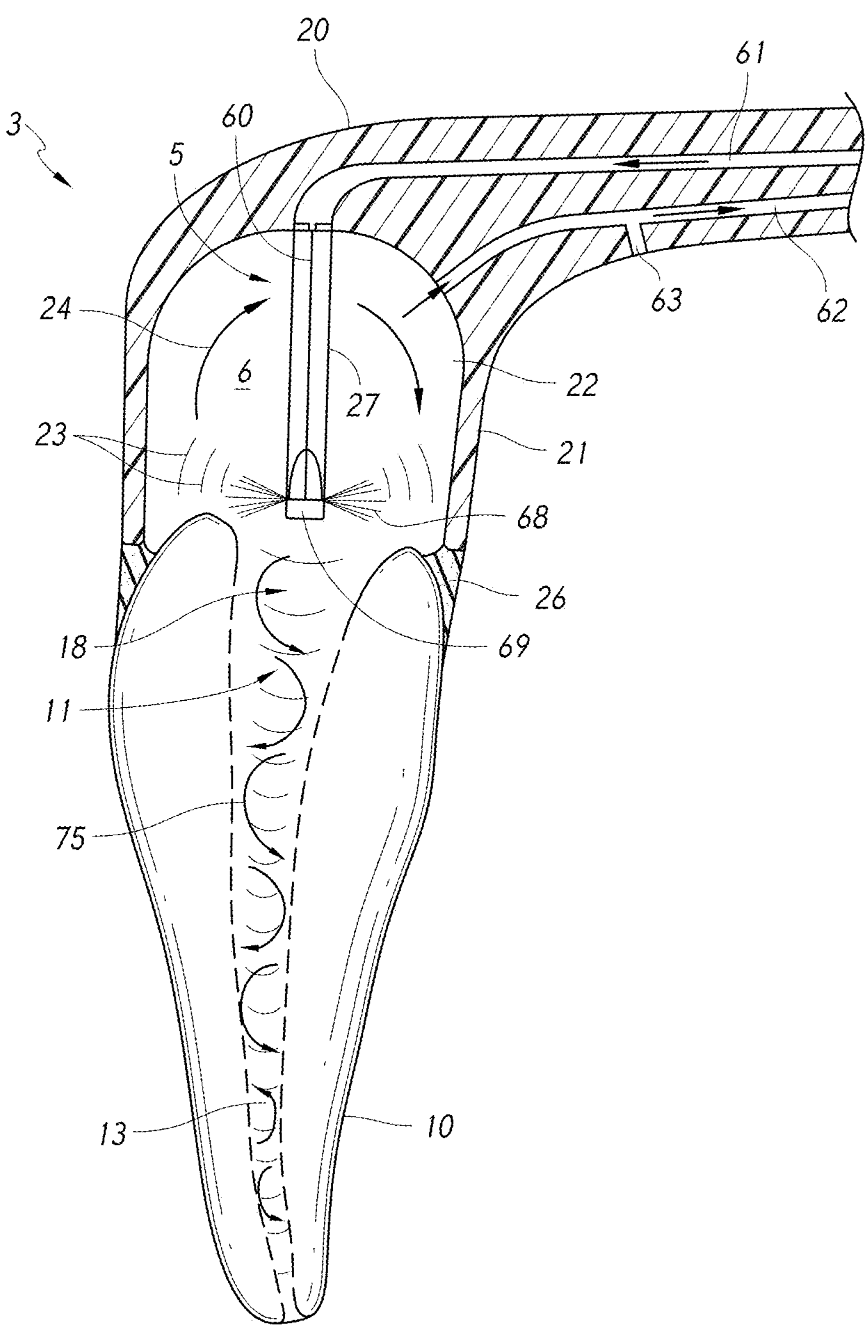
FIG. 9A is a schematic side cross-sectional view of a coupling member and a pressure wave generator comprising a liquid jet device.

FIG. 9A is a schematic side cross-sectional view of a coupling member 3 and a pressure wave generator 5 comprising a liquid jet device. As with the embodiments of FIG. 5-8C, the coupling member 3 can couple to the tooth 10 by way of a tooth seal 26. The pressure wave generator 5 can be disposed in the chamber 6 of the coupling member 3 outside the tooth 10. The fluid inlet 61 can supply fluid 22 to the tooth 10, and the pressure wave generator 5 can be activated to clean the tooth 10.

As shown in FIG. 9A, the pressure wave generator 5 comprises a liquid jet device. The liquid jet device can include a guide tube 60 and an impingement member 69 disposed at a distal end of the guide tube 60. A liquid jet 60 can be formed by a nozzle or orifice disposed in the distal end portion 21 of the handpiece. The jet 60 can propagate through a channel of the guide tube 27. One or more openings in the guide tube 27 can permit the jet 60 to interact with the fluid 22 filling the chamber 6. The jet 60 can impinge upon the impingement member 69, and can form a spray 68 of fluid that disperses through the fluid 22 in the chamber 6. Additional details of the liquid jet device disclosed in FIG. 9A can be found at least in ¶¶[0045]-[0050], [0054]-[0077] and various other portions of U.S. Patent Publication No. US 2011/0117517, published May 19, 2011, and in ¶¶[0136]-[0142] and various other portions of U.S. Patent Publication No. US 2012/0237893, published Sep. 20, 2012, each of which is incorporated by reference herein in its entirety and for all purposes.

A fluid inlet 61 can supply fluid 22 to the tooth 10. In the embodiment of FIG. 9A, the liquid jet device can comprise the fluid inlet 61. As explained herein, the interaction of the liquid jet 60 with the fluid 22 and the impingement member 69 can create pressure waves 23 and fluid motion 24 that are sufficient to clean the tooth 10 (or fill or obturate the tooth in obturation treatments). As above, waste fluid can be removed from the chamber 6 and tooth 10 by way of the fluid outlet 62. One or more vents 63 can be provided to regulate the pressure in the tooth 10 and/or chamber 6.

Figure 9B:
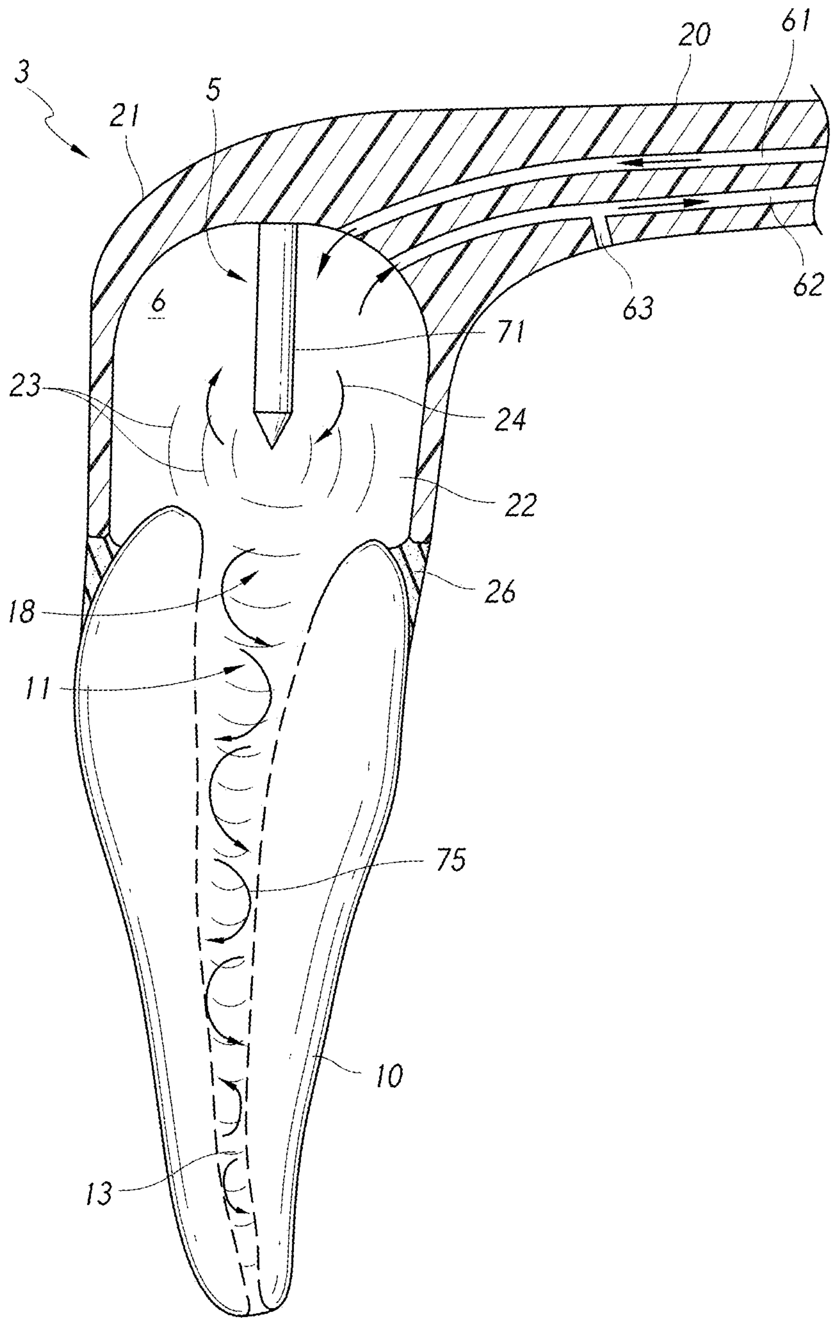
FIG. 9B is a schematic side cross-sectional view of a coupling member and a pressure wave generator comprising a light emitting element.

FIG. 9B is a schematic side cross-sectional view of a coupling member 3 and a pressure wave generator 5 comprising a light emitting element 71. Unless otherwise noted, the components illustrated in FIG. 9B are similar to or the same as similarly numbered components in FIG. 9A. The light emitting element 71 can be disposed in the chamber 6 of the coupling member 3. A laser beam or other suitable light source can propagate electromagnetic energy into the chamber 6, and the electromagnetic energy can be transformed into pressure waves 23 as it enters the fluid 22. In some embodiments, the laser beam can be directed into the chamber 6 as a collimated and coherent beam of light. The collimated laser beam can be sufficient to generate pressure waves 23 as the light delivers energy to the fluid 22. The concentrated energy can be transformed into pressure waves 23 sufficient to clean the undesirable dental matter. In some embodiments, the wavelength of the laser beam or electromagnetic source can be selected to be highly absorbable by the treatment fluid in the chamber or mouth (e.g., water) and/or by the additives in the treatment fluid (e.g., nanoparticles, etc.). For example, at least some of the electromagnetic energy may be absorbed by the fluid (e.g., water) in the chamber, which can generate localized heating and pressure waves 23 that propagate in the fluid. The acoustic waves generated by the electromagnetic beam can generate photo-induced or photo-acoustic cavitation effects in the fluid. In some embodiments, the localized heating can induce rotational fluid flow 24 in the chamber 6 and/or tooth 10 that further enhances cleaning of the tooth 10. In obturation procedures, the pressure wave generator 5 of FIG. 9B can be used to substantially fill the treated root canal 13.

Figure 9C:
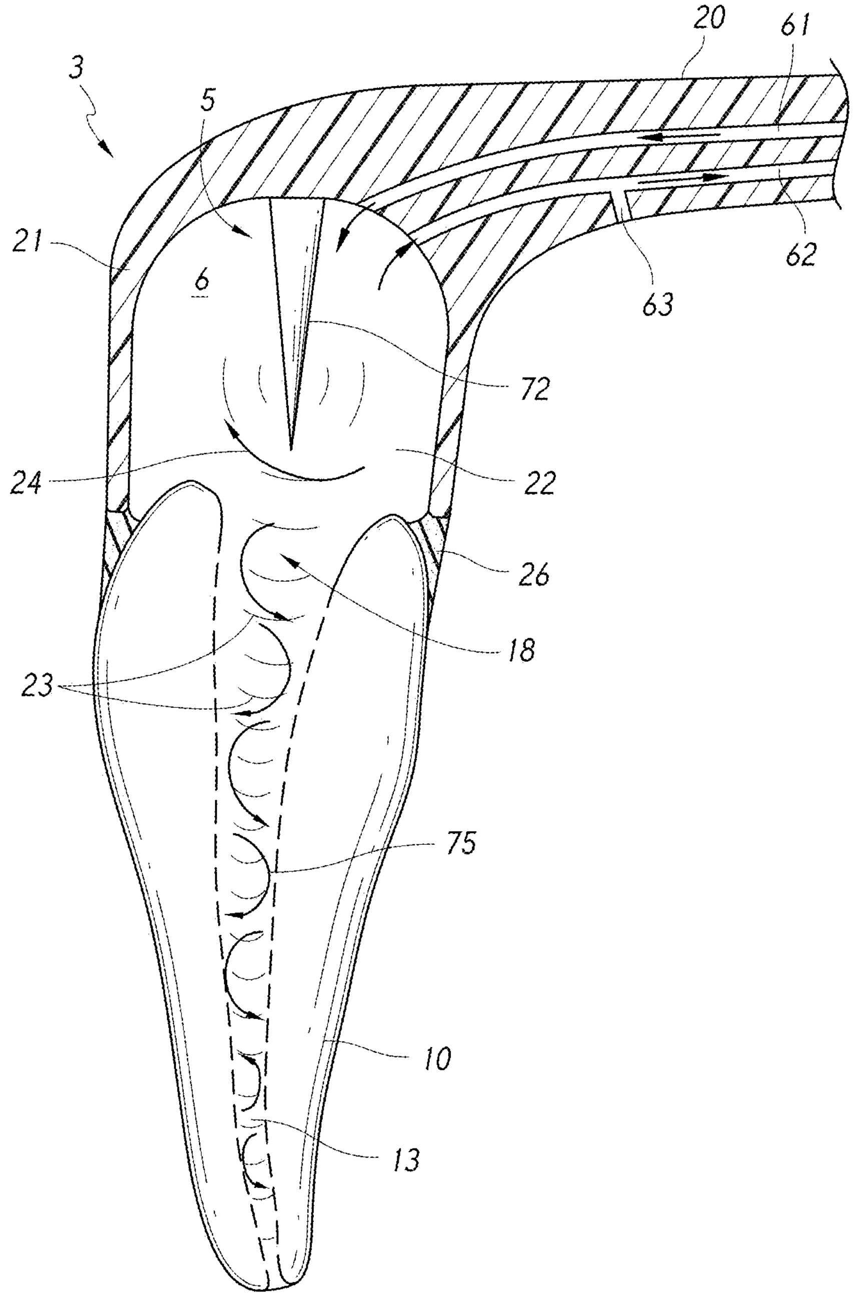
FIG. 9C is a schematic side cross-sectional view of a coupling member and a pressure wave generator comprising a vibrating mechanical element.

FIG. 9C is a schematic side cross-sectional view of a coupling member 3 and a pressure wave generator 5 comprising a vibrating mechanical element 72. Unless otherwise noted, the components illustrated in FIG. 9C are similar to or the same as similarly numbered components in FIGS. 9A-9B. The vibrating mechanical element 72 can comprise a piezoelectric element that vibrates in response to an applied electrical signal. As with the pressure wave generators 5 disclosed herein, the vibrating mechanical element 72 can be disposed in the chamber 6. When activated, the vibrating mechanical element 72 can propagate pressure waves 23 through the fluid 22 and tooth 10 and can induce fluid motion 24 in the chamber 6. The pressure wave generator 5 of FIG. 9C can therefor act to clean and/or fill the tooth 10, as explained herein.

Figure 9D:
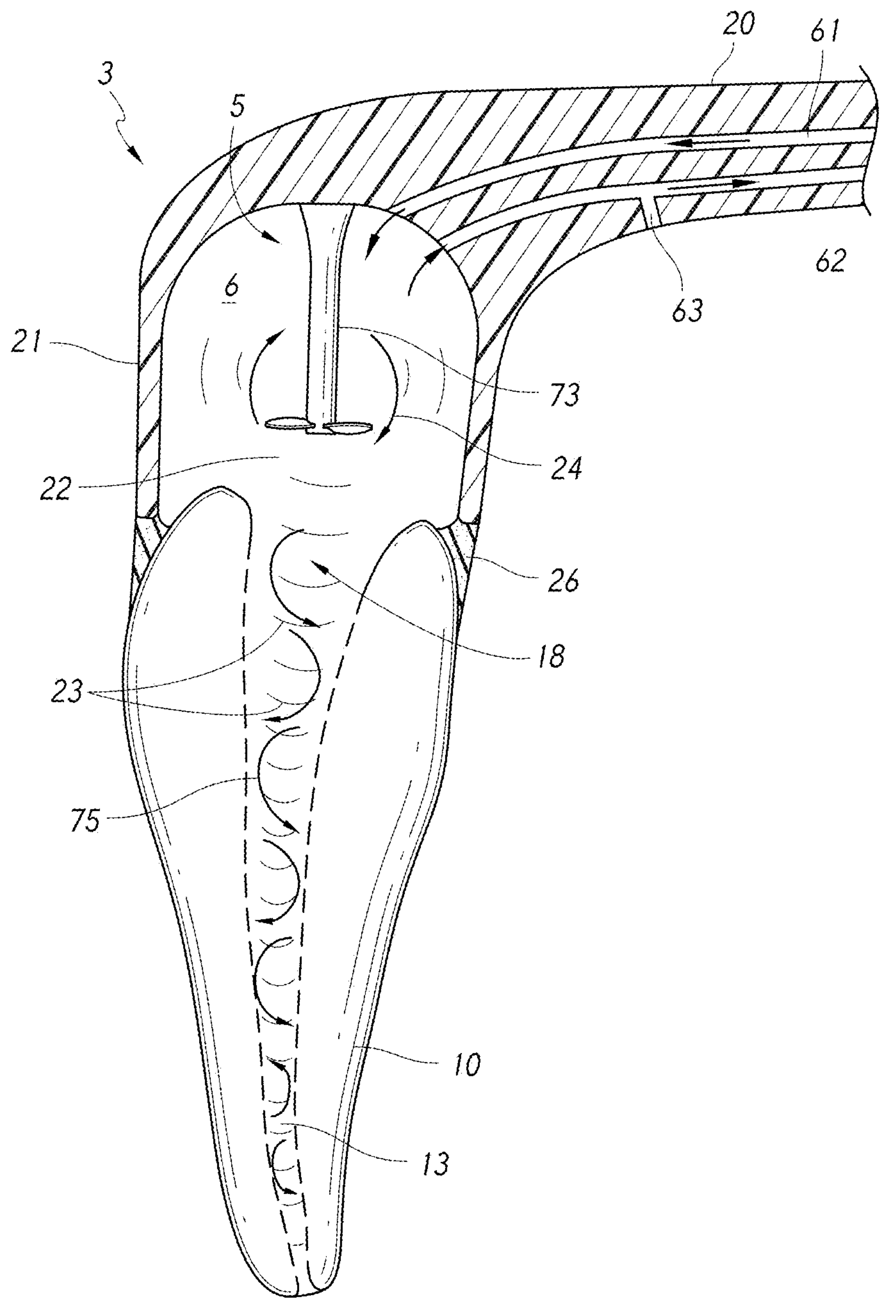
FIG. 9D is a schematic side cross-sectional view of a coupling member 3 and a pressure wave generator comprising a stirring element.

FIG. 9D is a schematic side cross-sectional view of a coupling member 3 and a pressure wave generator 5 comprising a stirring element 73. Unless otherwise noted, the components illustrated in FIG. 9D are similar to or the same as similarly numbered components in FIGS. 9A-9C. The stirring element 73 can comprise a rotational drive axis and a propeller coupled to the drive axis. When rotated, the drive axis can rotate the propeller of the stirring element 73 to generate pressure waves 23 and/or fluid motion 24 in the chamber 6 and/or tooth 10 to clean and/or fill the tooth 10.

Figure 10A:
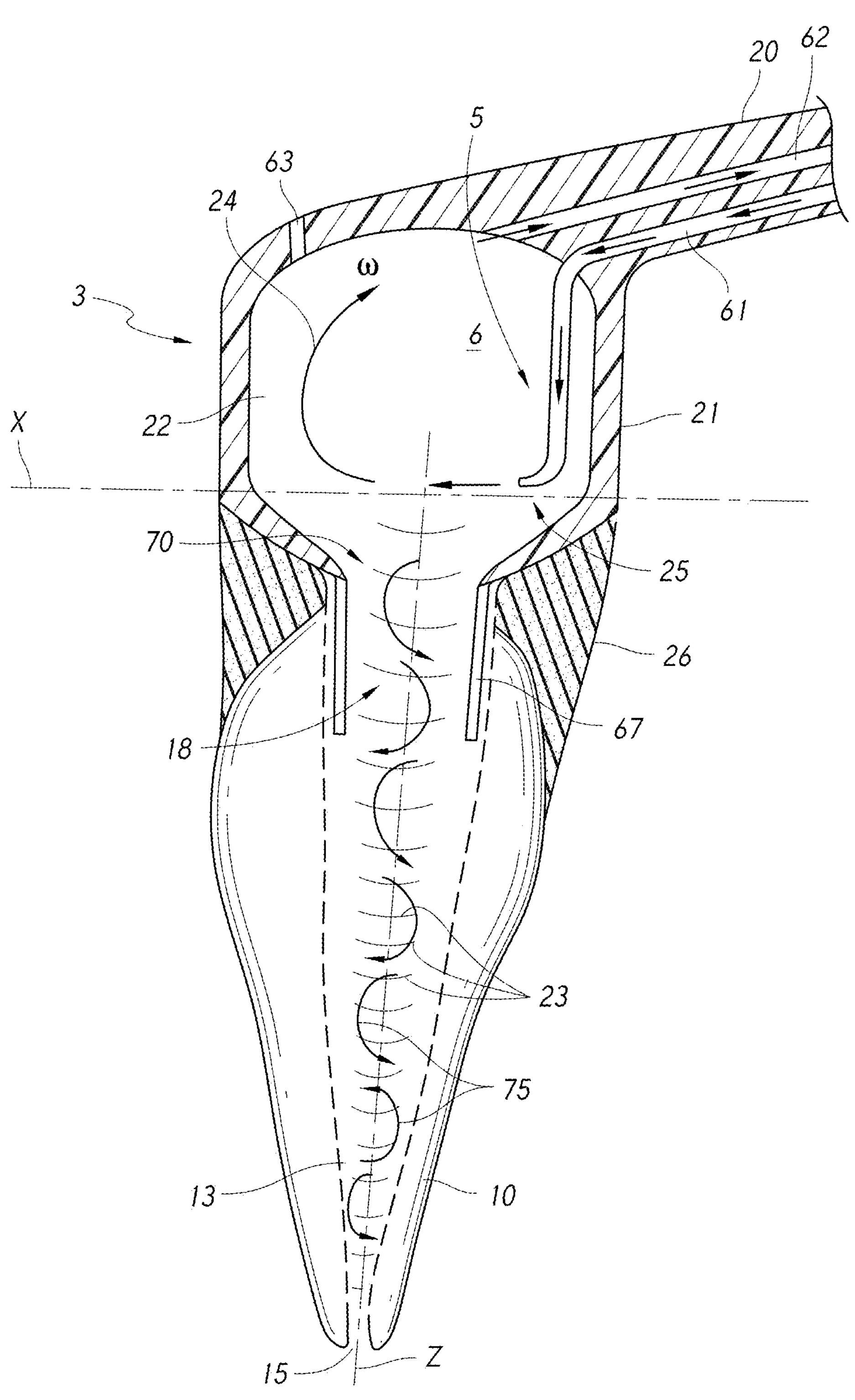
FIG. 10A is a side cross-sectional view of a coupling member having a pressure wave generator comprising a fluid inlet configured to generate a rotational fluid motion in a chamber of a coupling member.

FIG. 10A is a side cross-sectional view of a coupling member 3 having a pressure wave generator 5 configured to generate a fluid motion 24 in a chamber 6 of the coupling member 3 and/or pressure waves 23 in the fluid 22. As above, the coupling member 3 can be formed with or coupled to a distal end portion 21 of a handpiece 20. In the embodiment of FIG. 10A, the coupling member 3 is coupled to the tooth 10 by way of a tooth seal 26. A mating tube 67 can be used to align and/or secure the positioning member 3 to the tooth 10. The mating tube 67 can extend about and define an access aperture or port 70 of the coupling member 3 that provides fluid communication between the chamber 6 and the tooth 10. As shown in FIG. 10A, the root canal 13 can have a central axis Z extending along a major length or dimension of the root canal 13. The mating tube 67 can prevent the coupling member 3 from translating in a direction X transverse to the central axis Z.

In the embodiment of FIG. 10A, the pressure wave generator 5 can be disposed in the chamber 6, which can be outside the tooth 10. The pressure wave generator 5 can be positioned offset from a central region of the coupling member 3, e.g., positioned along a wall of the coupling member 3. As shown in FIG. 10A, the pressure wave generator 5 can comprise a fluid inlet 61 configured to supply a fluid 22 to the chamber 6 of the coupling member 3. For example, in some embodiments, the fluid inlet 61 can be configured to supply a treatment fluid. In embodiments using a treatment fluid, the pressure wave generator 5 can be configured to clean the tooth. As explained herein, the pressure wave generator 5 can enhance the effects of the treatment fluid to clean both larger canal spaces and smaller cracks and crevices of the tooth. The pressure wave generator 5 can be activated to generate a broad spectrum of acoustic frequencies to clean different types of material from differently-sized spaces of the tooth 10.

In other embodiments, the fluid inlet 61 can be configured to supply a flowable obturation material. As explained above, in these embodiments, the pressure wave generator can supply the flowable obturation material in a flowable state and can propagate the flowable obturation material throughout the root canal, e.g., through both the larger root canal space and smaller cracks, spaces, crevices, tubules, etc. of the tooth. By filling substantially the entire root canal system, the pressure wave generator 5 can prevent infection or other negative patient outcomes by preventing the growth of bacteria in unfilled or unobturated spaces.

The fluid inlet 61 can be in fluid communication with the console 2, and a controller can control the flow of flowable material 22 through the inlet 61. As explained herein, the controller can supply the fluid 22 (e.g., the treatment fluid or a flowable obturation material) through the inlet 61 at various frequencies during a treatment phase of the procedure. In some embodiments, the chamber 6 can be filled or substantially filled with a flowable material 22, such as a treatment fluid or an obturation material, and the pressure wave generator 5 can be activated once the chamber 6 is filled with the flowable material 22 at a desired level and/or can be activated to substantially fill the chamber 6.

As shown in FIG. 10A, the fluid inlet 61 can supply the fluid 22 into the chamber 6 to introduce fluid motion 24 in the chamber. As shown in FIG. 10A, for example, the fluid motion 24 comprises a rotational flow of fluid in the chamber 6. The fluid motion 24 can define a rotational flow path or field substantially about an axis transverse to the central axis Z of the root canal 13 (e.g. the fluid flows in a direction w about axes transverse to the central axis Z).

For example, one way to induce the fluid motion 24 illustrated in FIG. 10A is to position a distal end portion 25 of the pressure wave generator 5 adjacent to the access port 70 of the coupling member 3. As explained herein, the pressure wave generator 5 can act as a fluid motion generator to generate fluid motion 24 in the chamber 6. The distal end portion 25 of the fluid inlet 61 can direct a stream or beam of fluid across the access opening 18 of the tooth 10 (and/or across the access port 70 of the coupling member 3 and chamber 6) along an X direction transverse to the central axis Z of the root canal 13. For example, in some embodiments, the fluid inlet 61 can direct a stream of fluid 22 along a direction that is substantially perpendicular to the central axis Z of the root canal 13, e.g., in a direction that is more or less orthogonal to a major axis of the canal 13. Furthermore, the fluid (e.g., the momentum of the fluid stream) can be directed along and/or substantially parallel to a plane near the proximal-most end of the access port 70 to induce the fluid motion 24 shown in FIG. 10A. The fluid flow 24 across the access port 70 can be varied to control a desired apical pressure near the apex of the tooth 10. For example, the momentum of the fluid motion 24 can be controllably adjusted by way of the system controller 51. Further, the angle relative to the central axis Z can also be adjusted to control apical pressure. Indeed, the parameters of the pressure wave generator 5 can be adjusted to increase, decrease, and/or maintain the apical pressure to improve patient outcomes.

The motion 24 of the fluid 22 in the chamber 6 across the port 70 (which may induce flow in the rotational direction w shown in FIG. 10A) can induce vortices 75 throughout the root canal 13. For example, shear forces in the fluid 22 induced by the rotational flow 24 can generate vortices 75 that rotate or circulate in opposite directions (e.g., clockwise and counterclockwise as shown in FIG. 10A). For example, in some arrangements, stronger vortices 75 may be created near the access port 70, and weaker vortices 75 may be created nearer the apical opening 15. In some embodiments, the vortices 75 may gradually weaken along the length of the canal from a point near the access port 70 to the apical opening 15. The weaker vortices 75 nearer the apical opening 15 may help to prevent or reduce the risk of extrusion of material through the apex of the tooth, which can lead to safer treatment procedures. The vortices 75 can be adjusted by controlling the parameters of the pressure wave generator 5 and the fluid motion 24 generated by the pressure wave generator 5. In some embodiments, the vortices 75 can be steady in size, shape, and/or direction. In other embodiments, the vortices 75 can be unsteady or chaotic.

Furthermore, the alternating directions of the vortices along the root canal 13 can advantageously create a negative pressure (or low positive pressure) near the apical opening 15 of the tooth 10. For example, the vortices 75, which also rotate about axes transverse to the central axis Z of the root canal 13, may cause micro-flows upwards towards the access opening 18 such that fluid 22 tends to experience a slightly negative pressure (e.g., a slight tendency to flow upwards through the canal 13 towards the access opening 18) near the apical opening 15. As explained below with respect to FIGS. 14A-14C, the negative pressure near the apical opening 15 can prevent material in the tooth 10 from extruding out through the apical opening 15. In other treatments, for example, the pressure near the apical opening 15 can be positive such that material is pushed out, or extruded, through the apical opening 15 and into the jaw of the patient. Such extrusion can lead to undesirable patient outcomes such as infection, high levels of pain, etc.

In some embodiments, it can be advantageous to dispose the pressure wave generator 5 within the chamber 6 and to use a coupling member 3 with an access port 70 as large as possible. By increasing the diameter or major dimension of the access port 70, more energy can be directed into the tooth 10, which can enhance the tooth cleaning procedure. Increasing the diameter or major dimension can also enhance the obturation procedure when used in such embodiments. In some embodiments, for example, the mating tube 67 may not be used so as to increase the size of the access port 70 by about twice a thickness of the walls of the mating tube 67. Accordingly, in various embodiments, the access port 70 of the coupling member 3 can be at least as large as a diameter or major dimension of the access opening 18 formed in the tooth 10. In some embodiments, for example, the access port 70 can be about the same size as the access opening 18 formed in the tooth 10.

As above, the pressure wave generator 5 can also be configured to generate pressure waves 23 through the fluid 22 and the tooth 10. As explained herein, in cleaning treatments, a combination of the pressure waves 23, fluid motion 24, and chemistry of the treatment fluid can act to substantially remove unhealthy materials from the tooth 10, including in small spaces, cracks, and crevices of the tooth 10. Waste fluid and detached materials can be removed from the tooth 10 and/or the chamber 6 by way of a fluid outlet 62. As explained above, one or more vents 63 can be provided through the coupling member 3 to regulate the pressure in the chamber 6. In filling or obturation procedures, the pressure waves 23, fluid motion 24, and chemistry of the obturation material can act to substantially fill the entire root canal system.

Figure 10B:
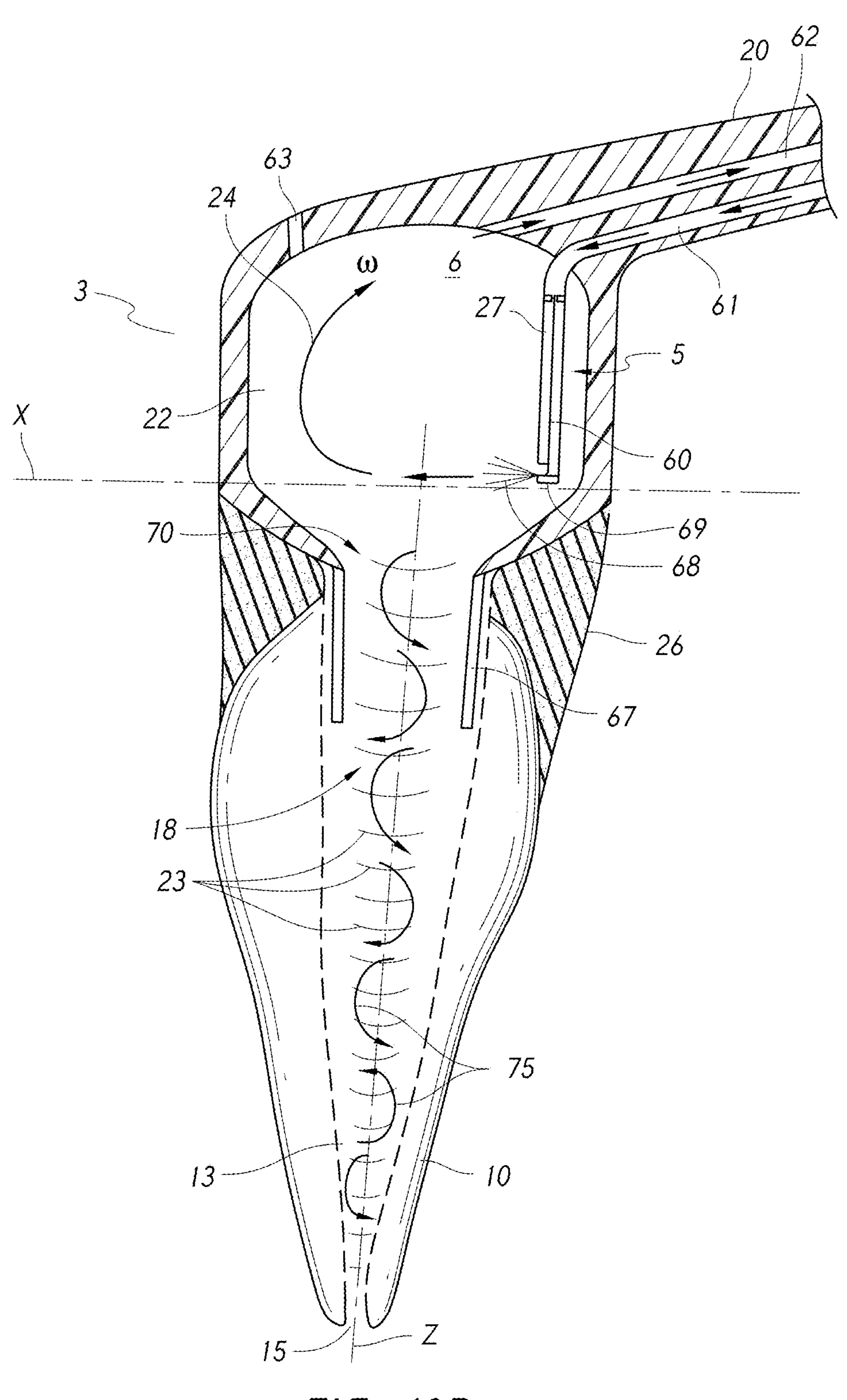
FIG. 10B is a side cross-sectional view of a coupling member having a pressure wave generator comprising a liquid jet device configured to generate a rotational fluid motion in a chamber of the coupling member.

FIG. 10B is a side cross-sectional view of a coupling member 3 having a pressure wave generator 5 comprising a liquid jet device configured to generate a fluid motion 24 in a chamber 6 of the coupling member 3. Unless otherwise noted, the components illustrated in FIG. 10B are similar to or the same as similarly numbered components in FIGS. 9A and 10A. As with the pressure wave generator 5 of FIG. 10A, the liquid jet device can be disposed along a wall of the coupling member 3. The liquid jet device can include a guide tube 27 along which the jet 60 propagates. The guide tube 27 can include one or more openings that permit fluid communication between the jet 60 and the fluid 22 in the chamber 6. In some embodiments, the fluid 22 may be supplied by an inlet other than the jet 60. In other embodiments, the jet 60 can comprise the fluid 22 and can supply the fluid 22 to the chamber 6. In some embodiments, the chamber 6 can be filled or substantially filled with the fluid 22.

The pressure wave generator 5 can be activated, and the jet 60 can impact the impingement member 69, which can deflect the jet 60 into a spray 69. For example, the spray 69 can generate fluid motion 24 across the access port 70, as explained above with respect to FIG. 10A. The liquid jet device can induce fluid motion 24 in the chamber, e.g., in a rotational direction w about an axis transverse to a central axis Z of the root canal. For example, the spray 68 can induce a stream of fluid passing across an access aperture 70 of the coupling member 3, e.g., along a direction X transverse to (e.g., substantially perpendicular to) the central axis Z of the root canal 13 and/or a central axis of the chamber. The spray 69 can induce fluid flow 24 in a direction parallel to a plane of the access port 70, e.g., a proximal-most plane of the access port that defines an opening between the chamber 6 and the tooth. The fluid flow 24 can induce opposing vortices 75 throughout the root canal 13. The fluid motion 24 induced in the tooth 10 (possibly in combination with pressure waves 23) can act to remove unhealthy materials from the tooth 10. Furthermore, as explained above with respect to FIG. 10A, the induced vortices 75 can create a negative pressure at or near the apical opening 15, which can advantageously prevent the extrusion of material through the apical opening 15. In addition, as with FIG. 10A, the diameter of the access port 70 of the coupling member 3 can be at least as large as the access opening 18 formed in the tooth 10, e.g., about the same size as the access opening 18. Furthermore, in obturation treatments, the pressure wave generator 5 of FIG. 10B can act to substantially fill the entire root canal system.

Figure 10C:
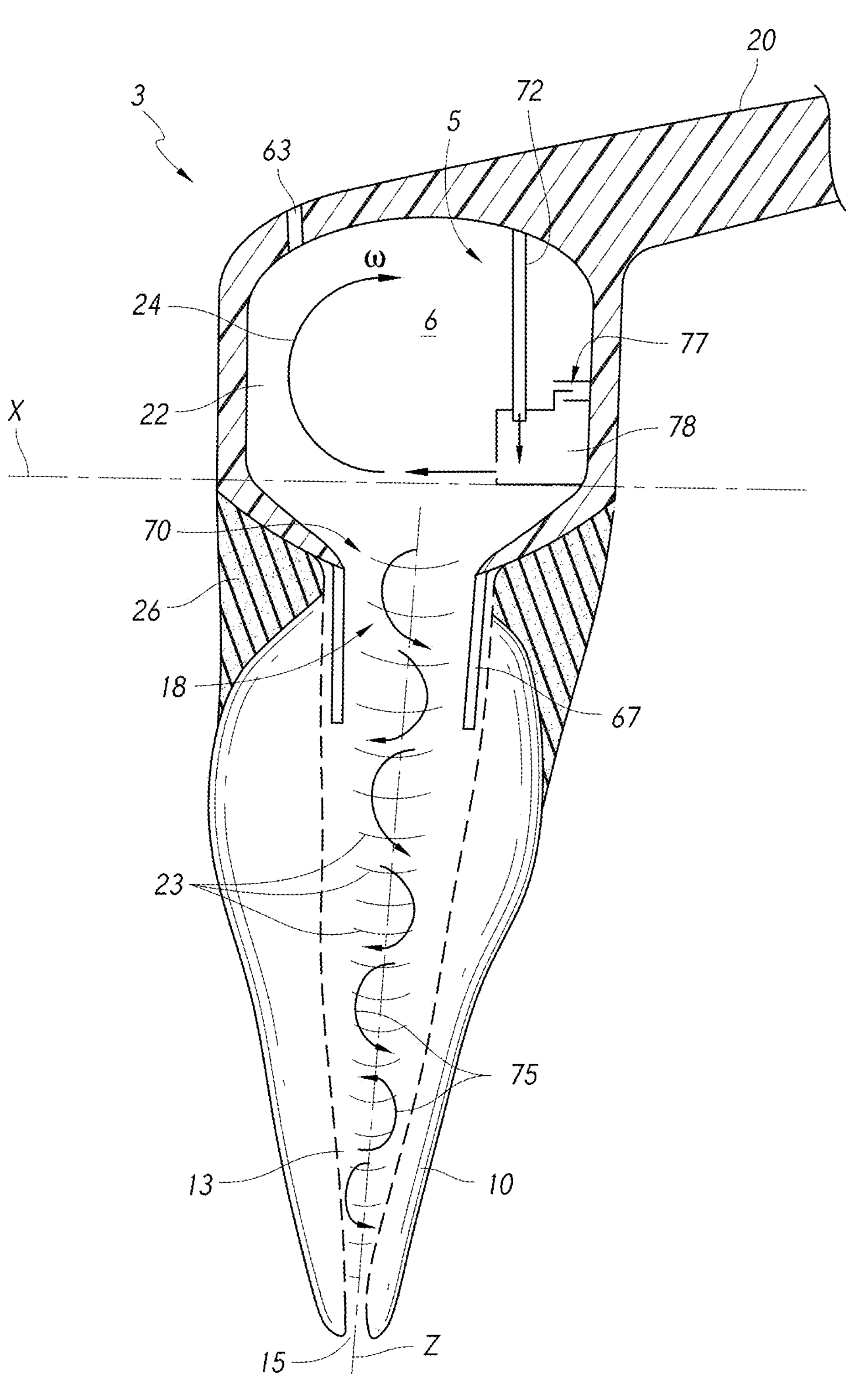
FIG. 10C is a side cross-sectional view of a coupling member having a pressure wave generator comprising a light emitting device configured to generate a rotational fluid motion in a chamber of the coupling member.

FIG. 10C is a side cross-sectional view of a coupling member 3 having a pressure wave generator 5 comprising a light emitting element 72 configured to generate a fluid motion 24 in a chamber 6 of the coupling member 3. Unless otherwise noted, the components illustrated in FIG. 10C are similar to or the same as similarly numbered components in FIGS. 9B and 10A-10B. As with the embodiment of FIG. 9B, the pressure wave generator 5 can comprise a laser or other light source. The light emitting element 72 can propagate high intensity light onto a localized reservoir 78 of fluid 22, such as a treatment fluid, an obturation material, etc. For example, a gate 77 can selectively permit fluid 22 to flow from the chamber 6 into the localized reservoir 78. The light propagating from the light emitting element 72 can impinge upon the fluid 22 in the reservoir 78 and can locally heat the fluid 22 in the reservoir 78. Heating the fluid 22 in the reservoir 78 to a sufficient degree may cause the fluid 22 to move out of the reservoir along a direction X transverse to a central axis Z of the root canal 13 of the tooth 10. For example the fluid 22 can move out of the reservoir 78 substantially perpendicular to the central axis Z of the root canal and/or in a direction substantially parallel to a proximal-most plane of the access port 70.

As with the embodiments disclosed above with respect to FIGS. 10A-10B, the flow of flowable material 22 from the reservoir 78 can induce a rotational fluid flow 24 about a rotational direction w. The rotational flow 24 can induce vortices 75 throughout the root canal 13 that can induce negative pressures at or near the apical opening 15 of the tooth 10. Furthermore, a diameter of the access port 70 can be at least as large as the access opening 18 in some embodiments. As above, in cleaning procedures, the fluid motion 24 and the pressure waves 23 can act to substantially clean the tooth 10. In obturation procedures, the pressure wave generator 5 can act to substantially fill the entire root canal system.

Figure 10D:
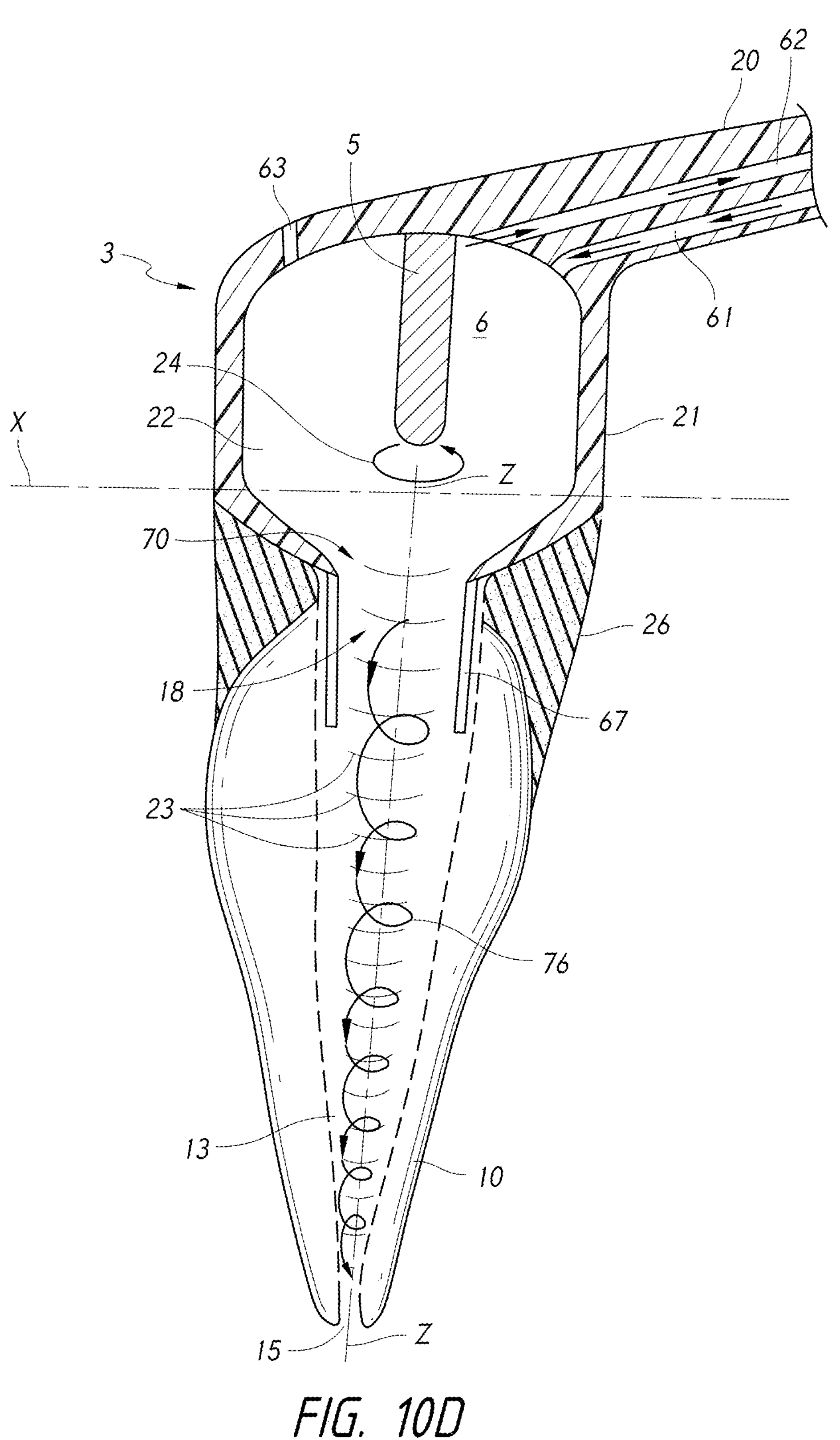
FIG. 10D is a side cross-sectional view of a coupling member having a pressure wave generator substantially aligned with a central axis Z of the root canal.

FIG. 10D is a side cross-sectional view of a coupling member 3 having a pressure wave generator 5 substantially aligned with a central axis Z of the root canal 13. The pressure wave generator 5 of FIG. 10D can be a nozzle configured to output a fluid 22 into the chamber 6, or any of the other pressure wave generators disclosed herein. Unless otherwise noted, the components illustrated in FIG. 10D are similar to or the same as similarly numbered components in FIGS. 10A-10C. The pressure wave generator 5 can be any suitable pressure wave generator disclosed herein, such as a liquid jet device, a fluid inlet, a light emitting element, etc. Unlike the embodiments of FIGS. 10A-10C, which may be offset from the Z-axis, the pressure wave generator 5 of FIG. 10D is generally aligned with the Z-axis.

Furthermore, unlike the embodiments of FIGS. 10A-10C, the pressure wave generator 5 of FIG. 10D can be configured to generate a fluid motion 24 of flowable material 22 about the Z-axis. The fluid motion 24 substantially around the Z-axis can generate a swirl 76 of fluid, which can propagate through the root canal 23. Similar to the embodiments above, the rotational power of the fluid motion 24 can be adjusted to control the amount of swirl 76 to assist with the treatment procedure. As above, in cleaning treatments, the pressure wave generator 5 can clean substantially the entire root canal 13. In obturation treatments, the pressure wave generator 5 can fill or obturate substantially the entire root canal 13, including branch structures, as explained in more detail herein.

Figure 10E:
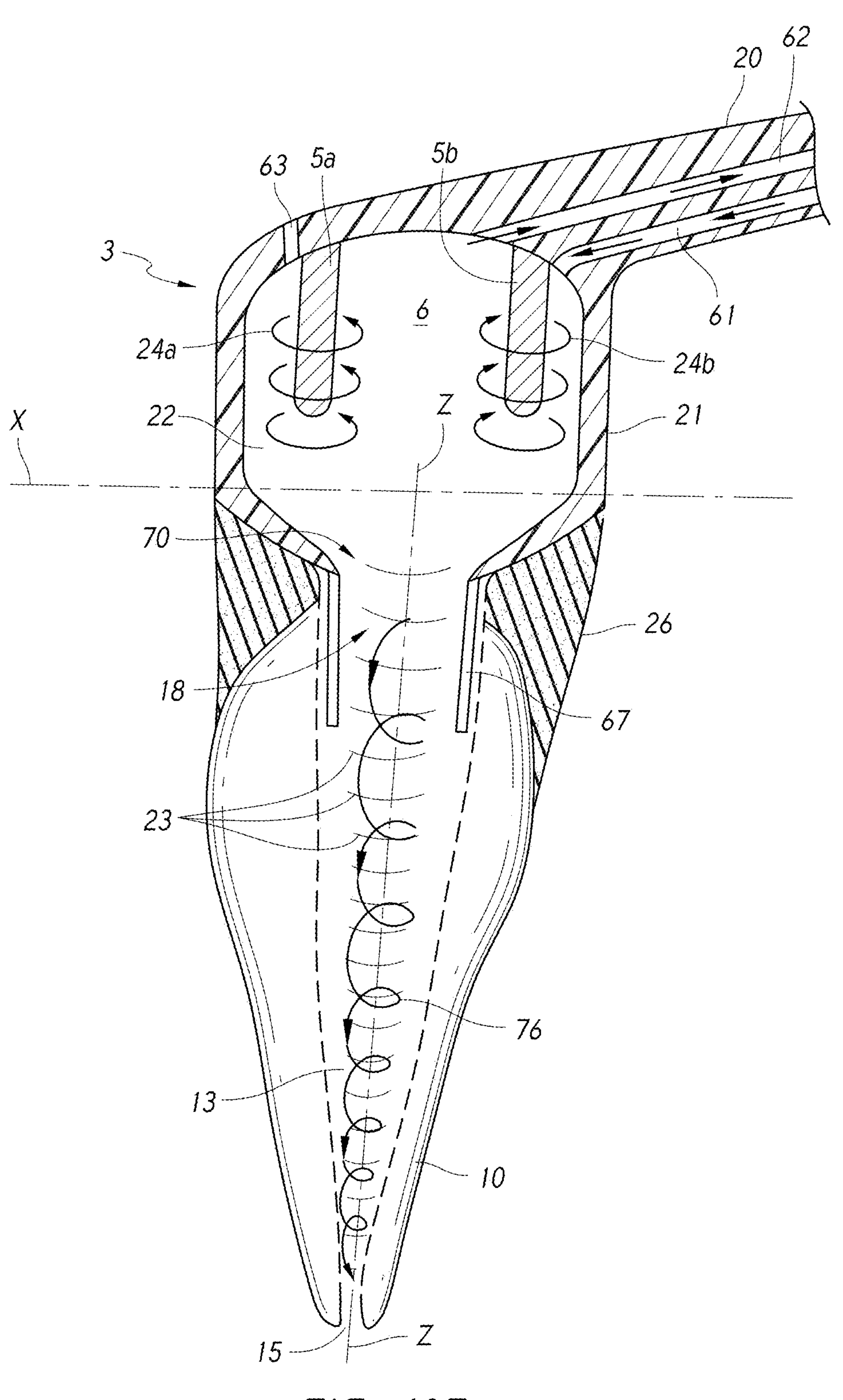
FIG. 10E is a side cross-sectional view of a coupling member having a first pressure wave generator and a second pressure wave generator.

FIG. 10E is a side cross-sectional view of a coupling member 3 having a first pressure wave generator 5*a* and a second pressure wave generator 5*b*. Unless otherwise noted, the components illustrated in FIG. 10E are similar to or the same as similarly numbered components in FIG. 10D. However, unlike the embodiment of FIG. 10D, the two pressure wave generators 5*a*, 5*b* can be disposed offset from the central axis Z. In the illustrated embodiment, the pressure wave generators 5*a*, 5*b* can be disposed eccentrically with respect to the Z-axis (e.g., a central axis of the root canal and/or a central axis of the chamber 6), e.g., the pressure wave generators 5*a*, 5*b* can be at about the same distance from the Z-axis. Like the embodiment of FIG. 10D, each pressure wave generator can generate a corresponding fluid motion 24 about the direction of the Z-axis, but the rotation is offset from the Z-axis, as shown in FIG. 10E. Furthermore, in the illustrated embodiment, the pressure wave generator 5*a* can generate fluid motion 24*a* about the Z-axis in one direction, and the pressure wave generator 5*b* can generate fluid motion 24*b* about the Z-axis direction in an opposite direction. The counter-flows induced by the two pressure wave generators 24*a*, 24*b* can cooperate to induce swirl 76 that propagate through the root canal 13. As explained above, the induced swirl 76 and pressure waves 23 can clean substantially the entire root canal 13 in cleaning treatments. In obturation treatments, the induced vortices and pressure waves 23 can fill or obturate substantially the entire root canal system.

Figure 10F:
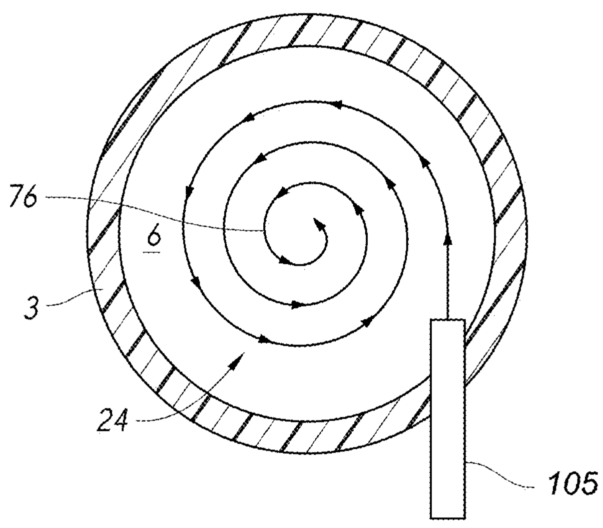
FIG. 10F is a schematic top view of a pressure wave generator at least partially disposed in a chamber and configured to generate swirl in the chamber.

FIG. 10F is a schematic top view of fluid motion generator 105 at least partially disposed in a chamber 6 and configured to generate swirl 76 in the chamber 6. The fluid motion generator 105 of FIG. 10F can comprise a nozzle or outlet configured to supply fluid into the chamber 6. In the embodiment of FIG. 10F, the central Z-axis of the root canal is coming out of the page. As shown in FIG. 10F, the fluid motion generator 105 can direct fluid motion 24 in a direction transverse (e.g., substantially perpendicular to) the major axis of the root canal, e.g., across the access port 70. The fluid motion 24 can impact walls of the chamber 6 and can shear inwardly to create the swirl motion 76. As explained above, the swirl 76 can propagate through the root canal 13 to clean and/or fill the root canal 13. The fluid motion generator 105 can be disposed anywhere along the height of the chamber 6. Furthermore, as explained herein, the fluid motion generator 105 may also comprise a liquid jet, fluid inlet, etc.

Figure 10G:
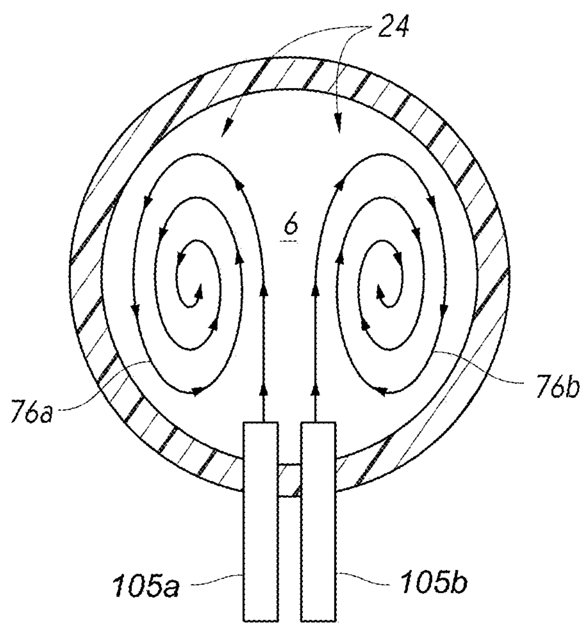
FIG. 10G is a schematic top view of multiple pressure wave generators at least partially disposed in a chamber and configured to generate counter-swirl fluid motion in the chamber.

FIG. 10G is a schematic top view of multiple fluid motion generators 105*a*, 105*b* at least partially disposed in a chamber 6 and configured to generate counter-swirl fluid motion 76*a*, 76*b* in the chamber 6. As shown in FIG. 10G, for example, the fluid motion generators 105*a*, 105*b* can be disposed eccentrically relative to the central axis Z of the root canal and/or the central axis of the chamber 6 (e.g., out of the page). Each fluid motion generator 105*a*, 105*b* can propagate fluid motion 24 across the access port 70 in a direction transverse to (e.g., substantially perpendicular to) the central axis Z. Each counter-swirl 76*a*, 76*b* can rotate in opposing directions about the Z-axis of the root canal and can interact with one another to generate swirl 76 throughout the root canal to clean and/or fill the canals.

VII. Additional Details Regarding Enhanced Cleaning of Teeth

It is believed, although not required, that some or all of the effects described herein may be at least in part responsible for advantageous effects, benefits, or results provided by various implementations of the treatment methods and systems described herein. Accordingly, various embodiments of the systems disclosed herein can be configured to provide some or all of these effects.

In the following description, unless a different meaning is indicated, the following terms have their ordinary and customary meaning. For example, a chemical reaction front may generally refer to an interface between the tissue and the solution which contains a chemical such as a tissue dissolving agent. Tissue may refer to all types of cells existing in the tooth as well as bacteria and viruses. Calcified tissue may refer to calcified pulp, pulp stones, and tertiary dentin. Bubbles includes but is not limited to bubbles created due to a chemical reaction, dissolved gas remaining in the fluid after degassing (if used) and released as bubbles in the fluid, and any bubbles which are introduced into the tooth due to imperfect sealing.

Tissue cleaning treatments may utilize one or more of the physicochemical effects described herein to clean and remove tissue and/or calcified tissue from a tooth chamber. In some cleaning treatments, the combination of (1) acoustic or pressure waves (e.g., generation of acoustic cavitation), (2) circulation of fluid in the chamber (e.g., macroscopic eddies and flows), and (3) chemistry (e.g., use of a tissue dissolving agent, use of degassed fluids) can provide highly effective cleaning. Accordingly, certain embodiments of the systems disclosed herein utilize a pressure wave generator to generate the acoustic waves, a fluid platform (e.g., fluid retainer) to retain treatment fluid in the tooth chamber and to enable circulation of the treatment fluid, and a treatment fluid that is degassed or includes a chemical agent such as a tissue dissolving agent.

A. Pressure Waves

A pressure wave generator can be used to generate pressure waves that propagate through the fluid in the chamber 6 (and the tooth). Upon irradiation of a fluid with high intensity pressure waves (e.g., broadband frequencies), acoustic cavitation may occur. As has been described herein, the implosive collapse of the cavitation bubbles can produce intense local heating and high pressures with short lifetimes. Therefore, in some treatment methods, acoustic cavitation may be responsible for or involved in enhancing chemical reactions, sonochemistry, sonoporation, tissue dissociation, tissue delamination, as well as removing the bacteria and/or the smear layer from the root canals and tubules. The effects of enhancing chemical reaction via vibrations or sonochemistry will be described below in the section on chemistry.

Sonoporation is the process of using an acoustic field to modify the permeability of the cell plasma membrane. This process may greatly expedite the chemical reaction. It may be advantageous if the acoustic field has a relatively broad bandwidth (e.g., from hundreds to thousands of kHz). Some frequencies (e.g., low frequency ultrasound) may also result in cellular rupture and death (e.g., lysis). This phenomenon may kill bacteria which might otherwise reinfect the tooth. Acoustic waves and/or acoustic cavitation may loosen the bond between cells and/or may dissociate the cells. Acoustic waves and/or acoustic cavitation may loosen the bond between cells and dentin and/or delaminate the tissue from the dentin.

For removing calcified tissue, acoustic waves may induce sonochemistry and microscopic removal of calcified structures due to shock waves and/or microjets created as a result of cavitation bubble implosion. Pressure or acoustic waves may break microscopic calcified structures through structural vibrations. If a chemical (e.g., a chelating agent such as, e.g., EDTA) is used for this procedure, the acoustic waves may enhance the chemical reaction.

Certain properties of the system can be adjusted to enhance the effects of the acoustic waves. For example, properties of the fluid including, e.g., surface tension, boiling or vapor temperature, or saturation pressure can be adjusted. A degassed fluid with a reduced dissolved gas content can be used, which may reduce the energy loss of acoustic waves that may be generated by hydrodynamic cavitation or any other sources. The fluid can be degassed, which may help preserve the energy of the acoustic waves and may increase the efficiency of the system.

B. Fluid Circulation

Some treatment systems and methods use diffusion and/or acoustically enhanced diffusion of reactants and byproducts to and away from the chemical reaction front. However, due to the relatively short time scale of the reaction process, a faster mechanism of reactant delivery such as "macroscopic" fluid motion, circulation, convection, vorticity, or turbulence may be advantageous in some of the embodiments disclosed herein. For example, fluid inflow into the tooth chamber may induce a macroscopic circulation in the pulp cavity (see, e.g., FIGS. 1A and 10A-10C). A liquid jet device not only may create acoustic waves but may also induce circulation as the jet and/or spray enter the chamber 6. Other pressure wave generators can produce fluid circulation via their interaction with ambient fluid (e.g., via localized heating of the fluid, which may induce convection currents and circulation).

Fluid circulation with a time scale comparable to (and preferably faster than) that of chemical reaction may help replenish the reactants at a chemical reaction front and/or may help to remove reaction byproducts from the reaction site. The convective time scale, which may relate to effectiveness of the convection or circulation process, can be adjusted depending on, e.g., the location and characteristics of the source of circulation. The convective time scale is approximately the physical size of the chamber divided by the fluid speed in the chamber. Introduction of circulation generally does not eliminate the diffusion process, which may still remain effective within a thin microscopic layer at the chemical reaction front. Fluid circulation may create flow-induced pressure oscillations inside the root canal which may assist in delaminating, loosening, and/or removing larger pieces tissue from the root canal.

For removing calcified tissue, fluid circulation may create flow-induced pressure oscillations inside the root canal which may assist in removing larger pieces of calcified structures from the root canal.

Certain properties of the system can be adjusted to enhance the effects of the circulation in the tooth. For example, the location of the source of circulation inside the tooth, the source flow characteristics such as shape (e.g. planar vs. circular jets) or velocity and/or direction of a fluid stream, and the fluid kinematic viscosity may be adjusted. The circulation may also be effected by the anatomy of the tooth or the canal orifice or root canal size. For example, a narrow root canal with constrictions may have a lower solution replenishment rate than a wide canal with no constrictions. If the source of convection/circulation is placed near the pulp chamber floor, a tooth with a smaller pulp chamber may have stronger circulation than one with a larger pulp chamber. Convection-induced pressure exerted at the periapical region of the tooth may be controlled to reduce or avoid extrusion of the treatment fluid into the periapical tissues. Large magnitude vacuum or low pressure in the tooth may cause discomfort in some patients. Thus, the properties of the coupling member 3 (e.g., vents, sponges, flow restrictors, etc.) can be adjusted to provide a desired operating pressure range in the chamber 6 and/or tooth 10.

C. Chemistry

As explained herein, various reaction chemistries can be adjusted or designed to improve the cleaning process. For example, to enhance the dissolution of organic tissue, a tissue dissolving agent (e.g., a mineralization therapy agent, EDTA, sodium hypochlorite—NaOCl) can be added to the treatment liquid. The agent may react with various components at the treatment site. In some cases, tissue dissolution may be a multi-step process. The agent may dissolve, weaken, delaminate or dissociate organic and/or inorganic matter, which may result in better patient outcomes. The chemical reaction can modify the physical characteristics of the treatment solution locally (e.g., reducing the local surface tension via saponification), which may assist in the penetration of the treatment liquid into gaps and small spaces in the treatment sites or to remove bubbles formed during the chemical reaction. A tissue dissolving agent (e.g., sodium hypochlorite or bleach) may be added to the treatment fluid to react with tissue. Tissue dissolution may be a multi-step and complex process. Dissolution of sodium hypochlorite in water can include a number of reactions such as, e.g., the sodium hypochlorite (bleach) reaction, a saponification reaction with triglycerides, an amino acid neutralization reaction, and/or a chloramination reaction to produce chloramine. Sodium hypochlorite and its by-products may act as dissolving agents (e.g. solvents) of organics, fats, and proteins; thereby, degrading organic tissue in some treatments.

Sodium hypochlorite may exhibit a reversible chemical equilibrium based on the bleach reaction. Chemical reactions may occur between organic tissue and sodium hypochlorite. For example, sodium hydroxide can be generated from the sodium hypochlorite reaction and can react with organic and fat (triglycerides) molecules to produce soap (fatty acid salts) and glycerol (alcohol) in the saponification reaction. This may reduce the surface tension of the remaining solution. Sodium hydroxide can neutralize amino acids forming amino acid salts and water in the amino acid neutralization reaction. Consumption of sodium hydroxide can reduce the pH of the remaining solution. Hypochlorous acid, a substance that can be present in sodium hypochlorite solution, can release chlorine that can react with amino groups of proteins and amino acids to produce various chloramines derivatives. For example, hypochlorous acid can react with free amino acids in tissue to form N-chloro amino acids which can act as strong oxidizing agents that may have higher antiseptic activity than hypochlorite.

Chemical(s) in the fluid, depending on their type, may affect the surface tension of the solution, which in turn may modify the cavitation phenomenon. For example, solution of an inorganic chemical such as, e.g., sodium hypochlorite in water, may increase the ion concentration in the solution which may increase the surface tension of the solution, which may result in stronger cavitation. In some cases, the magnitude of a cavitation inception threshold may increase with increasing surface tension, and the cavitation inducing mechanism (e.g., a pressure wave generator) may be sufficiently intense to pass the threshold in order to provide inception of cavitation bubbles. It is believed, but not required, that once the cavitation threshold is passed, increased surface tension may result in stronger cavitation. Reducing the dissolved gas content of a fluid (e.g., via degassing) can increase the surface tension of the fluid and also may result in stronger cavitation. Addition of chemicals, agents, or substances (e.g., hydroxyl functional groups, nanoparticles, etc.) to the treatment may increase the efficiency of conversion of a pressure wave into cavitation, and such chemoacoustic effects may be desirable in some treatment procedures.

In some methods, a chemical, such as sodium hypochlorite, may cause saponification. The removal of bubbles created or trapped inside the root canals (or tubules) may be accelerated due to local reduction of surface tension at the chemical reaction front as a result of saponification. Although in some methods it may be desirable to have a relatively high surface tension at the pressure wave source (e.g. inside the pulp chamber), inside the canals it may be beneficial to have locally reduced surface tension to accelerate bubble removal. This phenomenon may happen as tissue dissolving agent(s) react with the tissue. For example, sodium hypochlorite can act as a solvent degrading fatty acids, transforming them into fatty acid salts (soap) and glycerol (alcohol) that can reduce the surface tension of the remaining solution at the chemical reaction front.

A number of variables or factors may be adjusted to provide effective cleaning. For example, each chemical reaction has a reaction rate determining the speed of reaction. The reaction rate may be dependent on several parameters including temperature. The concentration of reactants can be a factor and may affect the time for the reaction to complete. For instance, a 5% sodium hypochlorite solution generally may be more aggressive than a 0.5% sodium hypochlorite solution and may tend to dissolve tissue faster.

The refreshment rate of reactants may be affected by some or all of the following. Bubbles may form and stay at the chemical reaction front (e.g., due to surface tension forces) and may act as barriers at the chemical reaction front impeding or preventing fresh reactants from reaching the reaction front. Accordingly, circulation of the treatment fluid can help remove the bubbles and the reaction byproducts, and may replace them with fresh treatment fluid and fresh reactants. Thus, use of an embodiment of the fluid platform that can provide fluid circulation in the tooth chamber advantageously may improve the cleaning process.

Heat may increase the chemical reaction rate and may be introduced through a variety of sources. For example, the treatment solution may be preheated before delivery to the tooth chamber. Cavitation, exothermic chemical reactions, or other internal or external dissipative sources may produce heat in the fluid, which may enhance, sustain, or increase reaction rates.

Sonication of the fluid may increase chemical reaction rates or effectiveness. For example, upon irradiation of a fluid (e.g., water) with high intensity pressure waves (including, e.g., sonic or ultrasonic waves, or broad spectrum acoustic power produced by a liquid jet) acoustic cavitation may occur. The implosive collapse of the cavitation bubbles can produce intense local heating and high pressures with short lifetimes. Experimental results have shown that at the site of the bubble collapse, the temperature and pressure may reach around 5000 K and 1000 atm, respectively. This phenomenon, known as sonochemistry, can create extreme physical and chemical conditions in otherwise cold liquids. Sonochemistry, in some cases, has been reported to enhance chemical reactivity by as much as a million fold. In cases where acoustic cavitation does not occur (or occurs at a relatively low amplitude), the vibration of reactants, due to the pressure waves, may enhance the chemical reaction as it assists in replacing the byproducts by fresh reactants.

For removing calcified tissue, a decalcifying agent (e.g., an acid such as, e.g., EDTA or citric acid) may be added to the treatment fluid. The decalcifying agent may remove calcium or calcium compounds from the tooth dentin. The substances remaining after treatment with the decalcifying agent may be relatively softer (e.g., gummy) than prior to treatment and more easily removable by the fluid circulation and acoustic waves.

VIII. Degassed Treatment Fluids

As will be described below, the treatment fluid (and/or any of solutions added to the treatment fluid) can be degassed compared to normal liquids used in dental offices. For example, degassed distilled water can be used (with or without the addition of chemical agents or solutes).

A. Examples of Possible Effects of Dissolved Gases in the Treatment Fluid

In some procedures, the treatment fluid can include dissolved gases (e.g., air). For example, the fluids used in dental offices generally have a normal dissolved gas content (e.g., determined from the temperature and pressure of the fluid based on Henry's law). During cleaning procedures using a pressure wave generator, the acoustic field of the pressure wave generator and/or the flow or circulation of fluids in the chamber can cause some of the dissolved gas to come out of solution and form bubbles.

The bubbles can block small passageways or cracks or surface irregularities in the tooth, and such blockages can act as if there were a "vapor lock" in the small passageways. In some such procedures, the presence of bubbles may at least partially block, impede, or redirect propagation of acoustic waves past the bubbles and may at least partially inhibit or prevent cleaning action from reaching, for example, unhealthy dental materials in tubules and small spaces of the tooth 10. The bubbles may block fluid flow or circulation from reaching these difficult-to-reach, or otherwise small, regions, which may prevent or inhibit a treatment solution from reaching these areas of the tooth.

In certain procedures, cavitation is believed to play a role in cleaning the tooth. Without wishing to be bound by any particular theory, the physical process of cavitation inception may be, in some ways, similar to boiling. One possible difference between cavitation and boiling is the thermodynamic paths that precede the formation of the vapor in the fluid. Boiling can occur when the local vapor pressure of the liquid rises above the local ambient pressure in the liquid, and sufficient energy is present to cause the phase change from liquid to a gas. It is believed that cavitation inception can occur when the local ambient pressure in the liquid decreases sufficiently below the saturated vapor pressure, which has a value given in part by the tensile strength of the liquid at the local temperature. Therefore, it is believed, although not required, that cavitation inception is not determined by the vapor pressure, but instead by the pressure of the largest nuclei, or by the difference between the vapor pressure and the pressure of the largest nuclei. As such, it is believed that subjecting a fluid to a pressure slightly lower than the vapor pressure generally does not cause cavitation inception. However, the solubility of a gas in a liquid is proportional to pressure; therefore lowering the pressure may tend to cause some of the dissolved gas inside the fluid to be released in the form of gas bubbles that are relatively large compared to the size of bubbles formed at cavitation inception. These relatively large gas bubbles may be misinterpreted as being vapor cavitation bubbles, and their presence in a fluid may have been mistakenly described in certain reports in the literature as being caused by cavitation, when cavitation may not have been present.

In the last stage of collapse of vapor cavitation bubbles, the velocity of the bubble wall may even exceed the speed of sound and create strong shock waves inside the fluid. The vapor cavitation bubble may also contain some amount of gas, which may act as a buffer and slow down the rate of collapse and reduce the intensity of the shockwaves. Therefore, in certain procedures that utilize cavitation bubbles for tooth cleaning, it may be advantageous to reduce the amount of the dissolved air in the fluid to prevent such losses.

The presence of bubbles that have come out of solution from the treatment fluid may lead to other disadvantages during certain procedures. For example, if the pressure wave generator produces cavitation, the agitation (e.g. pressure drop) used to induce the cavitation may cause the release of the dissolved air content before the water molecules have a chance to form a cavitation bubble. The already-formed gas bubble may act as a nucleation site for the water molecules during the phase change (which was intended to form a cavitation bubble). When the agitation is over, the cavitation bubble is expected to collapse and create pressure waves. However, cavitation bubble collapse might happen with reduced efficiency, because the gas-filled bubble may not collapse and may instead remain as a bubble. Thus, the presence of gas in the treatment fluid may reduce the effectiveness of the cavitation process as many of the cavitation bubbles may be wasted by merging with gas-filled bubbles. Additionally, bubbles in the fluid may act as a cushion to damp pressure waves propagating in the region of the fluid comprising the bubbles, which may disrupt effective propagation of the pressure waves past the bubbles. Some bubbles may either form on or between tooth surfaces, or be transferred there by the flow or circulation of fluid in the tooth. The bubbles may be hard to remove due to relatively high surface tension forces. This may result in blocking the transfer of chemicals and/or pressure waves into the irregular surfaces and small spaces in and between teeth, and therefore may disrupt or reduce the efficacy of the treatment.

B. Examples of Degassed Treatment Fluids

Accordingly, it may be advantageous in some systems and methods to use a degassed fluid, which can inhibit, reduce, or prevent bubbles from coming out of solution during treatments as compared to systems and methods that use normal (e.g., non-degassed) fluids. In dental procedures in which the treatment fluid has a reduced gas content (compared with the normal fluids) tooth surfaces or tiny spaces in the tooth may be free of bubbles that have come out of solution. Acoustic waves generated by the pressure wave generator can propagate through the degassed fluid to reach and clean the surfaces, cracks, and tooth spaces and cavities. In some procedures, the degassed fluid can be able to penetrate spaces as small as about 500 microns, 200 microns, 100 microns, 10 microns, 5 microns, 1 micron, or smaller, because the degassed fluid is sufficiently gas-free that bubbles are inhibited from coming out of solution and blocking these spaces (as compared to use of fluids with normal dissolved gas content).

For example, in some systems and methods, the degassed fluid can have a dissolved gas content that is reduced when compared to the "normal" gas content of water. For example, according to Henry's law, the "normal" amount of dissolved air in water (at 25 C and 1 atmosphere) is about 23 mg/L, which includes about 9 mg/L of dissolved oxygen and about 14 mg/L of dissolved nitrogen. In some embodiments, the degassed fluid has a dissolved gas content that is reduced to approximately 10%-40% of its "normal" amount as delivered from a source of fluid (e.g., before degassing). In other embodiments, the dissolved gas content of the degassed fluid can be reduced to approximately 5%-50% or 1%-70% of the normal gas content of the fluid. In some treatments, the dissolved gas content can be less than about 70%, less than about 50%, less than about 40%, less than about 30%, less than about 20%, less than about 10%, less than about 5%, or less than about 1% of the normal gas amount.

In some embodiments, the amount of dissolved gas in the degassed fluid can be measured in terms of the amount of dissolved oxygen (rather than the amount of dissolved air), because the amount of dissolved oxygen can be more readily measured (e.g., via titration or optical or electrochemical sensors) than the amount of dissolved air in the fluid. Thus, a measurement of dissolved oxygen in the fluid can serve as a proxy for the amount of dissolved air in the fluid. In some such embodiments, the amount of dissolved oxygen in the degassed fluid can be in a range from about 1 mg/L to about 3 mg/L, in a range from about 0.5 mg/L to about 7 mg/L, or some other range. The amount of dissolved oxygen in the degassed fluid can be less than about 7 mg/L, less than about 6 mg/L, less than about 5 mg/L, less than about 4 mg/L, less than about 3 mg/L, less than about 2 mg/L, or less than about 1 mg/L.

In some embodiments, the amount of dissolved gas in the degassed fluid can be in a range from about 2 mg/L to about 20 mg/L, in a range from about 1 mg/L to about 12 mg/L, or some other range. The amount of dissolved gas in the degassed fluid can be less than about 20 mg/L, less than about 18 mg/L, less than about 15 mg/L, less than about 12 mg/L, less than about 10 mg/L, less than about 8 mg/L, less than about 6 mg/L, less than about 4 mg/L, or less than about 2 mg/L.

In other embodiments, the amount of dissolved gas can be measured in terms of air or oxygen percentage per unit volume. For example, the amount of dissolved oxygen (or dissolved air) can be less than about 5% by volume, less than about 1% by volume, less than about 0.5% by volume, or less than about 0.1% by volume.

The amount of dissolved gas in a liquid can be measured in terms of a physical property such as, e.g., fluid viscosity or surface tension. For example, degassing water tends to increase its surface tension. The surface tension of non-degassed water is about 72 mN/m at 20° C. In some embodiments, the surface tension of degassed water can be about 1%, 5%, or 10% greater than non-degassed water.

In some treatment methods, one or more secondary fluids can be added to a primary degassed fluid (e.g., an antiseptic solution can be added to degassed distilled water). In some such methods, the secondary solution(s) can be degassed before being added to the primary degassed fluid. In other applications, the primary degassed fluid can be sufficiently degassed such that inclusion of the secondary fluids (which can have normal dissolved gas content) does not increase the gas content of the combined fluids above what is desired for a particular dental treatment.

In various implementations, the treatment fluid can be provided as degassed liquid inside sealed bags or containers. The fluid can be degassed in a separate setup in the operatory before being added to a fluid reservoir. In an example of an "in-line" implementation, the fluid can be degassed as it flows through the system, for example, by passing the fluid through a degassing unit attached along a fluid line (e.g., the fluid inlet). Examples of degassing units that can be used in various embodiments include: a Liqui-Cel® MiniModule® Membrane Contactor (e.g., models 1.7×5.5 or 1.7×8.75) available from Membrana-Charlotte (Charlotte, North Carolina); a PermSelect® silicone membrane module (e.g., model PDMSXA-2500) available from MedArray, Inc. (Ann Arbor, Michigan); and a FiberFlo® hollow fiber cartridge filter (0.03 micron absolute) available from Mar Cor Purification (Skippack, Pennsylvania). The degassing can be done using any of the following degassing techniques or combinations of thereof: heating, helium sparging, vacuum degassing, filtering, freeze-pump-thawing, and sonication.

In some embodiments, degassing the fluid can include de-bubbling the fluid to remove any small gas bubbles that form or may be present in the fluid. De-bubbling can be provided by filtering the fluid. In some embodiments, the fluid may not be degassed (e.g., removing gas dissolved at the molecular level), but can be passed through a de-bubbler to remove the small gas bubbles from the fluid.

In some embodiments, a degassing system can include a dissolved gas sensor to determine whether the treatment fluid is sufficiently degassed for a particular treatment. A dissolved gas sensor can be disposed downstream of a mixing system and used to determine whether mixing of solutes has increased the dissolved gas content of the treatment fluid after addition of solutes, if any. A solute source can include a dissolved gas sensor. For example, a dissolved gas sensor can measure the amount of dissolved oxygen in the fluid as a proxy for the total amount of dissolved gas in the fluid, since dissolved oxygen can be measured more readily than dissolved gas (e.g., nitrogen or helium). Dissolved gas content can be inferred from dissolved oxygen content based at least partly on the ratio of oxygen to total gas in air (e.g., oxygen is about 21% of air by volume). Dissolved gas sensors can include electrochemical sensors, optical sensors, or sensors that perform a dissolved gas analysis. Examples of dissolved gas sensors that can be used with embodiments of various systems disclosed herein include a Pro-Oceanus GTD-Pro or HGTD dissolved gas sensor available from Pro-Oceanus Systems Inc. (Nova Scotia, Canada) and a D-Opto dissolved oxygen sensor available from Zebra-Tech Ltd. (Nelson, New Zealand). In some implementations, a sample of the treatment can be obtained and gases in the sample can be extracted using a vacuum unit. The extracted gases can be analyzed using a gas chromatograph to determine dissolved gas content of the fluid (and composition of the gases in some cases).

Accordingly, fluid delivered to the tooth from a fluid inlet and/or the fluid used to generate the jet in a liquid jet device can comprise a degassed fluid that has a dissolved gas content less than normal fluid. The degassed fluid can be used, for example, to generate the high-velocity liquid beam for generating acoustic waves, to substantially fill or irrigate a chamber, to provide a propagation medium for acoustic waves, to inhibit formation of air (or gas) bubbles in the chamber, and/or to provide flow of the degassed fluid into small spaces in the tooth (e.g., cracks, irregular surfaces, tubules, etc.). In embodiments utilizing a liquid jet, use of a degassed fluid can inhibit bubbles from forming in the jet due to the pressure drop at a nozzle orifice where the liquid jet is formed.

Thus, examples of methods for dental and/or endodontic treatment comprise flowing a degassed fluid onto a tooth or tooth surface or into a chamber. The degassed fluid can comprise a tissue dissolving agent and/or a decalcifying agent. The degassed fluid can have a dissolved oxygen content less than about 9 mg/L, less than about 7 mg/L, less than about 5 mg/L, less than about 3 mg/L, less than about 1 mg/L, or some other value. A fluid for treatment can comprise a degassed fluid with a dissolved oxygen content less than about 9 mg/L, less than about 7 mg/L, less than about 5 mg/L, less than about 3 mg/L, less than about 1 mg/L, or some other value. The fluid can comprise a tissue dissolving agent and/or a decalcifying agent. For example, the degassed fluid can comprise an aqueous solution of less than about 6% by volume of a tissue dissolving agent and/or less than about 20% by volume of a decalcifying agent.

IX. Various Performance Characteristics of the Disclosed Systems and Methods

The disclosed methods, compositions, and systems (e.g., the disclosed pressure wave generators, treatment fluids, etc.) may clean outer and inner surfaces of teeth better than other systems, and may do so more safely than the other systems.

Figure 11A:
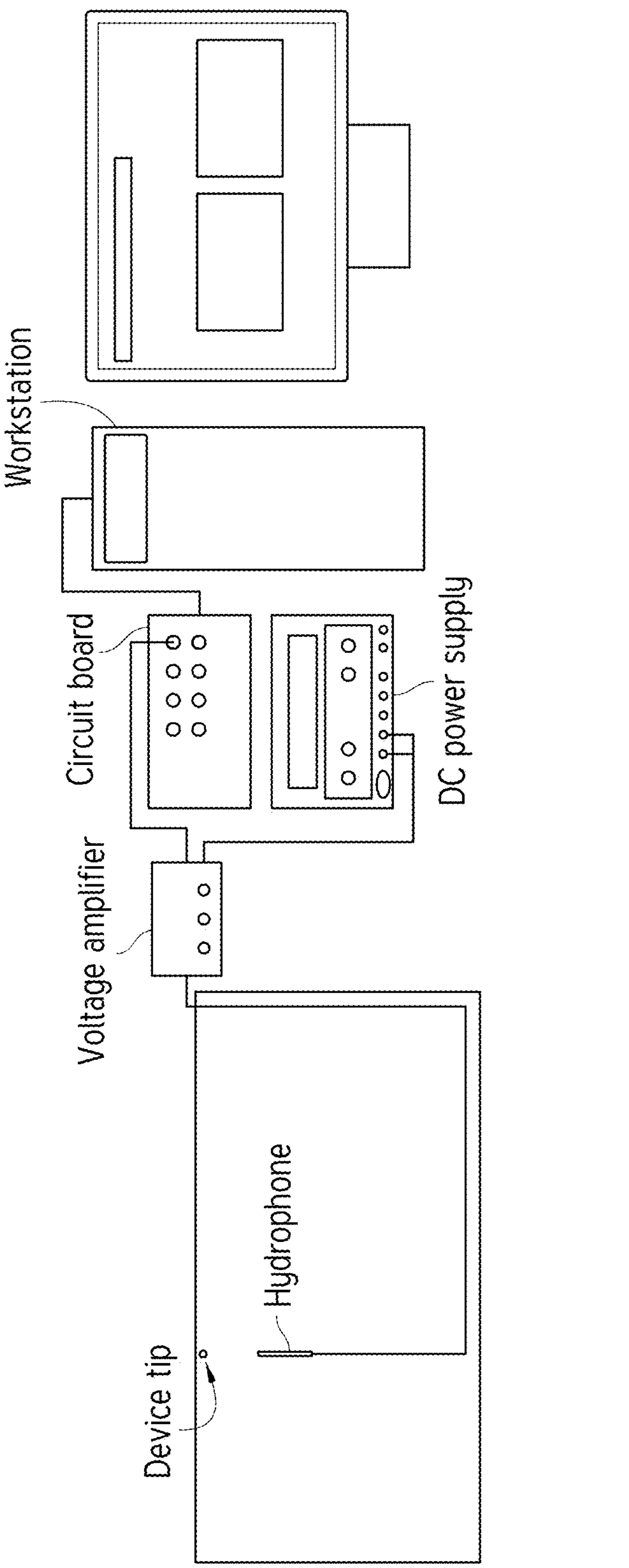
FIG. 11A is a schematic diagram of an experimental setup designed to measure the power output of various tooth cleaning devices.

FIG. 11A is a schematic diagram of an experimental setup designed to measure the power output of various tooth cleaning devices. As shown in FIG. 11A, a tank was filled with a liquid (e.g., water), and a tip of the device to be tested was placed underneath the surface of the liquid. A hydrophone was placed in the tank to measure the output of each device under operating conditions. A voltage amplifier, circuit board, a DC power supply, and a workstation were used to measure the voltage output from the hydrophone for each measurement.

Figure 11B:
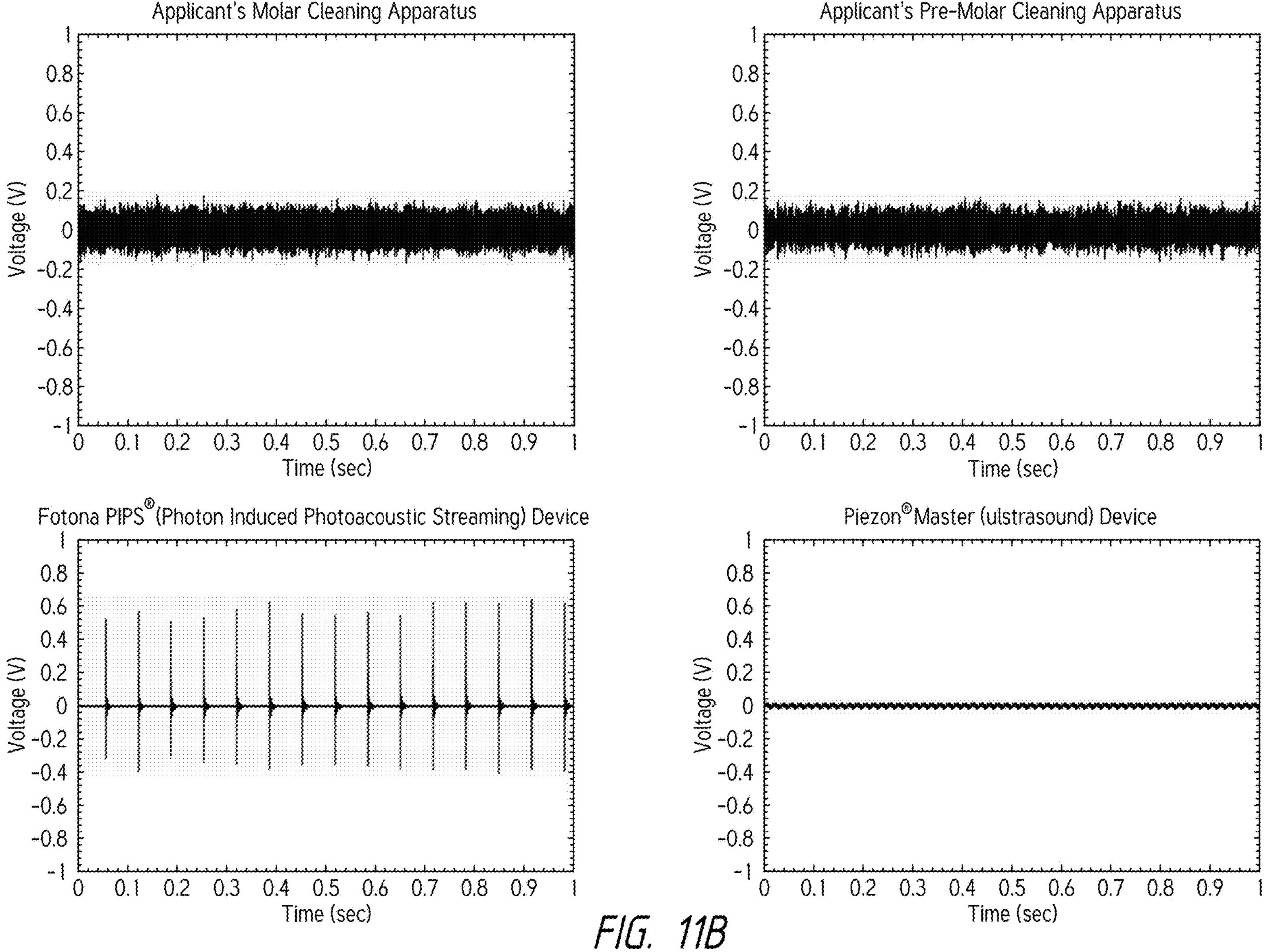
FIG. 11B is a plot of the voltage (in volts) output by the hydrophone over time (in seconds) for each device tested.

FIG. 11B is a plot of the voltage (in volts) output by the hydrophone over time (in seconds) for each device. Measurements for four experiments are shown in FIG. 11B. In particular, the plot in the upper left corner is a measure of voltage output over time for systems disclosed in this Application that are adapted to clean a molar tooth (referred to herein as "Applicant's Molar Cleaning Apparatus"). In particular, Applicant's Molar Cleaning Apparatus used in the experimental setup of FIG. 11A is generally similar to the handpiece 50 described in relation to FIGS. 15A-15C of U.S. Patent Publication No. 2012/0237893, which is incorporated by reference herein. An impingement member having a concave impingement surface similar to the impingement members 110 described in relation to FIGS. 12A-12C of U.S. Patent Publication No. 2011/0117517, which is also incorporated by reference herein, can be disposed at a distal portion of the guide tube. Furthermore, Applicant's Molar Cleaning Apparatus can include a jet device configured to form a liquid jet beam at a pressure of about 9000 psi, +/− about 1000 psi. The jet can be formed by passing pressurized liquid through a nozzle having a diameter of about 63 microns, +/− about 5 microns. In general, the parameters for the nozzle and guide tube can be similar to those described in U.S. Patent Publication No. 2012/0237893 and U.S. Patent Publication No. 2011/0117517 such that a coherent, collimated jet with a length of at least about 1 mm is produced. The plot in the upper right corner is a measure of voltage output over time for systems disclosed in this Application that are adapted to clean a pre-molar tooth (referred to herein as "Applicant's Pre-Molar Cleaning Apparatus"). In Applicant's Pre-Molar Cleaning Apparatus, a jet similar to the one described for the Molar Cleaning Apparatus can be used. The jet device for the Pre-Molar Cleaning Apparatus can be used in conjunction with a pre-molar handpiece such as the one illustrated in FIG. 10B. The plot in the lower left corner is a measure of voltage output over time for a Fotona photon induced photoacoustic streaming (PIPS®) device. The plot in the lower right corner is a measure of voltage output over time for a Piezon® Master ultrasonic device.

As shown in FIG. 11B, Applicant's Molar and Pre-Molar Cleaning Apparatuses generate a voltage output (representative of power) over time that includes multiple frequencies. Indeed, as shown in FIG. 11B, Applicant's Molar and Pre-Molar Cleaning Apparatuses can generate a signal including a significant amount of noise. For example, the frequencies in the signal may include multiple, substantially random frequencies (e.g., approximating white noise in some arrangements). By contrast, the signal produced by the PIPS device includes pulses generated at substantially regular intervals, and the signal produced by the ultrasonic device can include a substantially periodic signal, e.g., one frequency, or only a few frequencies. As explained herein, the broadband signals generated by Applicant's Molar and Pre-Molar Apparatuses can advantageously clean different types of materials from the tooth and can do so quickly and effectively. For example, different frequencies may clean different types and/or sizes of materials effectively.

Figure 12A:
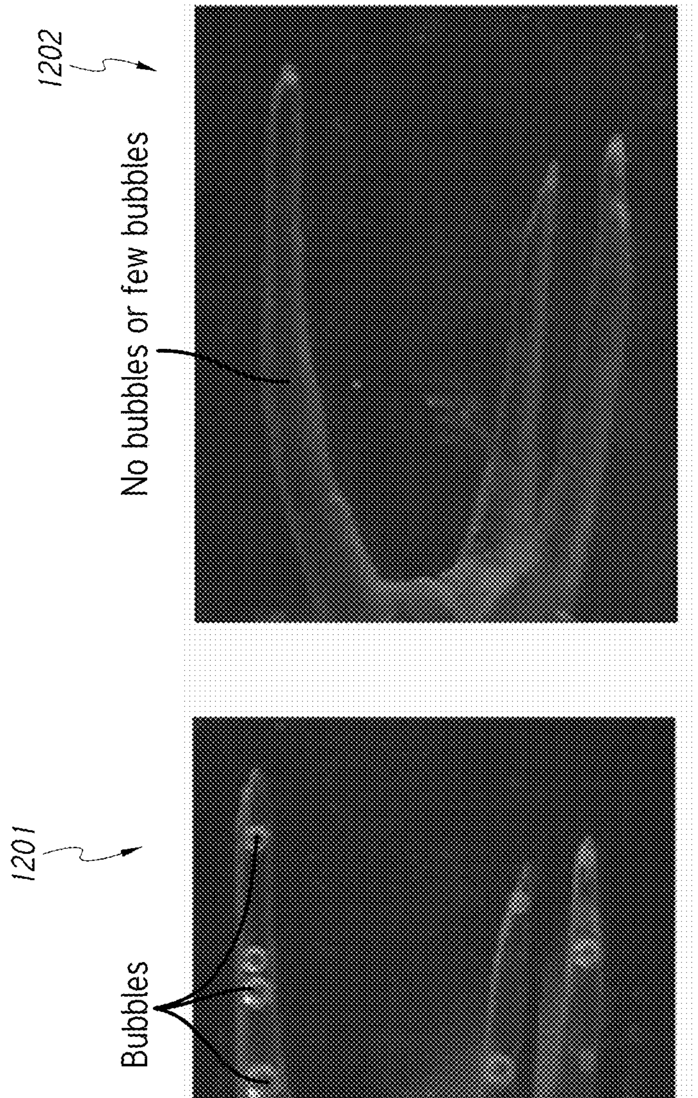
FIG. 12A illustrates images of root canals that compare the use of non-degassed liquid and degassed liquid in the disclosed pressure wave generators.
Figure 12B:
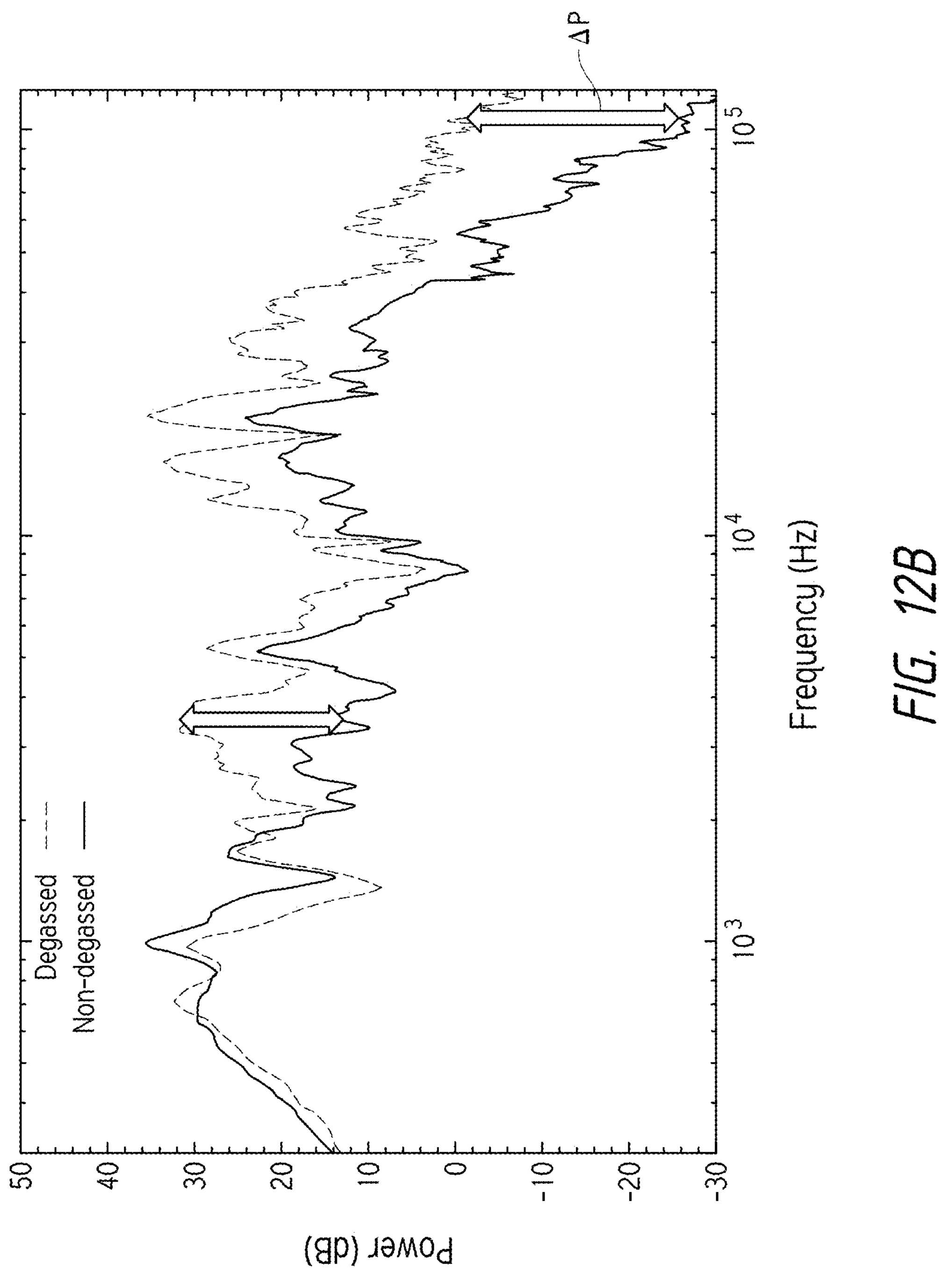
FIG. 12B is a plot comparing the power output for techniques using non-degassed and degassed liquids.

FIG. 12A illustrates images of root canals that compare the use of non-degassed liquid and degassed liquid in the disclosed pressure wave generators. As shown in image 1201 on the left side of FIG. 12A, the use of non-degassed liquid may cause bubbles to form in the canals, which may inhibit the propagation of energy in some arrangements. As shown in image 1202 on the right side of FIG. 12A, the use of degassed liquid may substantially prevent the formation of bubbles in the root canals when exposed to broadband acoustic or pressure waves. FIG. 12B is a plot comparing the power output for techniques using non-degassed and degassed liquids. The power outputs plotted in FIG. 12B are measured based on the liquid jet device described above with respect to Applicant's Molar Cleaning Apparatus. As shown in FIG. 12B, at higher acoustic frequencies, the use of degassed liquid in the disclosed systems can generate significantly more power than in techniques using non-degassed liquid. As illustrated in FIG. 12B, for example, at high acoustic frequencies, the difference between power generated by degassed and non-degassed liquids can be given by $\Delta P$, which can be in a range of about 5 dB to about 25 dB for frequencies in a range of about 20 kHz to about 200 kHz. For example, for frequencies in a range of about 70 kHz to about 200 kHz, $\Delta P$ can be in a range of about 10 dB to about 25 dB. At lower frequencies, the differences in power generated by degassed and non-degassed techniques may not be noticeable. At lower frequencies, relatively high powers may be generated even with non-degassed liquid because low frequency, large-scale fluid motion may produce substantial momentum that contributes to the cleaning of the tooth.

Figure 13:
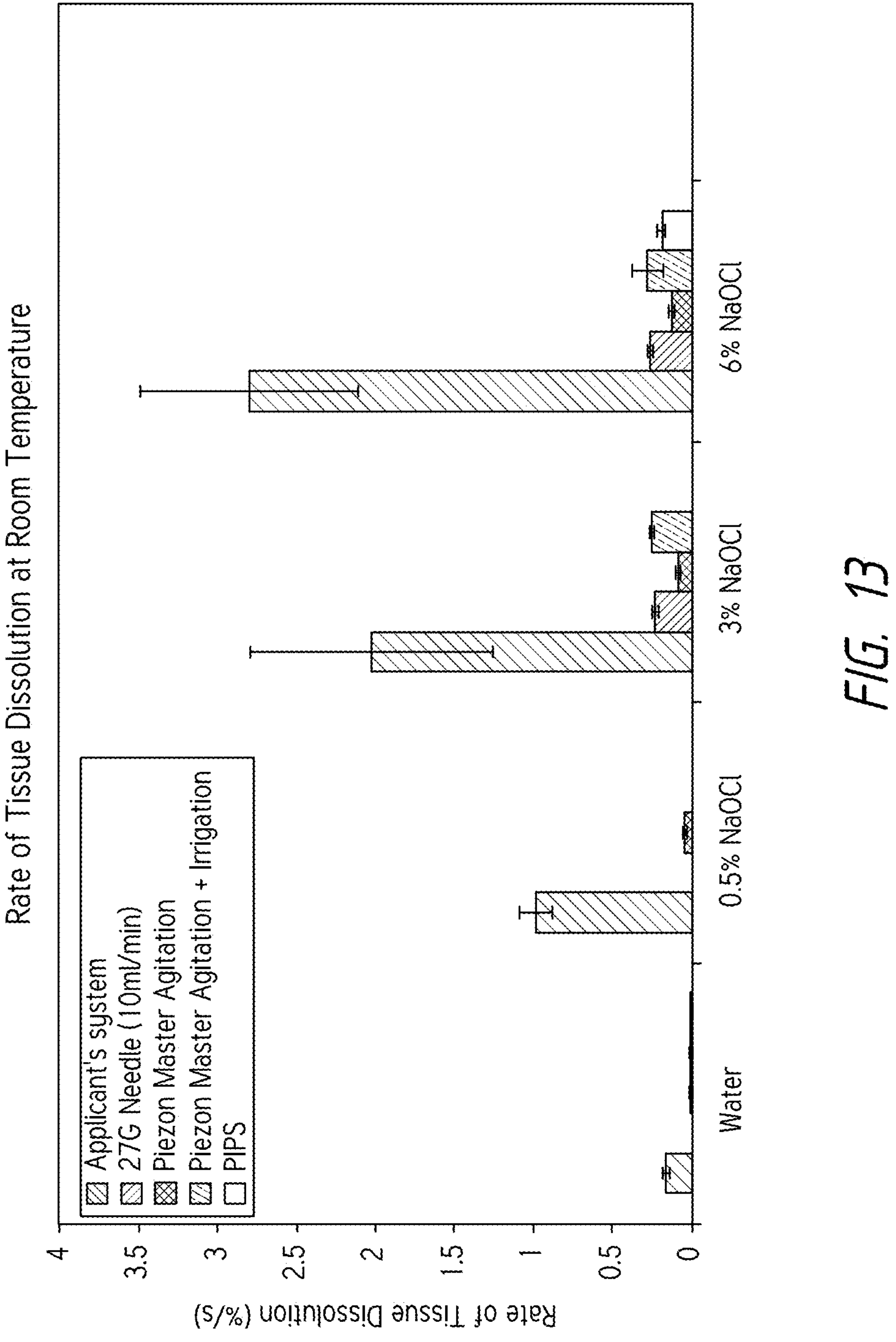
FIG. 13 is a plot comparing the rates of tissue dissolution (in units of % per second) for Applicant's device versus other devices, for different treatment fluids and compositions.

FIG. 13 is a plot comparing the rates of tissue dissolution (in units of % per second) for Applicant's device versus other devices, for different treatment fluids and compositions. As used herein, the data labeled "Applicant's system" was obtained from a system similar to that described above in relation to Applicant's Molar Cleaning Apparatus. In FIG. 13, the plot compares tissue dissolution rates for pure water, 0.5% NaOCl, 3% NaOCl, and 6% NaOCl. For example, FIG. 13 compares tissue dissolution rates at room temperature for Applicant's device, a 27G irrigation needle supplying irrigation fluid at a rate of 10 mL/min, an activated Piezon Master device, an activated Piezon Master Agitation in addition to some fluid irrigation, and an activated PIPS device. As shown in FIG. 13, for each treatment fluid and concentration, Applicant's system cleans at substantially higher rates than the other tested devices. For example, tissue dissolution rates for each treatment solution using Applicant's system may be at least 8-10 times the dissolution rates for the other tested devices.

Figure 14A:
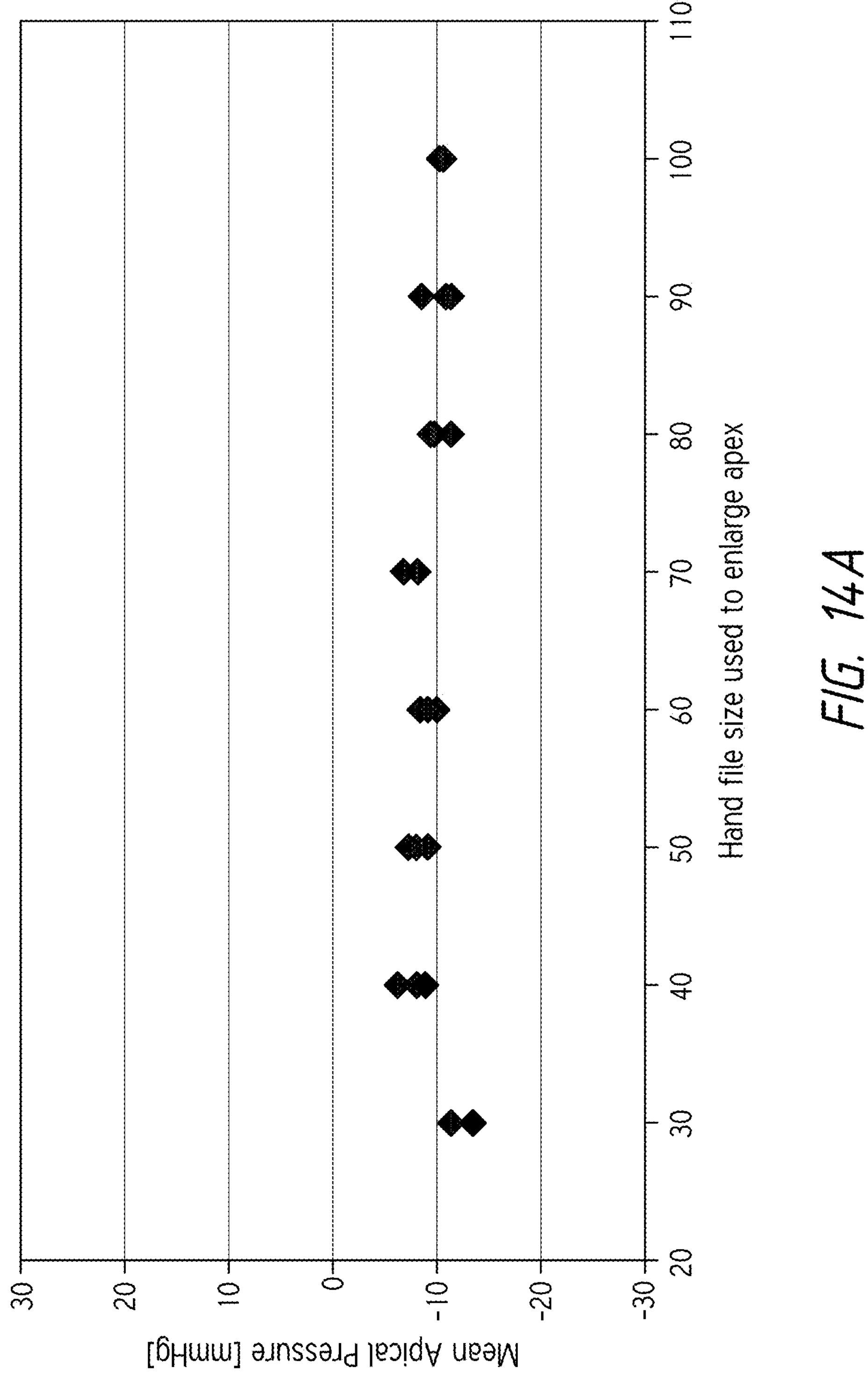

FIGS. 14A-14B are plots relating to the pressure measured at or near the apical opening of the root canal during treatment. As used herein, the data labeled "Applicant's system" was obtained from a system similar to that described above in relation to Applicant's Molar Cleaning Apparatus. As explained herein, it should be appreciated that high apical pressures can harm the patient. For example, high apical pressures can cause fluid or other material to extrude through the apex and into the patient's jaw. Extrusion through the apex can cause the patient substantial pain and can cause various health problems. Accordingly, it can be desirable for endodontic treatments to have low or negative apical pressures. FIG. 14A is a plot of mean apical pressure versus the hand file size used to enlarge the apex. As shown in FIG. 14A, Applicant's system generates negative pressures for each file size. Such negative pressures can advantageously prevent extrusion through the apex. For example, as explained above, the induced vortices can cause the pressures at or near the apical opening to be slightly negative. For example, the mean apical pressures can be in a range of about −5 mmHG to about −15 mmHg.

FIG. 14B is a plot comparing the apical pressures during treatments using Applicant's system and various other devices, such as various sizes of and flow rates dispensed from open-vented needles. The plot of FIG. 14B includes data for a distobuccal canal, and the plot compares the pressures for different amounts of canal shaping (e.g., no shaping, minimal shaping, traditional shaping, apical enlargement). As shown in FIG. 14B, Applicant's techniques and systems produce negative apical pressures, as compared to the high, positive apical pressures generated by the other plotted devices.

Figure 14C:
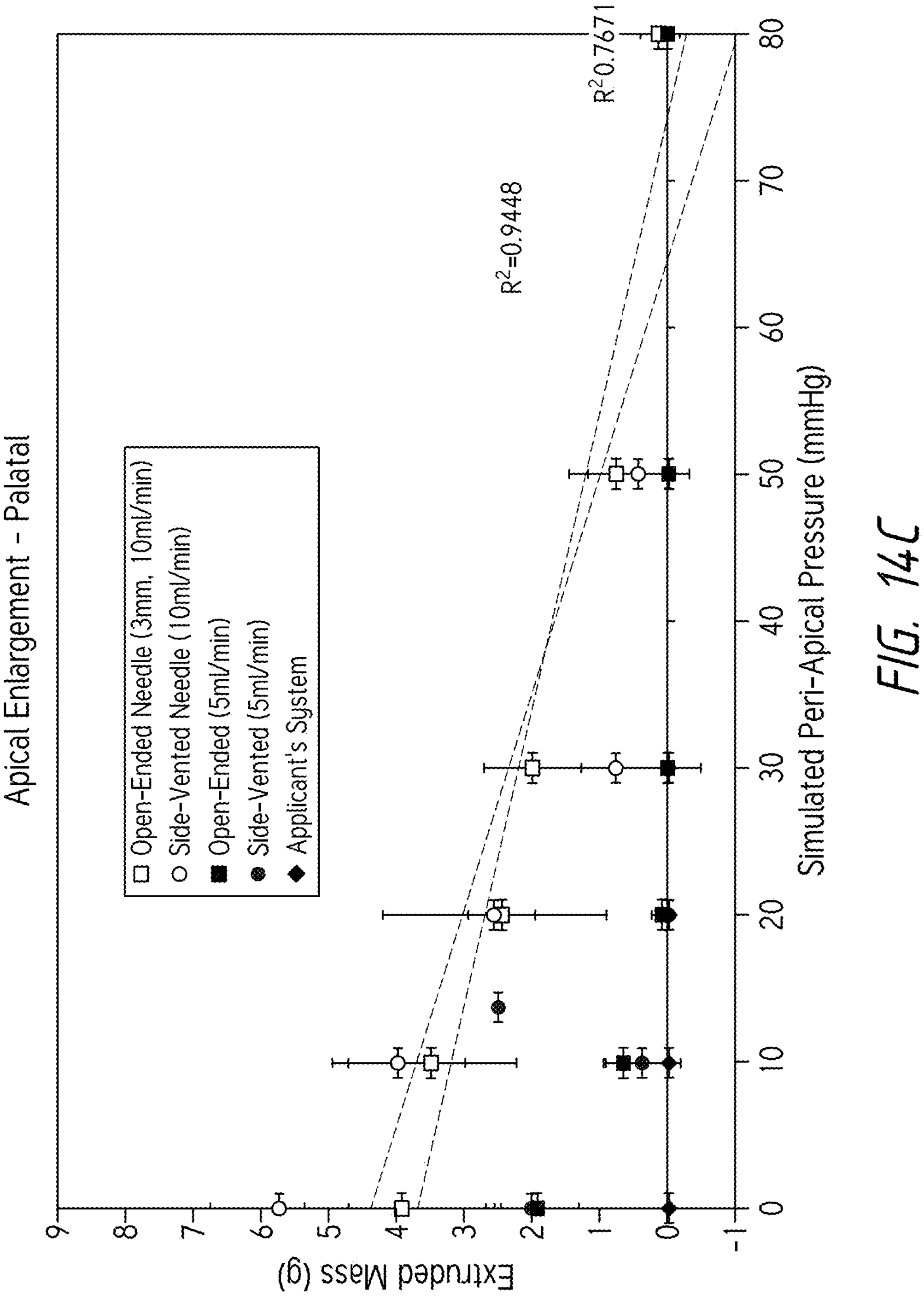
FIG. 14C is a plot of the mass of material extruded through the apex for various simulated peri-apical pressures for Applicant's system and for various needles Throughout the drawings, reference numbers may be re-used to indicate a general correspondence between referenced elements. The drawings are provided to illustrate example embodiments described herein and are not intended to limit the scope of the disclosure.

The negative apical pressures generated by Applicant's systems can advantageously improve patient outcomes by preventing and/or reducing extrusion of materials through the apex. FIG. 14C is a plot of the mass of material extruded through the apex for various simulated peri-apical pressures for Applicant's system and for various needles. As used herein, the data labeled "Applicant's system" was obtained from simulations of a system similar to that described above in relation to Applicant's Molar Cleaning Apparatus. As shown in FIG. 14C, the mass of material extruded when Applicant's system and methods are used to clean canals is less than that of other devices. Indeed, the disclosed systems and methods can clean root canals with minimal or no material extruded through the apex.

Although the tooth schematically depicted in some of the figures is a pre-molar, the procedures can be performed on any type of tooth such as an incisor, a canine, a bicuspid, a pre-molar, or a molar. Further, although the tooth may be depicted as a lower (mandibular) tooth in the figures, this is for purposes of illustration, and is not limiting. The systems, methods, and compositions can be applied to lower (mandibular) teeth or upper (maxillary) teeth. Also, the disclosed apparatus and methods are capable of any portions of a tooth, including interior spaces such as root canals, pulp cavity, etc., and/or exterior surfaces of the tooth. Moreover, the disclosed apparatus, methods, and compositions can be applied to human teeth (including juvenile teeth) and/or to animal teeth.

Reference throughout this specification to "some embodiments" or "an embodiment" means that a particular feature, structure, element, act, or characteristic described in connection with the embodiment is included in at least one embodiment. Thus, appearances of the phrases "in some embodiments" or "in an embodiment" in various places throughout this specification are not necessarily all referring to the same embodiment and may refer to one or more of the same or different embodiments. Furthermore, the particular features, structures, elements, acts, or characteristics may be combined in any suitable manner (including differently than shown or described) in other embodiments. Further, in various embodiments, features, structures, elements, acts, or characteristics can be combined, merged, rearranged, reordered, or left out altogether. Thus, no single feature, structure, element, act, or characteristic or group of features, structures, elements, acts, or characteristics is necessary or required for each embodiment. All possible combinations and subcombinations are intended to fall within the scope of this disclosure.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

The foregoing description sets forth various example embodiments and other illustrative, but non-limiting, embodiments of the inventions disclosed herein. The description provides details regarding combinations, modes, and uses of the disclosed inventions. Other variations, combinations, modifications, equivalents, modes, uses, implementations, and/or applications of the disclosed features and aspects of the embodiments are also within the scope of this disclosure, including those that become apparent to those of skill in the art upon reading this specification. Additionally, certain objects and advantages of the inventions are described herein. It is to be understood that not necessarily all such objects or advantages may be achieved in any particular embodiment. Thus, for example, those skilled in the art will recognize that the inventions may be embodied or carried out in a manner that achieves or optimizes one advantage or group of advantages as taught herein without necessarily achieving other objects or advantages as may be taught or suggested herein. Also, in any method or process disclosed herein, the acts or operations making up the method or process may be performed in any suitable sequence and are not necessarily limited to any particular disclosed sequence.

What is claimed is:

1. An apparatus for treating a tooth, the apparatus comprising:

a chamber to be positioned against a tooth;

a fluid motion generator coupled to the chamber and configured to generate a rotational motion of fluid in the chamber; and a suction port having a distal-most plane exposed to the chamber and communicating with the chamber to remove fluid from the chamber, wherein when the chamber is positioned against the tooth, the fluid motion generator is positioned outside the tooth.

2. The apparatus of claim 1, wherein the fluid motion generator is configured to generate the rotational motion about an axis transverse to a central axis of the chamber.

3. The apparatus of claim 1, wherein the fluid motion generator is configured to generate the rotational motion about a central axis of the chamber.

4. The apparatus of claim 1, wherein the apparatus is configured to clean a treatment region at or near an exterior surface of the tooth, and wherein the chamber is configured to couple to the tooth over the treatment region.

5. The apparatus of claim 1, wherein the fluid comprises a flowable obturation material, and wherein, when activated, the fluid motion generator is configured to fill a treatment region of the tooth with the flowable obturation material.

6. The apparatus of claim 1, wherein the chamber comprises an access port configured to provide fluid communication with the tooth, and wherein the fluid motion generator is configured to direct fluid in a direction substantially perpendicular to a central axis of the access port.

7. The apparatus of claim 1, wherein the fluid motion generator is configured to pass a stream of the fluid across an access port of the chamber.

8. The apparatus of claim 7, wherein the access port defines a proximal-most plane, and wherein the fluid motion generator is configured to pass the stream of fluid substantially parallel to the proximal-most plane.

9. The apparatus of claim 8, wherein the fluid motion generator is configured such that the momentum of the stream is in a direction substantially parallel to the proximal-most plane.

10. The apparatus of claim 1, wherein the fluid motion generator is further configured to generate acoustic waves through the fluid having energy sufficient to substantially clean the tooth.

11. The apparatus of claim 1, wherein the fluid motion generator comprises a liquid jet device.

12. The apparatus of claim 11, further comprising a reservoir to supply a degassed liquid to the chamber.

13. The apparatus of claim 1, wherein the fluid motion generator is configured to generate acoustic power having multiple frequencies.

14. The apparatus of claim 13, wherein the fluid motion generator is configured to generate acoustic power having a substantially white noise distribution of frequencies.

15. The apparatus of claim 1, wherein the fluid motion generator is disposed near a wall of the chamber between the wall and an access port of the chamber.

16. The apparatus of claim 1, wherein the fluid motion generator is configured to generate a chaotic fluid flow in the chamber.

17. The apparatus of claim 1, wherein the fluid motion generator is configured to generate a swirling flow in the chamber with an axis of rotation of the swirl substantially aligned with a central axis of the chamber.

* * * * *